United States Patent [19]
Kaneda et al.

[11] Patent Number: 6,046,768
[45] Date of Patent: Apr. 4, 2000

[54] APPARATUS USED FOR IMAGE BLUR PREVENTION

[75] Inventors: Naoya Kaneda, Chigasaki; Ichiro Onuki, Kawasaki, both of Japan

[73] Assignee: Canon Kabushiki Kaisha, Tokyo, Japan

[21] Appl. No.: 08/683,454

[22] Filed: Jul. 18, 1996

Related U.S. Application Data

[63] Continuation-in-part of application No. 08/490,153, Jun. 14, 1995, abandoned.

[30] Foreign Application Priority Data

Jun. 15, 1994 [JP] Japan .................................. 6-133129
Jul. 21, 1995 [JP] Japan .................................. 7-206765

[51] Int. Cl.$^7$ .................................................. H04N 5/232
[52] U.S. Cl. .................................................. 348/208; 348/335
[58] Field of Search .................................... 348/208, 143, 348/155, 169, 699, 700, 207, 362, 364, 358, 360, 335; 396/52, 53; H04N 5/232

[56] References Cited

U.S. PATENT DOCUMENTS

| | | |
|---|---|---|
| 2,959,088 | 11/1960 | Räntsch . |
| 4,920,369 | 4/1990 | Kaneda et al. . |
| 5,012,270 | 4/1991 | Sekine et al. ............................. 348/208 |
| 5,291,300 | 3/1994 | Ueda ........................................ 348/208 |
| 5,335,032 | 8/1994 | Onuki et al. ............................. 348/208 |
| 5,561,498 | 10/1996 | Sekine et al. ............................. 348/208 |

FOREIGN PATENT DOCUMENTS

| | | | |
|---|---|---|---|
| 1-280709 | 11/1989 | Japan ................................ G02B 7/08 |
| 1-321416 | 12/1989 | Japan ................................ G02B 7/08 |
| 2-144509 | 6/1990 | Japan ................................ G02B 7/08 |
| 2-173605 | 7/1990 | Japan ................................ G02B 7/08 |

*Primary Examiner*—Tuan Ho
*Attorney, Agent, or Firm*—Fitzpatrick, Cella, Harper & Scinto

[57] ABSTRACT

A control apparatus for an image blur prevention apparatus adapted to an optical apparatus having an optical device, light receiving structure for receiving light from the optical device, and image processing structure for processing light received from the light receiving structure in accordance with an image processing condition to form a photographic image includes a variable portion that changes an image blur prevention characteristic of the image blur prevention apparatus in accordance with a change in an image processing condition of light received by the light receiving structure.

25 Claims, 42 Drawing Sheets

| NO. | I | II | III |
|---|---|---|---|
| f | fW~fM1 | fM1~fM2 | fM2~fT |
| θT1 | 1° | 0.5° | 0.3° |
| K | 0.5 | 0.3 | 0.2 |
| θM | 1.5° | 1° | 0.5° |

FIG. 12A
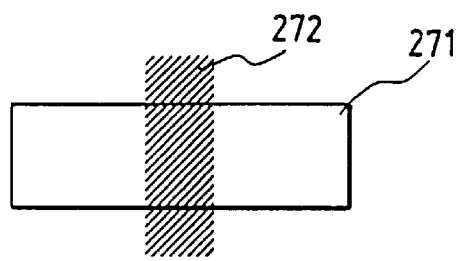
FIG. 12B
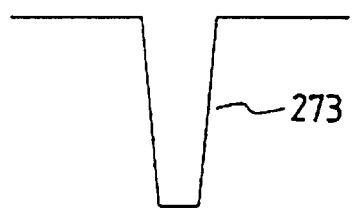
FIG. 12C
FIG. 13
| CONTRAST \ f | fW~fM1 | fM1~fM2 | fM2~fT |
|---|---|---|---|
| LOW CONTRAST | I | I | II |
| NORMAL | I | II | III |
| HIGHT CONTRAST | II | III | III |

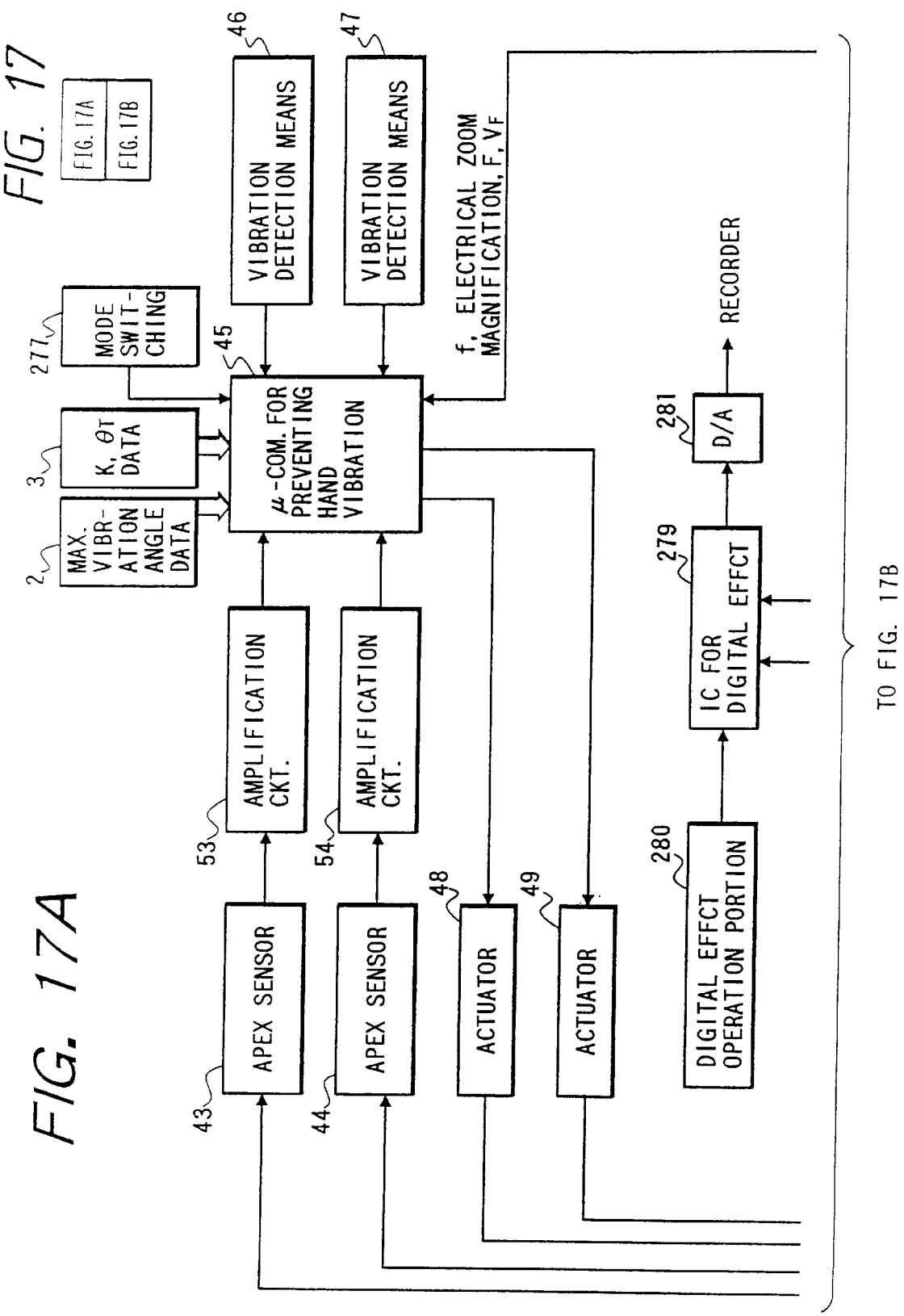

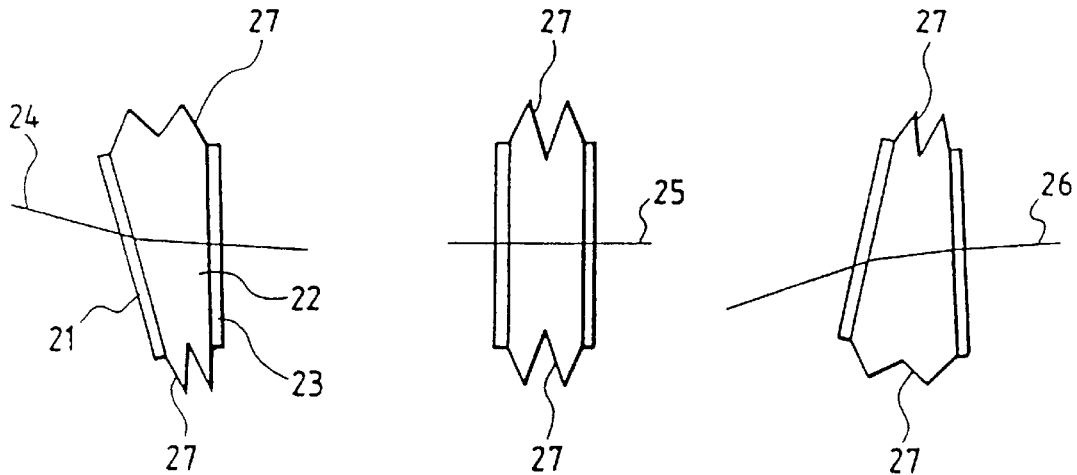
FIG. 19A PRIOR ART
FIG. 19B PRIOR ART
FIG. 19C PRIOR ART
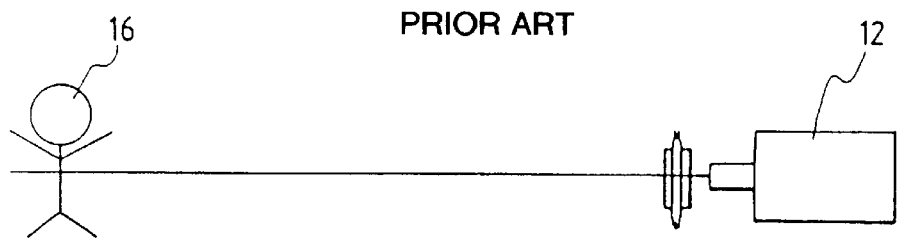
FIG. 20A PRIOR ART
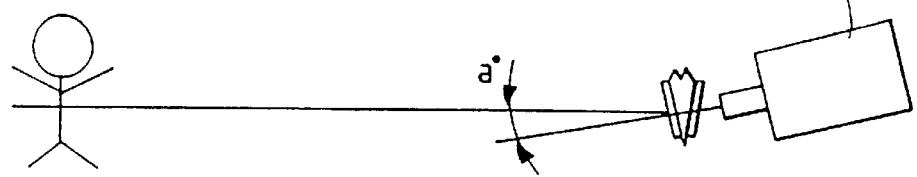
FIG. 20B PRIOR ART

FIG. 33A  WIDE

FIG. 33B  TELE

APPARATUS USED FOR IMAGE BLUR PREVENTION

This is a continuation-in-part application of U.S. patent application Ser. No. 08/490,153, now abandoned filed on Jun. 14, 1995.

BACKGROUND OF THE INVENTION

1. Field of the Invention

The present invention relates to an apparatus used for preventing an image blur generated by, e.g., a hand vibration.

2. Related Background Art

In the field of camera apparatuses such as video cameras, still cameras, and the like, in recent years, size and weight reductions are remarkable, and at the same time, multi-functions are attained. As one of multi-functions, an increase in zoom ratio of the photographing lens is an example. For example, zoom lenses with zoom ratios of ×10, ×12, and the like are normally used in home-use cameras.

However, as the focal length at the telephoto side assumes a larger value as the zoom ratio increases, the influence of a hand vibration on a recorded image increases. For example, in a dynamic image of a video camera, a principal object image unnaturally moves in a frame; in a still image, a blurred image is undesirably recorded. In a still image, such a problem can be avoided to some extent by increasing, e.g., the shutter speed. However, since dynamic image recording is time-base recording, the influence of a hand vibration cannot naturally be avoided by appropriately setting the shutter speed. In this situation, mainly in the field of video cameras, an image blur (vibration) prevention apparatus for eliminating the influence of a hand vibration has been put into practical applications.

The vibration prevention apparatus includes at least vibration detection means for detecting a vibration (image blur) component, and vibration correction means for correcting the vibration in accordance with the detection result of the detection means. Of these means, the vibration detection means adopts, e.g., a so-called electronic detection method for comparing images in two continuous frames, or a method of directly measuring the actual motion of a camera using an angular velocimeter, an angular accelerometer, or the like.

On the other hand, the vibration correction means adopts a so-called electronic correction method for electronically selecting a range to be actually recorded (extraction range) from an obtained image, or comprises optical vibration correction means for optically adjusting the angle of the photographing optical axis in a direction to remove any hand vibration.

Of the optical vibration correction means, a system using a variable apex angle prism will be described below with reference to FIGS. 19A to 23.

FIGS. 19A to 19C show the arrangement of a variable apex angle prism. Referring to FIGS. 19A, 19B, and 19C, glass plates 21 and 23 and a bellows portion 27 consisting of, e.g., polyethylene define a space in which a transparent liquid such as silicone oil is sealed.

In FIG. 19B, the two glass plates 21 and 23 are parallel to each other, and in this case, the incident and exit angles of light rays of the variable apex angle prism are equal to each other. On the other hand, when the two glass plates 21 and 23 define a certain angle therebetween, as shown in FIG. 19A or 19C, light rays 24 or 26 are deflected through a given angle.

Therefore, when a camera is inclined due to a cause such as a hand vibration, the angle of the variable apex angle prism arranged in front of a lens is controlled to deflect light rays through an angle corresponding to the inclination angle of the camera, thereby removing the vibration.

FIGS. 20A and 20B show this state. Assuming that the variable apex angle prism is in a parallel state and the photographing optical axis matches the center of an object in FIG. 20A, the variable apex angle prism is driven in correspondence with a vibration of a°, as shown in FIG. 20B, so as to deflect light rays. As a result, the photographing optical axis continues to match the center of the object.

FIG. 21 shows an actual arrangement of a variable apex angle prism unit, which includes the variable apex angle prism, an actuator portion for driving the prism, and an apex sensor for detecting the angle state.

Since an actual vibration may appear in any direction, the front and rear glass plates of the variable apex angle prism are respectively rotatable about rotation axes having a 90° difference. Note that suffices a and b respectively correspond to constituting members in these two rotation directions, and members denoted by the same reference numerals have the same functions. Some b-side members are not shown.

A variable apex angle prism main body 41 is constituted by the glass plates 21 and 23, the bellows portion 27, and a liquid filled therein. The glass plates are integrally attached to holding frames 28 (28a and 28b) using, e.g., an adhesive. The holding frames 28 constitute rotation axes 33 (33a and 33b) together with stationary members (not shown), and are pivotal about these axes. The axes 33a and 33b extend in directions having a 90° difference. A coil 35 (35a or 35b) is integrally arranged on each holding frame 28, and a magnet 36 (36a or 36b) and yokes 37 (37a or 37b) and 38 (38a or 38b) are arranged on a stationary portion (not shown). Therefore, when a current is supplied to each coil, the variable apex angle prism is pivoted about the corresponding axis 33. A slit 29 (29a or 29b) is formed at the distal end portion of an arm portion 30 (30a or 30b) integrally extending from each holding frame 28, and constitutes an apex sensor together with a light-emitting element 31 (31a or 31b) such as an iRED element arranged on a stationary portion, and a light-receiving element such as a PSD.

FIG. 22 is a block diagram of an image blur prevention lens system as a combination of a lens and a vibration prevention apparatus which comprises the variable apex angle prism as vibration correction means.

Referring to FIG. 22, the system comprises a variable apex angle prism 41, apex sensors 43 and 44, detection circuit units (amplification circuits) 53 and 54 for amplifying the outputs from the apex sensors, a microcomputer ($\mu$-com) 45, vibration detection means 46 and 47 comprising, e.g., angular accelerometers, actuators 48 and 49 constituted by the above-mentioned members (from the coils 35 to the yokes 38), and a lens 52.

The microcomputer 45 determines currents to be supplied to the actuators 48 and 49 in correspondence with the angle states detected by the apex sensors 43 and 44 and the detection results of the vibration detection means 46 and 47, so as to control the variable apex angle prism in an optimal angle state for removing a vibration.

Note that principal components are divided into two blocks since control operations are independently executed in directions having a 90° difference.

FIG. 23 shows the detailed structure of a conventional variable apex angle prism. Referring to FIG. 23, the prism comprises the glass plates 21 and 23, the bellows portion 27, a liquid sealed in a space defined by the glass plates and the bellows portion, and an optical axis 25. The bellows portion 27 is formed by coupling four doughnut-shaped films 59 to 62 via coupling portions 57, and coupling these films to frame members 55 via coupling portions 58. Each frame member 55 has a frame core member 56.

Of these members, the coupling portion 57 between each two adjacent films is formed by fusion. For this reason, each of the films 59 to 62 preferably has two surface layers consisting of a material which can provide good heat seal performance. For example, each surface layer normally consists of polyethylene (PE), polypropylene (PP), or the like. Each frame member 55 is fixed to the glass plate 21 or 23 using an adhesive. On the other hand, the coupling portion between each frame member 55 and the film 59 or 62 constituting the bellows must consist of the same material as the film surface if fusion is used in coupling as in the coupling portion 57. However, the above-mentioned material which can provide good heat seal performance can hardly provide high parts precision as compared to, e.g., polycarbonate (PC) popularly used in such a lens barrel. In addition, the above-mentioned material easily deforms due to low rigidity. Therefore, the frame core member 56 is used to avoid these problems. The frame core member 56 consists of a plastic material or a metal such as aluminum, stainless steel, or the like, which has a higher rigidity and a higher thermal deformation temperature than those of the material of the frame member 55. With reference to this frame core member 56, the frame member 55 is formed around the frame core member 56 by, e.g., insert molding. In this manner, a sufficient flatness of a portion, to which a film is fused, of the frame member 55, a sufficient mechanical strength or dimensional precision of a portion for supporting the glass plate 21 or 23, and a sufficient dimensional precision of the fitting diameter of the glass are obtained.

The arrangement using the variable apex angle prism as optical vibration correction means has been described.

A method of movably arranging a correction optical system disclosed in, e.g., U.S. Pat. No. 2,959,088, as another example of the optical vibration correction means, will be described below.

FIG. 24 shows the arrangement of the overall correction optical system.

Referring to FIG. 24, lenses 71 and 72 constitute a correction optical system for main lenses 82 and 83. The focal lengths of these lenses of the correction optical system are set as follows. Let $f_1$ be the focal length of the lens 71 fixed to a lens barrel 74 and having a negative power, and $f_2$ be the focal length of the lens 72 supported by a movable support portion 73 and having a positive power. Then, the focal lengths of these lenses are set to satisfy:

$$f_1 = -f_2$$

Furthermore, the lens 72 is supported by a gimbal 75 to be rotatable about two axes.

A counterweight 80 is arranged to balance the correction optical system.

When such an optical condition is satisfied, a vibration prevention apparatus including a so-called inertia pendulum type optical vibration correction means is realized.

Biaxial movement of the gimbal 75 will be explained below with reference to FIG. 25.

The lens 72 is supported by a support member 75y which has a degree of freedom in the y-direction, and the support member 75y is supported by a support member 75x which has a degree of freedom in the x-direction perpendicular to the y-direction. Furthermore, the support member 75x is supported by the lens barrel 74.

With this arrangement, the correction optical system which has a degree of freedom in two axes is realized.

A typical zoom lens system upon combination of the above-mentioned vibration correction means with the variable apex angle prism and a zoom lens will be described below. In the following description, a so-called inner or rear focus type zoom lens system which attains focusing using a lens group behind a variator lens group for zooming will be exemplified.

Various arrangements of such lens systems are known. In this case, FIG. 26 shows an example of an arrangement which uses the rearmost lens group for focusing. Referring to FIG. 26, the lens system comprises a stationary front-element lens group 111, a variator lens group 112, a stationary lens group 113, and a focusing (compensator) lens group 114. The lens system also comprises an anti-rotation guide rod 133, a variator feed rod 134, a stationary lens barrel 135, an aperture unit 136 (inserted in a direction perpendicular to the plane of the drawing of FIG. 26), a stepping motor 137 as a focus motor, and an output shaft 138 of the stepping motor. A male screw portion is formed on the output shaft 138 to move the lens. A female screw portion 139 meshes with this male screw portion, and is integrated with a movable frame 140 of the lens group 114. The lens system further comprises guide rods 141 and 142 for the movable frame of the lens group 141, a rear plate 143 for fixing the guide rods in an aligned state, and a relay holder 144. The lens system also comprises a zoom motor 145, a deceleration unit 146 for the zoom motor, and interlocking gears 147 and 148. The gear 148 is fixed to the variator feed rod 134.

In the above arrangement, when the stepping motor 137 is driven, the focus lens group 114 moves in the optical axis direction by a screw feed operation. When the zoom motor 145 is driven, the variator lens group 112 moves in the optical axis direction upon rotation of the shaft 134 by means of the interlocking gears 147 and 148.

FIG. 27 shows the positional relationship between the variator and focus lens groups in the above-mentioned lens system in correspondence with some distances. FIG. 27 exemplifies the in-focus positional relationships corresponding to object distances of infinity, 2 m, 1 m, 80 cm, and 0 cm. In the case of the inner focus zoom lens system, since the positional relationship between the variator and focus lens groups varies depending on the object distance, the lens groups cannot be interlocked by a simple mechanism unlike a cam ring of a front-element focus lens.

Therefore, an out-of-focus state occurs if the zoom motor 145 is simply driven in the structure shown in FIG. 26.

The above-mentioned characteristics have delayed practical applications of the inner focus lens system although the inner focus lens system has advantages, i.e., "good closest-distance photographing performance", "small number of constituting lenses", and the like.

However, in recent years, a technique for optimally controlling the lens positional relationship shown in FIG. 27 in correspondence with the object distance has been developed, and products adopting the technique are commercially available.

For example, Japanese Laid-Open Patent Application Nos. 1-280709, 1-321416, and 2-144509 by the same applicant as the present invention proposed a method of tracing the locus of the positional relationship between two lenses in correspondence with the distance.

In Japanese Laid-Open Patent Application No. 1-280709 by the present applicant, the positional relationship between the variator and the compensator (focus lens) is maintained by a method shown in FIGS. 28 to 30.

FIG. 28 is a block diagram of this system. Lens groups 111 to 114 are the same as those shown in FIG. 26. The position of the variator lens group 112 is detected by a zoom encoder 149. The encoder may comprise, e.g., a volume encoder in which a brush integrally attached to a variator moving ring slides along a board with a printed resistor pattern. An aperture encoder 150 uses an output from a Hall element arranged in, e.g., an aperture meter. An image pickup element 151 such as a CCD is connected to a camera signal processing circuit 152. A Y signal output from the camera processing circuit 152 is supplied to an AF circuit 153. The AF circuit discriminates an in-focus or defocus state, and also discriminates a near- or far-focus state and the defocus amount in the case of the defocus state. These discrimination results are supplied to a CPU 154.

A power-ON reset circuit 155 performs various reset operations upon power-ON. A zoom operation circuit 156 supplies the operation contents of a zoom switch 157 by an operator to the CPU 154. A memory stores locus data shown in FIG. 27, i.e., direction data 158, velocity data 159, and boundary data 160. A zoom motor driver 161 and a stepping motor driver 162 are connected to the CPU 154. The number of input pulses to the stepping motor is continuously counted by the CPU, and is used as an encoder of the absolute position of the focus lens. In this arrangement, since the variator position and the focus lens position are respectively obtained by the zoom encoder 149 and the number of input pulses to the stepping motor, a point on the map shown in FIG. 27 is determined. On the other hand, the map shown in FIG. 27 is divided by the boundary data 160 into small strip-like regions, as shown in FIG. 29. In FIG. 29, hatched portions correspond to regions where the lens is inhibited from being located. When one point on the map is determined, one of the small regions, to which the point belongs, can be determined.

As the velocity and direction data, the rotational speeds and directions of the stepping motor, which are obtained based on the locus passing the centers of the regions, are stored in units of regions. For example, in FIG. 29, the abscissa is divided into 10 zones. Assuming that the zoom time is 10 sec, the passing time per zone is 1 sec. FIG. 30 is an enlarged view of block III in FIG. 29. In this block, a locus 164 passes the center, a locus 165 passes the lower left corner, and a locus 166 passes the upper right corner. The central locus can be traced without generating any error when the lens moves at a velocity of x mm/sec.

If the velocity obtained as described above is called a region representative velocity, values corresponding to the respective regions are stored in a velocity memory in correspondence with the number of small regions. If this velocity is represented by 168, the representative velocity is finely adjusted like 167 or 169 on the basis of the detection result of an automatic focus adjustment device, thereby setting the velocity of the stepping motor. On the other hand, since the rotation direction of the stepping motor changes even upon zooming from the telephoto side to the wide-angle side (or vice versa), the sign of the direction is stored as the direction data.

The region representative velocity obtained based on the variator and focus lens positions is corrected on the basis of the detection result of an automatic focus detection circuit to determine a stepping motor velocity. The stepping motor is driven using the determined stepping motor velocity during the zoom driving operation to control the focus lens position. Thus, an out-of-focus state can be prevented even during the zoom operation in the inner focus lens system.

Note that a method in which velocities 167 and 169 are stored in the memory in addition to the representative velocity 168 in FIG. 30, and one of these three different velocities is selected in correspondence with the detection result of the automatic focus detection device is proposed by Japanese Laid-Open Patent Application No. 2-173605 by the present applicant.

In addition to the method of storing the velocities, the following method is known. In this method, some curves corresponding to object distances of ∞, 2 m, 1 m, and the like shown in FIG. 27 are stored in a memory as the focus lens positions corresponding to a plurality of variator positions. When the distance corresponds to an intermediate distance between two stored curves, the positional relationship between the two lens groups is calculated by interpolating data of the upper and lower stored curves.

FIG. 31 shows an arrangement used when the vibration correction means using the variable apex angle prism is coupled to the above-mentioned zoom lens.

Referring to FIG. 31, a rotation shaft 263 is formed integrally with each holding frame 28. A rotation shaft 267 is arranged at the opposite side to the rotation shaft 263, and is not formed integrally with the holding frame 28 in terms of assembling but is constituted by fitting, e.g., a metal shaft (e.g., stainless steel) into the holding frame under pressure. A leaf spring 268 is fixed by a screw 269. A flat glass plate 266 is arranged to avoid, e.g., a photographer from directly touching and damaging the variable apex angle prism. An attachment screw 265 for an accessory is formed near the glass plate 266. A stationary lens barrel part 264 includes holes for receiving the rotation shaft of the variable apex angle prism.

This lens barrel part 264 is fastened to a stationary lens barrel 135 of the zoom lens by a screw 270.

In FIG. 31, the holding frame for pivoting the front glass plate of the variable apex angle prism, actuators, apex sensors, and the like are not shown for the sake of simplicity.

However, when the above-mentioned optical vibration correction means which uses the variable apex angle prism or the movable correction optical system is used, a color shift due to the influence of chromatic aberration, which is generated in principle upon deflection of the optical axis, stands out especially when the correction angle is large, if the focal length of the combined zoom lens is large, or if a portion of a frame is to be recorded in an enlarged scale by, e.g., electronic zooming.

This problem is suppressed to a negligible level in the conventional apparatus. However, a conventionally negligible chromatic aberration level may contribute to a deterioration factor of image quality in consideration of the following future backgrounds: image quality is improving due to an increase in the number of pixels of a CCD as an image sensor, the above-mentioned electronic enlargement function (so-called electronic zooming) is becoming a standard function, a camera with improved image quality such as 3-CCD camera is becoming commercially available, and so on.

SUMMARY OF THE INVENTION

One aspect of the invention is to provide an apparatus for an image blur prevention apparatus which is applied to an optical apparatus having light-receiving means for receiving light from optical means for forming an image, comprising a variable portion for changing the characteristics of the image blur prevention apparatus in accordance with a processing condition of the light received by the light-receiving means.

With this arrangement, the image blur prevention apparatus can operate in accordance with the characteristics suitable for the processing condition of the light (e.g., the operation characteristics which take, into account, the degree of influence of aberrations that change depending on the processing condition).

Another aspect of the invention is to provide an apparatus for an image blur prevention apparatus, which is applied to an optical apparatus having image magnification changing means for changing a magnification of an image, and has image blur prevention means for preventing a blur of the image before the image magnification changing means, comprising a variable portion for changing the operation characteristics of the image blur prevention means in accordance with the magnification to be changed by the image magnification changing means.

With this arrangement, the image blur prevention means can operate in accordance with characteristics suitable for a variable magnification condition of an image (e.g., operation characteristics which take, into account, the influence of aberrations that change depending on a magnification).

BRIEF DESCRIPTION OF THE DRAWINGS

FIGS. 12A to 12C are schematic explanatory views of a focal point voltage of an automatic focus adjustment device;

FIG. 13 is a table showing combinations of respective coefficients set in the apparatus according to the third embodiment of the present invention;

FIGS. 19A to 19C are views for explaining the principle of a variable apex angle prism;

FIGS. 20A and 20B are views for explaining the principle of image blur correction by image blur correction means using the variable apex angle prism;

DETAILED DESCRIPTION OF THE PREFERRED EMBODIMENTS (First Embodiment)

Figure 1:
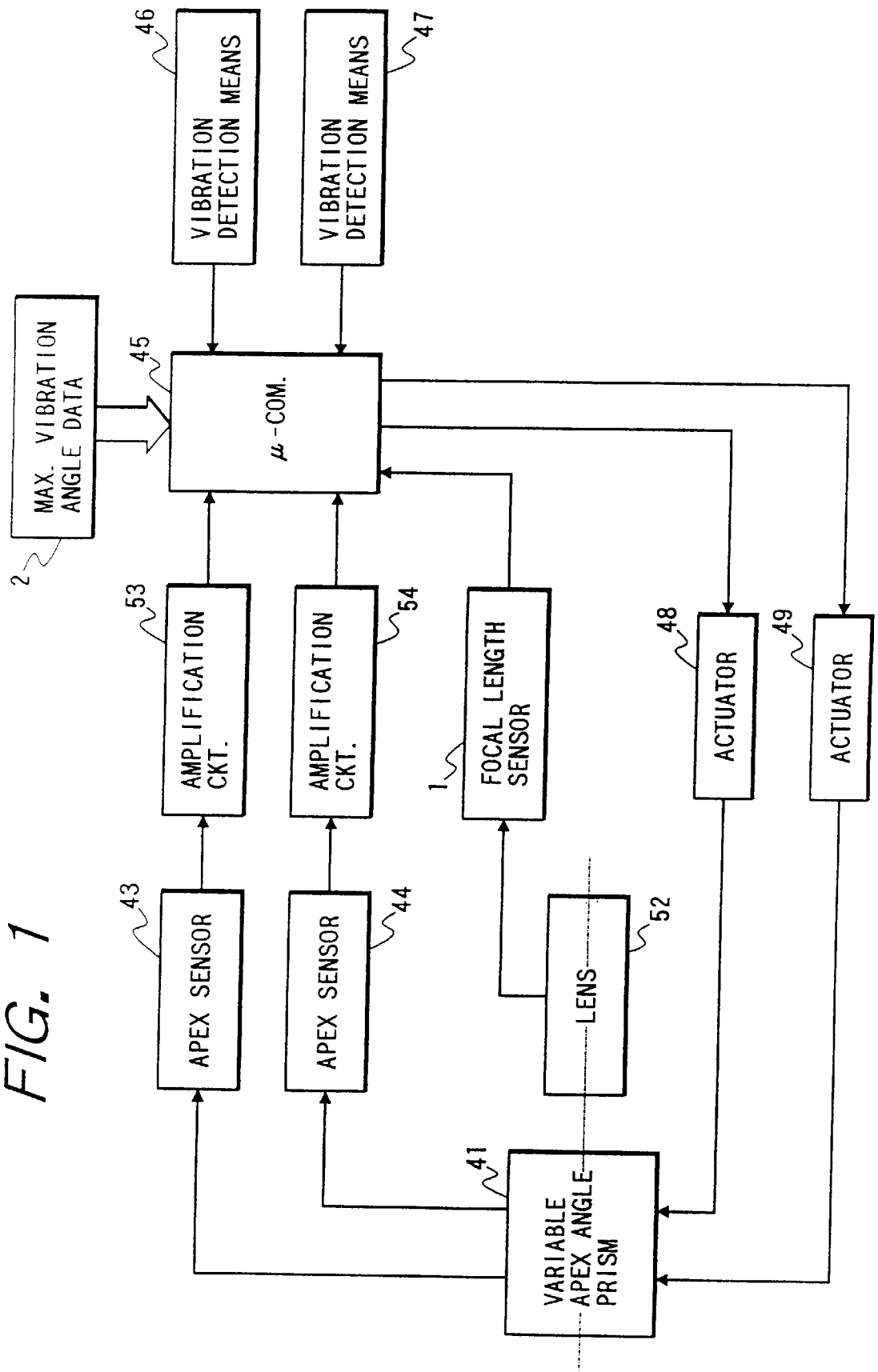
FIG. 1 is a block diagram showing the arrangement of principal part of an apparatus according to the first embodiment of the present invention.
Figure 26:
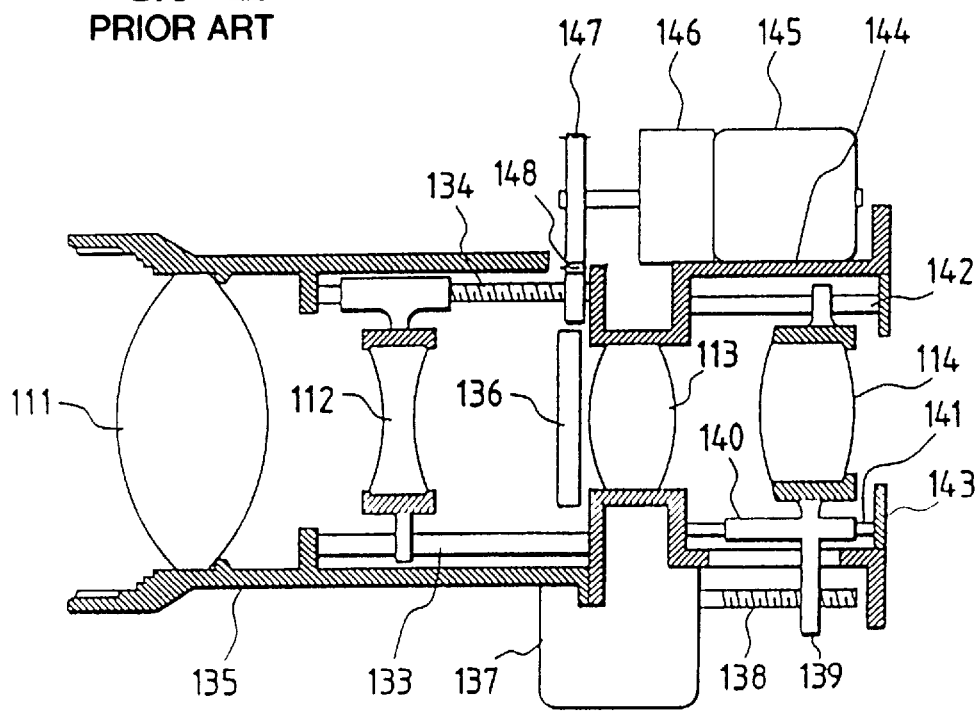
FIG. 26 is a sectional view of a general zoom lens system for a video camera.
Figure 27:
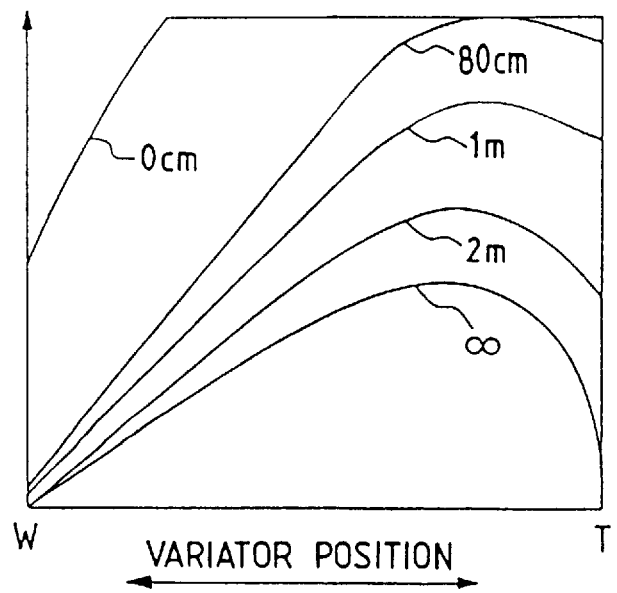
FIG. 27 is a graph for explaining the zoom tracking curves.
Figure 28:
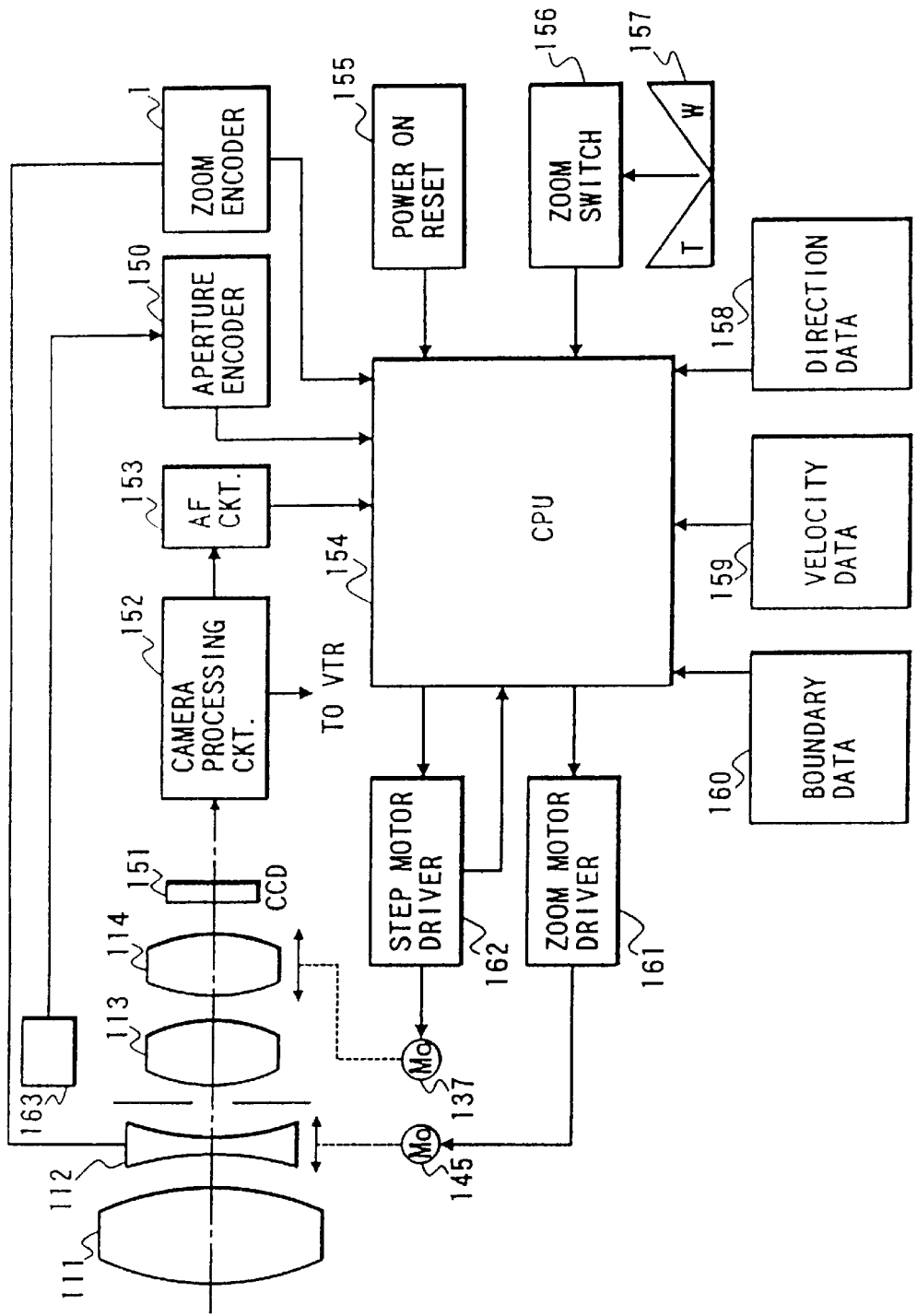
FIG. 28 is a block diagram showing the arrangement of principal part of a zoom lens control system.
Figure 29:
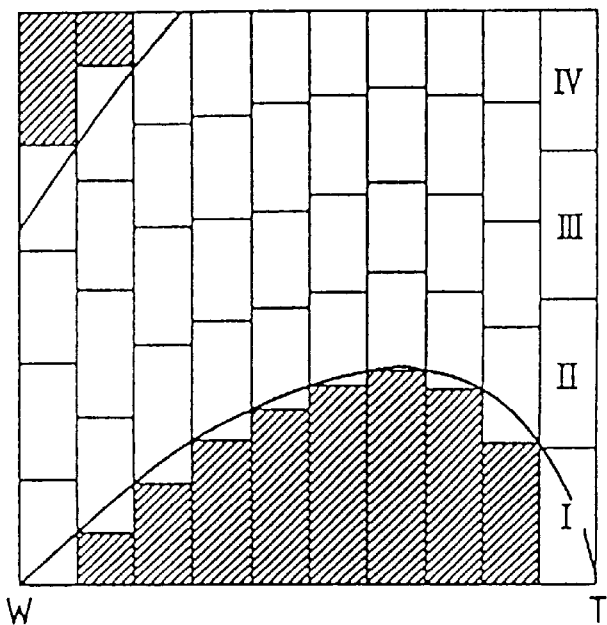
FIG. 29 is a graph showing an example of divided regions for zoom tracking.
Figure 30:
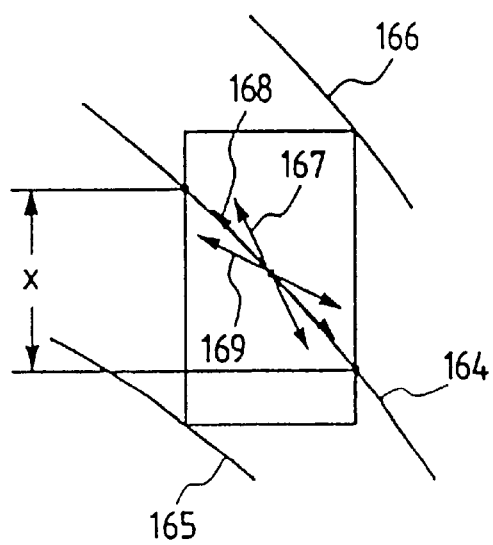
FIG. 30 is a view showing a setting example of zoom tracking velocities.
Figure 31:
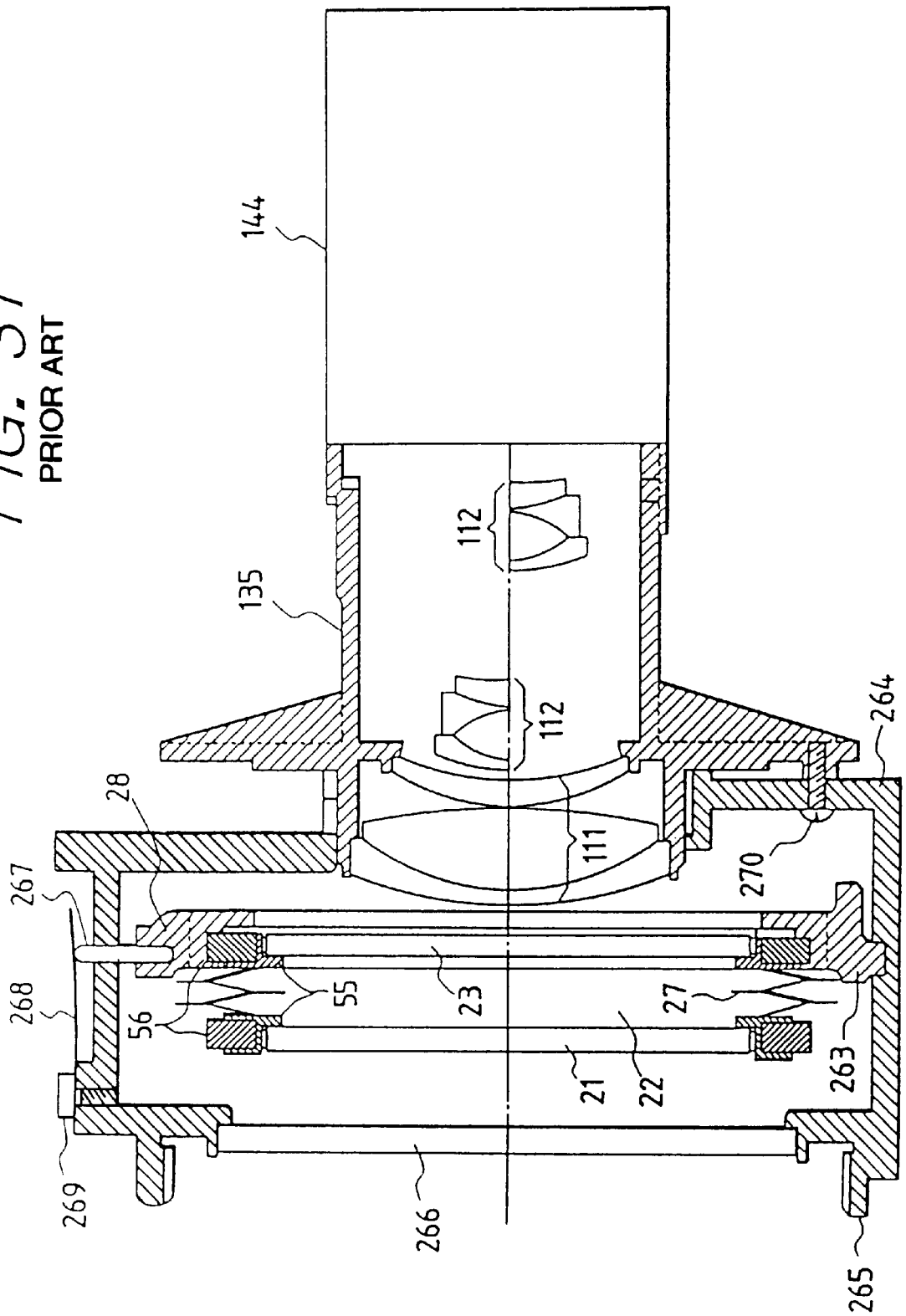
FIG. 31 is a view showing a state wherein a zoom lens system is coupled to a variable apex angle prism driving unit.

FIG. 1 is a schematic block diagram showing the arrangement according to the first embodiment of the present invention. Referring to FIG. 1, a focal length sensor 1 detects, e.g., the position of a variator lens of a zoom lens system. For example, in FIG. 26, since the lens group 112 corresponds to the variator position, the sensor 1 detects the position of this lens group. Various detection methods of the sensor 1 are available. For example, a method of detecting the position by sliding a brush, which is integrally arranged on a lens barrel for fixing this lens group, along a fixed variable resistor pattern, a method of detecting the position by continuously counting the number of driving pulses input to a stepping motor, which is used for driving the lens group, from a reference position, or the like, may be used.

Maximum vibration angle data 2 is stored as, e.g., a table corresponding to the focal length in a microcomputer.

In a vibration prevention apparatus according to the first embodiment of the present invention, a variable apex angle control microcomputer for preventing a vibration fetches information of the focal length using the above-mentioned arrangement, and limits the use maximum vibration angle of the variable apex angle prism to be used in accordance with the detection result.

Even when another optical vibration correction means such as the above-mentioned method of moving a correction optical system using a gimbal, a method of moving optical means in a plane, or the like is used, the present invention can be similarly applied by limiting the movable range of a movable portion.

Figure 2:
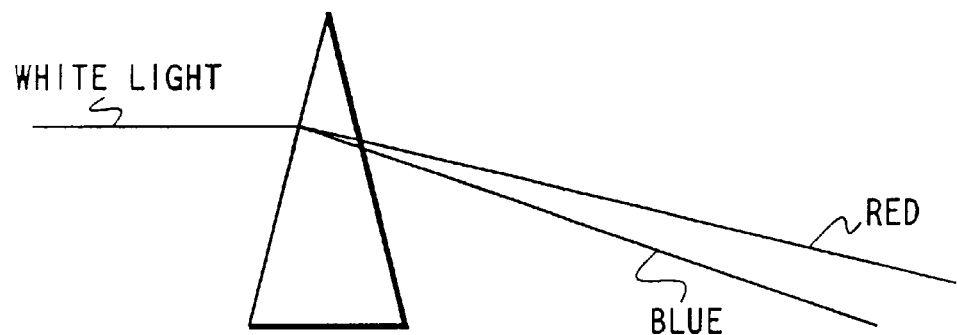
FIG. 2 is a view for explaining the principle of generation of chromatic aberration.

Chromatic aberration of magnification generated when a prism is used will be explained below with reference to FIG. 2. As shown in FIG. 2, when white light is incident on a prism having a certain angle, light emerging from the prism causes an angle shift in correspondence with its wavelength. Therefore, if such a prism is arranged in front of an imaging optical system, the imaging position changes in correspondence with the wavelength, and an image suffering color smear is formed. In particular, a color shift at a black-and-white edge with a high contrast stands out.

In general, a zoom lens system is designed to suppress the influence of chromatic aberration (achromaticity). When a variable apex angle prism is used, the color shift amount changes depending on the apex angle state of the prism. More specifically, in a standard state (in a state wherein two glass plates are parallel to each other), the color shift amount caused by the variable apex angle prism becomes zero. However, as the apex angle increases, the color shift amount increases.

Figure 3:
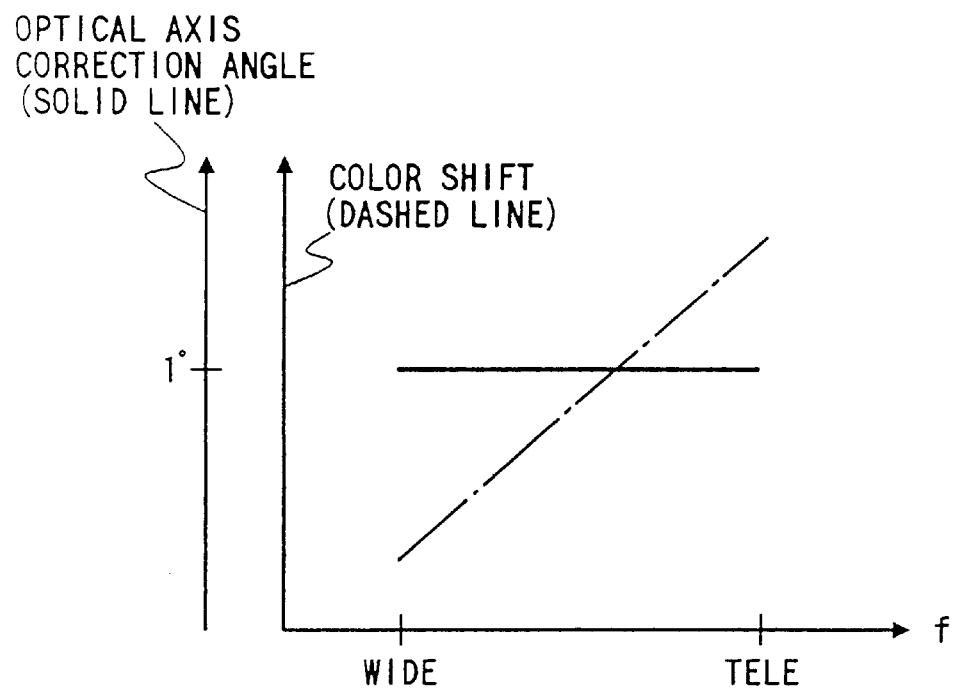
FIG. 3 is a graph showing the relationship between the focal length and the color shift in a conventional apparatus.

FIG. 3 shows the relationships between the focal length and the color shift, and between the focal length and the optical axis correction angle obtained when the variable apex angle prism is set in a use maximum angle state.

Note that the color shift means an imaging position shift between two light beams with different wavelengths on an imaging surface.

Assume that the relationship between the focal length and the color shift is expressed by a logarithmic graph in FIG. 3. Also, assume that the optical axis correction angle is 1° independently of the focal length. That is, the optical axis correction angle remains the same if a predetermined maximum apex angle is set independently of the focal length, since the optical axis correction angle is given by $\epsilon=(n-1)\times\theta$ (where $\theta$ is the angle of the variable apex angle prism, $\epsilon$ is the optical axis correction angle, and n is the refractive index of the liquid filled in the variable apex angle prism). In contrast to this, the influence of chromatic aberration stands out as the focal length increases (a dashed line represents the relationship between the focal length and the color shift).

Figure 4A:
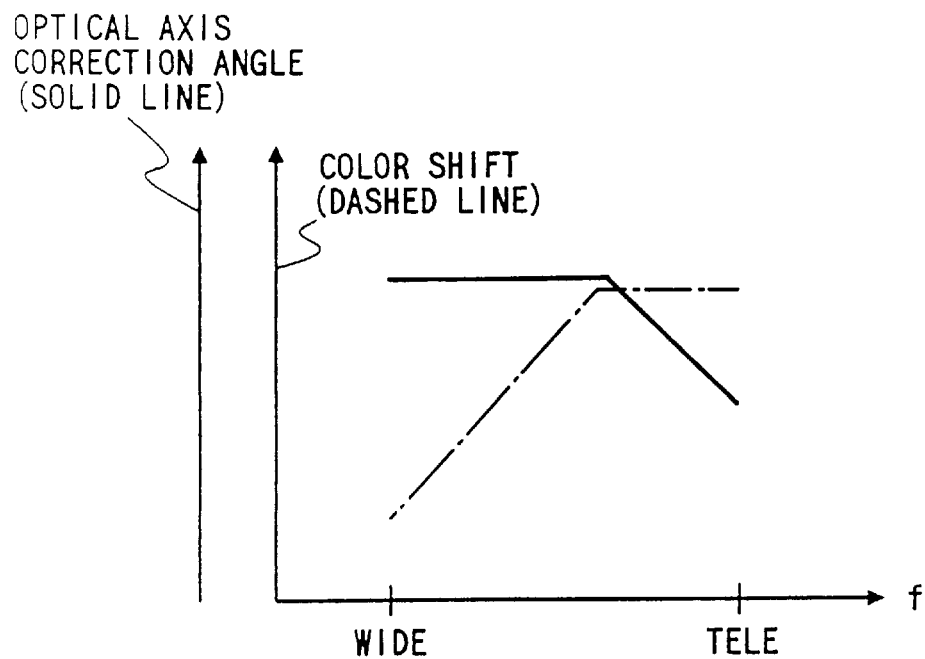
FIGS. 4A and 4B are graphs showing the relationship between the color shift and the focal length in the apparatus according to the first embodiment of the present invention.
Figure 4B:
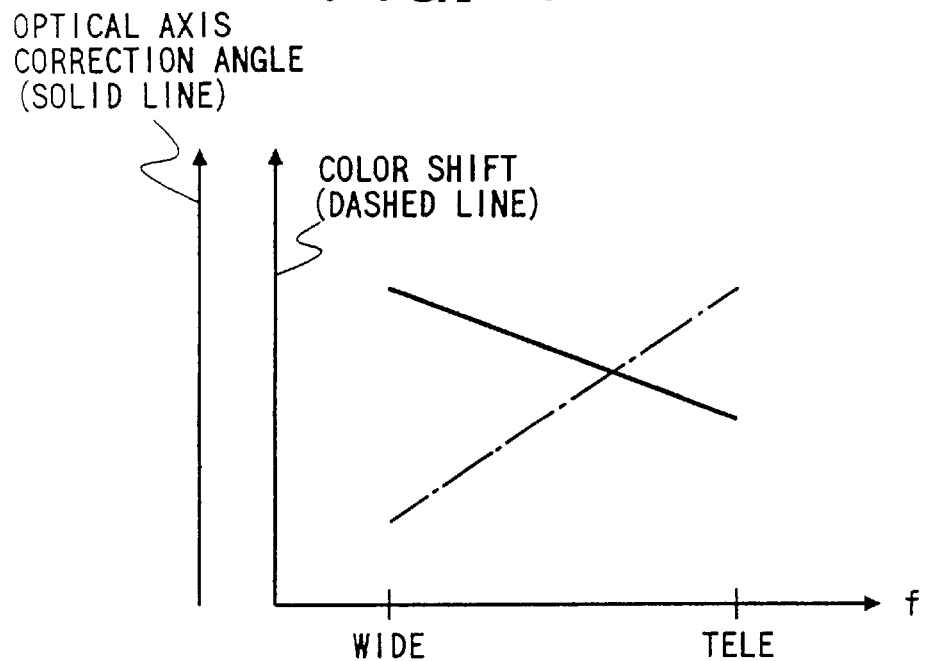

FIGS. 4A and 4B show the above-mentioned relationship according to the first embodiment of the present invention. In FIG. 4A, a focal length corresponding to a predetermined color shift amount is defined as a boundary, and the maximum vibration angle is set to be small on the telephoto side of this boundary, so that the color shift has a predetermined value.

In FIG. 4B, the setting value of the maximum use apex angle is slowly varied in correspondence with the focal length, so that a predetermined color shift occurs at the maximum focal length.

Decreasing the maximum use vibration angle at the large focal length side (telephoto side) in this manner is also preferable for the following reason. More specifically, according to the examination results of the present inventors, the hand vibration amount generated upon photographing a still object in a hand-held state falls in the range from ±0.30 to a maximum of about 0.5° in the optical axis angle. On the contrary, when the camera is panned, a use angle range considerably larger than the optical axis correction angle required for removing the influence of the hand vibration on a still object must be assigned to assure a movable region sufficient for panning control, so as to naturally drive the variable apex angle prism. If such a region is not assured, the inclination of the variable apex angle prism reaches the use angle range end upon panning, and a user experiences limited movement of on the frame at the end. However, if a large use angle range is set in advance, a low-frequency, large-amplitude vibration often remains unremoved after normal hand vibration correction. Such an error often occurs depending on the characteristics of the vibration detection sensor, the characteristics of a filter for the output from the vibration detection sensor, and the like.

In an actual photographing operation, the panning operation is normally used in the range from the focal length at the wide-angle end to the focal length at the middle position. However, the panning operation is rarely used at the telephoto end (maximum focal length) (400 mm or equivalent in the 35-mm format of a film camera although it depends on its numerical value).

Based on the above-mentioned facts, in general, when the maximum apex angle range at the telephoto end is set to be a range (e.g., 1°) which does not cause insufficient correction even if it is limited like in the present invention, camera vibration prevention can be sufficiently performed upon photographing of a still object in a still state, and a residual low-frequency, large-amplitude vibration of the frame can be eliminated even if a user slightly experiences a feeling of limited frame movement upon panning. As a result, the total vibration prevention performance can be preferably improved.

When a large angle is required in vibration correction in a special case (e.g., a photographing operation on a vehicle or ship), a photographer may manually set the vibration angle, as in an embodiment to be described later.

Figure 5:
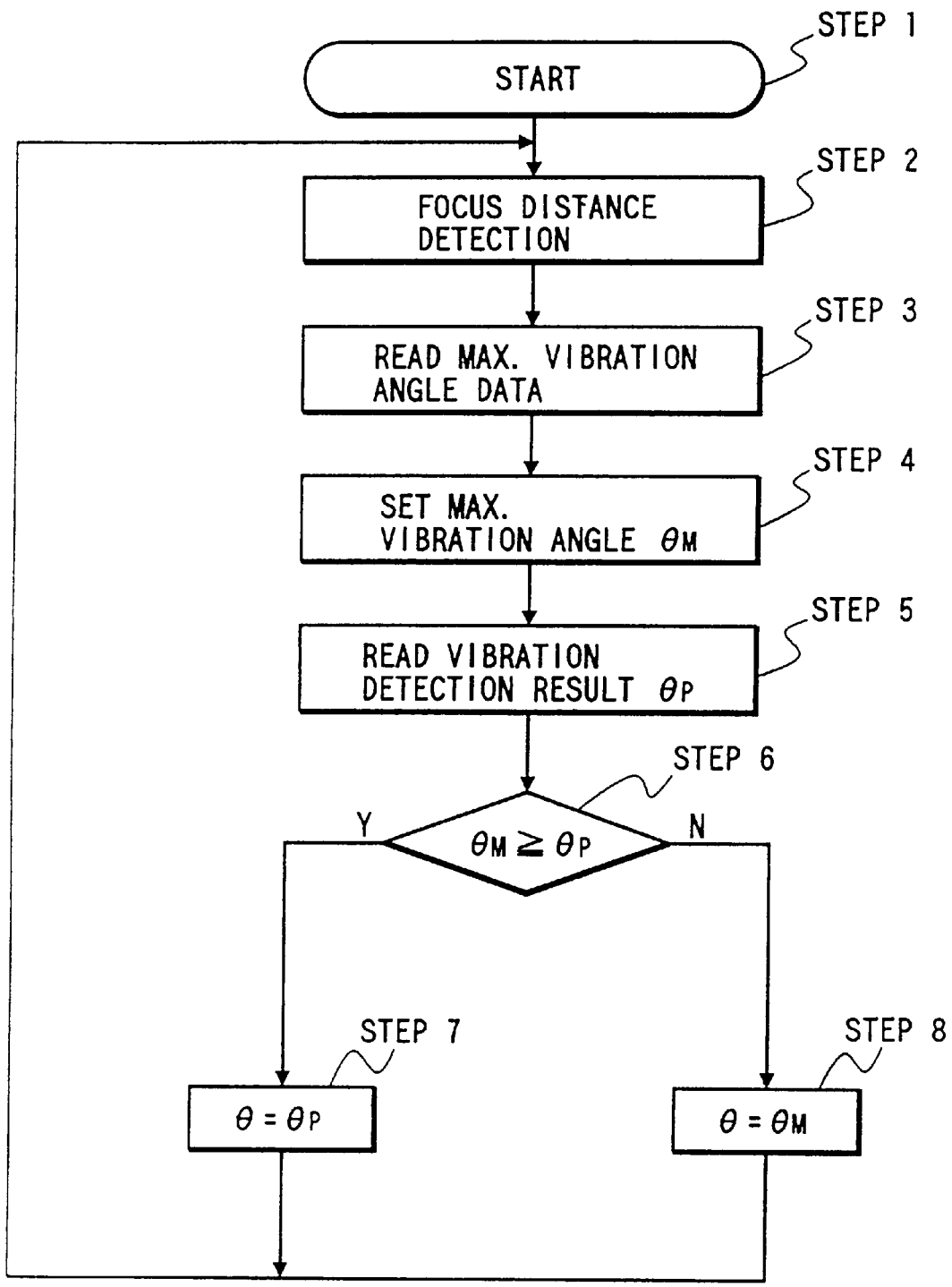
FIG. 5 is a flow chart showing the operation of the apparatus according to the first embodiment of the present invention.

FIG. 5 is a flow chart showing the target apex angle setting processing of a microcomputer 45 in the first embodiment.

The control starts in step 1. In step 2, the microcomputer 45 reads the current focal length (focus distance) information from the detection result of the focal length sensor 1. In step 3, the microcomputer 45 reads out a maximum vibration angle corresponding to the current focal length from the table of the maximum vibration angle (apex angle) data 2. In step 4, the microcomputer 45 sets the readout value, $\theta_M$. In step 5, the microcomputer 45 reads the detection result of the vibration detection sensor as an apex angle for correcting the vibration, $\theta_P$. In step 6, the microcomputer 45 compares the two angles. As a result, if $\theta_P$ is smaller than $\theta_M$, the microcomputer sets $\theta_P$ as a target apex angle position $\theta$ in step 7. On the other hand, if $\theta_P$ is equal to or larger than $\theta_M$ in step 6, the microcomputer 45 sets $\theta_M$ as a target apex angle position $\theta$ in step 8.

According to the control apparatus for image blur prevention according to the first embodiment of the present invention, since the operation range of image blur prevention means is narrowed as the focal length increases, an increase in degree of generation of aberrations can be suppressed even when the influence of aberrations increases as the focal length increases, thus preventing deterioration of an image. Note that the same effect can be expected in the second to sixth embodiments to be described below.

(Second Embodiment)

In the first embodiment, the use maximum apex angle (vibration) angle changes on the basis of the focal length information. The second embodiment of the present invention provides a vibration prevention apparatus with higher performance by changing not only the use maximum apex angle but also a threshold value associated with the angle used in control or coefficients relating the output from vibration detection means and the apex angle displacement amount.

Figure 6:
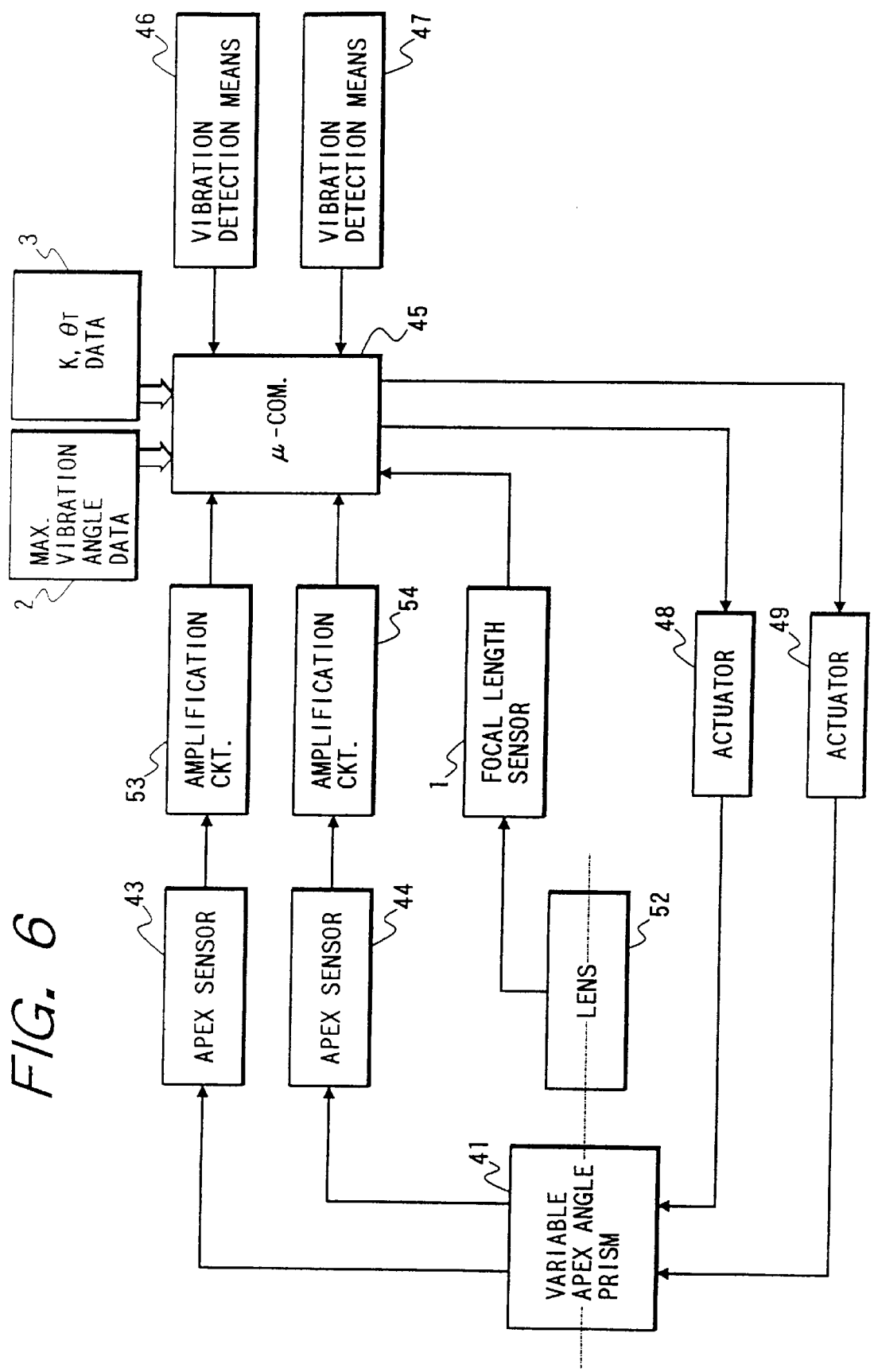
FIG. 6 is a block diagram showing the arrangement of principal part of an apparatus according to the second embodiment of the present invention.

FIG. 6 is a block diagram showing the arrangement of principal part of the second embodiment. This arrangement has K and $\theta_T$ data 3 in addition to the arrangement in the first embodiment, and achieves a more natural vibration prevention apparatus by varying values K and $\theta_T$ as coefficients relating the output from the vibration detection means and the apex angle displacement amount in combination with the maximum vibration angle in accordance with the detection result of the focal length. In FIG. 6, a description of the same arrangement as in FIG. 1 will be omitted.

Figures 7, 8:
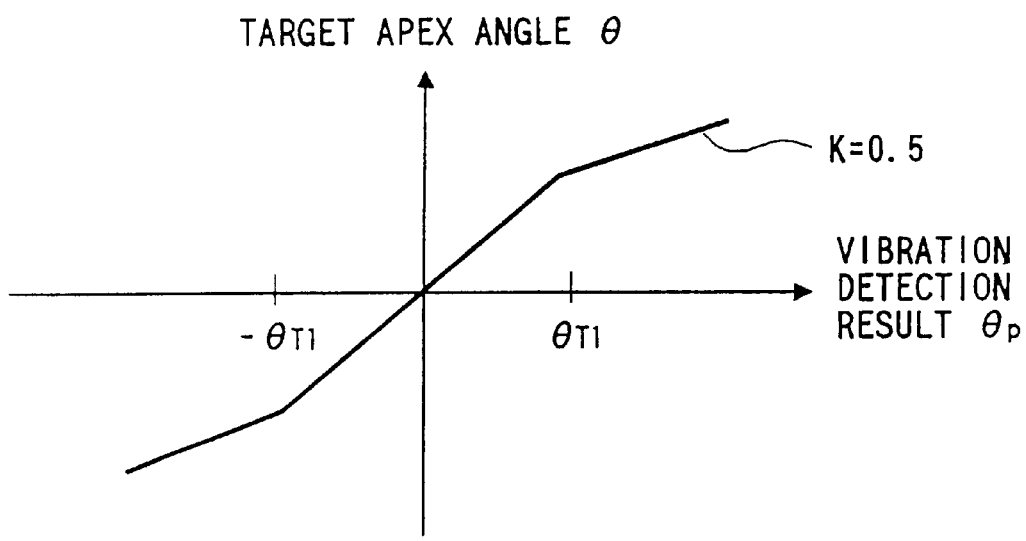
FIG. 7 is a graph showing the target apex angle of conventional vibration correction means.
FIG. 8 is a table showing examples of respective coefficients set in the apparatus according to the second embodiment of the present invention.

The value K will be explained below with reference to FIG. 7. Referring to FIG. 7, the abscissa represents a change in angle of the photographing optical axis upon driving of the variable apex angle prism or the correction optical system (0° is the reference position). As described above, when a still object is to be photographed in a still state, vibration correction can be attained if a correction angle range of ±1° is assured. On the contrary, when the vibration detection means detects a large vibration angle due to, e.g., panning, if the vibration is completely corrected, a still object may be photographed even by panning a camera at the beginning of the panning, or an image may be recorded as if panning were continued even after the panning operation of the camera is stopped.

Therefore, for such a large-amplitude vibration, a microcomputer 45 does not set a target position in correspondence with the detection result of the vibration detection means, but normally re-sets it to be a smaller target position. Various methods for setting a smaller target position are available. For example, when the detection result of the vibration detection means is represented by $\theta_P$ and the target position is represented by $\theta$, after $\theta_{T1}$ as a threshold angle and the coefficient K are set, a target apex angle (vibration angle) is set by the following calculation (when respective values are positive):
When $$\theta_P \leq \theta_{T1}, \theta = \theta_P$$

When $$\theta_{T1} < \theta_P < \theta_M, \theta = \theta_{T1} + (\theta_P - \theta_{T1}) \times K$$

Figure 9:
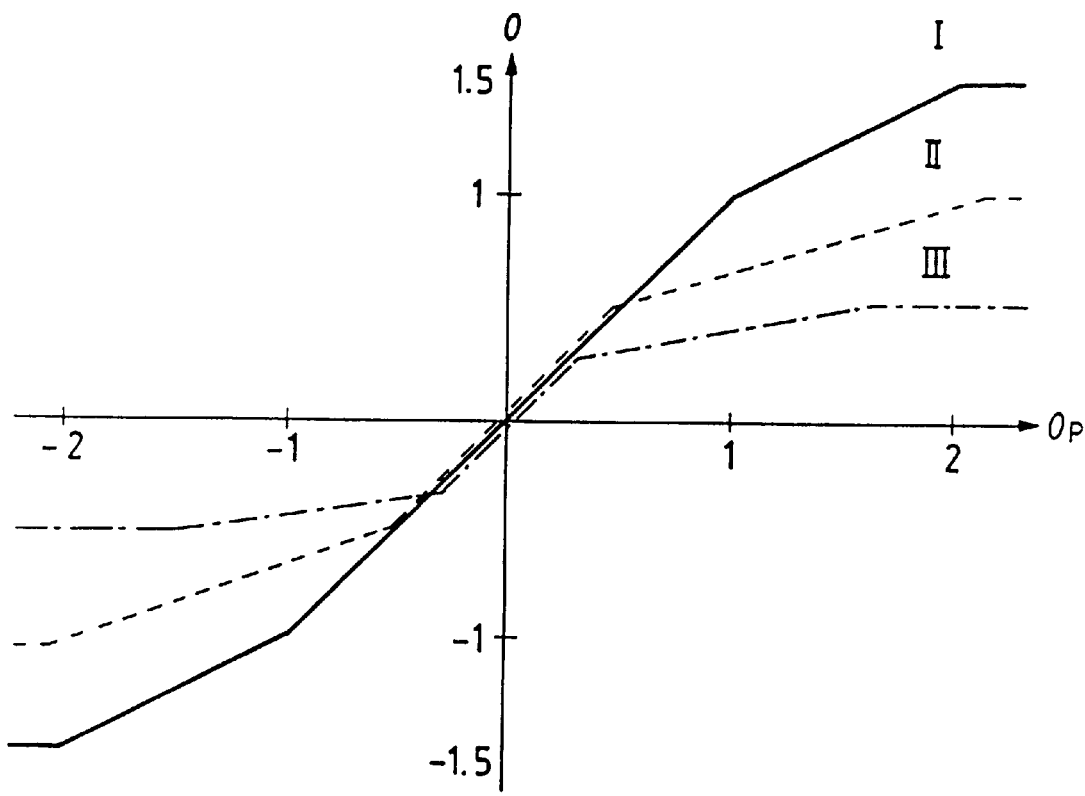
FIG. 9 is a graph showing the target apex angle in the apparatus according to the second embodiment of the present invention.

FIG. 7 shows the relationship between $\theta$ and $\theta_P$ in this case. A relatively small target apex angle (vibration angle) is set in a range wherein the amplitude absolute value is larger than the threshold angle $\theta_{T1}$. FIG. 8 shows practical setting values. In FIG. 8, the focal length range of a zoom lens system with the focal length range from $f_W$ to $f_T$ is divided into three regions I to III using intermediate focal lengths $f_{M1}$ and $f_{M2}$ (the range is preferably equally divided on a logarithmic graph). When the focal length falls within each region, the respective values shown in FIG. 8 are set. As a result, the relationship between $\theta$ and $\theta_P$ is as shown in FIG. 9. In FIG. 9, a solid curve represents the case of region I, a broken curve represents the case of region II, and a dashed curve represents the case of region III.

Figure 10:
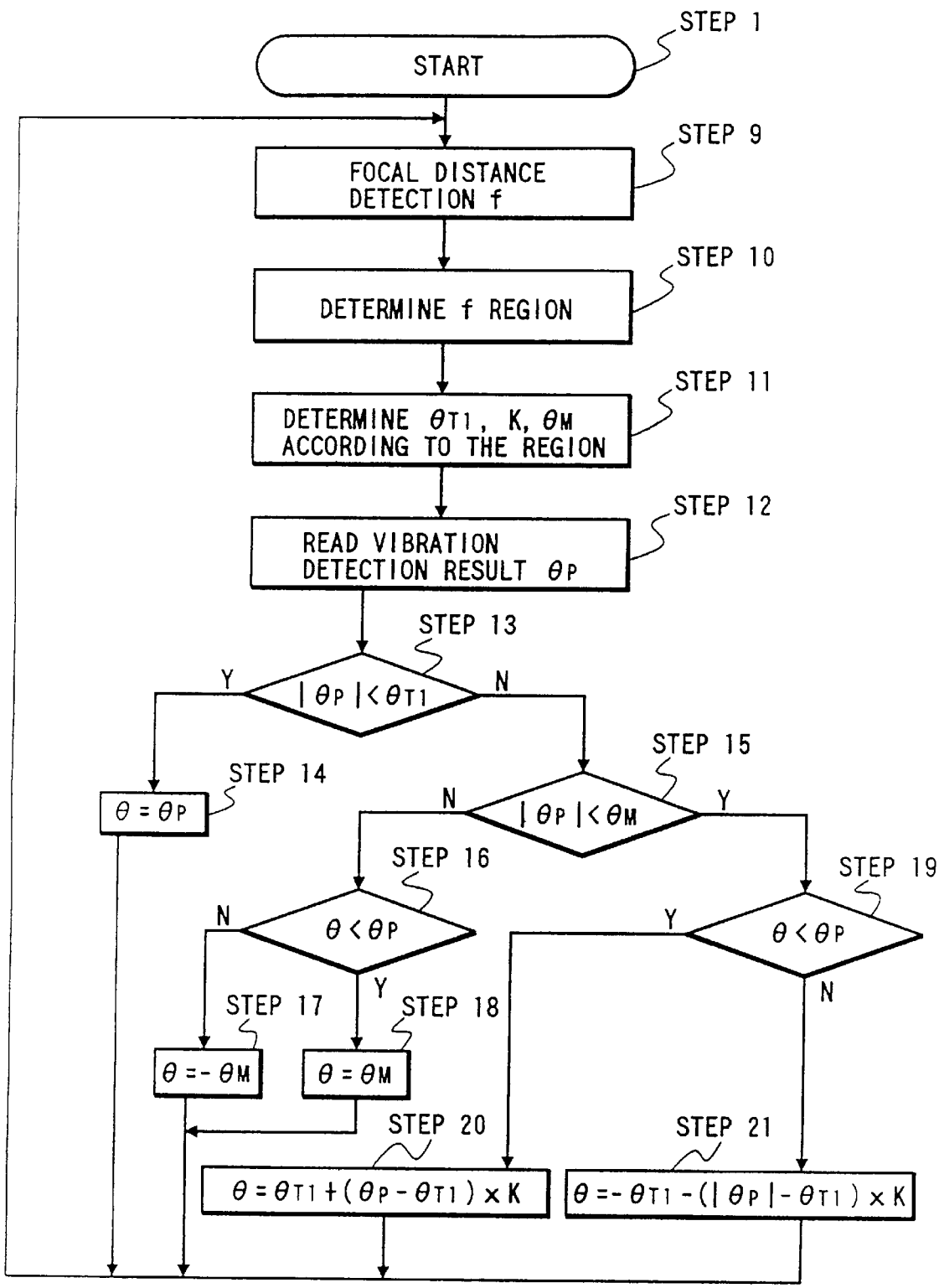
FIG. 10 is a flow chart showing the operation of the apparatus according to the second embodiment of the present invention.

FIG. 10 is a flow chart showing the operation of the microcomputer which performs the drive control operation of the variable apex angle prism in accordance with the characteristics shown in FIGS. 8 and 9. The control starts in step 1, and the focal length state is detected in step 9. In step 10, the microcomputer determines threshold values $\theta_{T1}$, K, and $\theta_M$ on the basis of information pre-stored therein, as shown in FIG. 8. In step 12, the microcomputer reads the value $\theta_P$ using the detection result of the vibration detection means as the dimension of the apex angle or vibration angle. In step 13, the microcomputer compares the absolute value of $\theta_P$ with $\theta_{T1}$. As a result, if the absolute value of $\theta_P$ is smaller than $\theta_{T1}$, $\theta_P$ is set as the target value $\theta$ in step 14. If $\theta_P$ is equal to or larger than $\theta_{T1}$, the microcomputer further compares the absolute value with $\theta_M$ in step 15. If the absolute value of $\theta_P$ is equal to or larger than $\theta_M$, the microcomputer checks in step 16 if $\theta_P$ is a positive value. If $\theta_P$ is a positive value, the microcomputer sets $\theta_M$ as $\theta$ in step 18; otherwise, the microcomputer sets $-\theta_M$ in step 17. On the other hand, if the absolute value $\theta_P$ is smaller than $\theta_M$ in step 15, the microcomputer checks in step 19 if $\theta_P$ is a positive value, and calculates the target position using one of the above-mentioned equations in step 20 or 21 in correspondence with the sign of $\theta_P$.

In this embodiment, the focal length range is divided into three regions, but may be divided into a larger number of regions or two regions. The number of threshold angles is not limited to one, but a plurality of threshold angles may be set, and the value K may be finely set in correspondence with these threshold angles. Furthermore, in place of the table for determining the coefficients and the threshold value, a formula relating the target angle $\theta$ and the vibration detection angle $\theta_P$ may be set, and the target apex angle (vibration angle) may be obtained by calculation.

In addition, the relationship between $\theta$ and $\theta_P$ is not limited to a linear one shown in FIG. 8, but various relationships may be used, as a matter of course.

(Third Embodiment)

In the first and second embodiments, by varying the maximum apex angle or the threshold value used in the control or the coefficients relating the output from the vibration detection means and the apex angle displacement amount in correspondence with the focal length, the color shift amount is suppressed to be equal to or smaller than a predetermined value, and practical vibration prevention performance is attained.

In the third embodiment of the present invention, whether or not a color shift stands out on an object is discriminated on the basis of the value of the focal point voltage of an automatic focus adjustment device using the high-frequency component of a video signal, and based on this information in place of focal length information or both this information and the above-mentioned focal length information, the maximum apex angle (vibration angle), or the threshold value used in the control or the above-mentioned coefficients are set as in the first and second embodiments.

Figure 11:
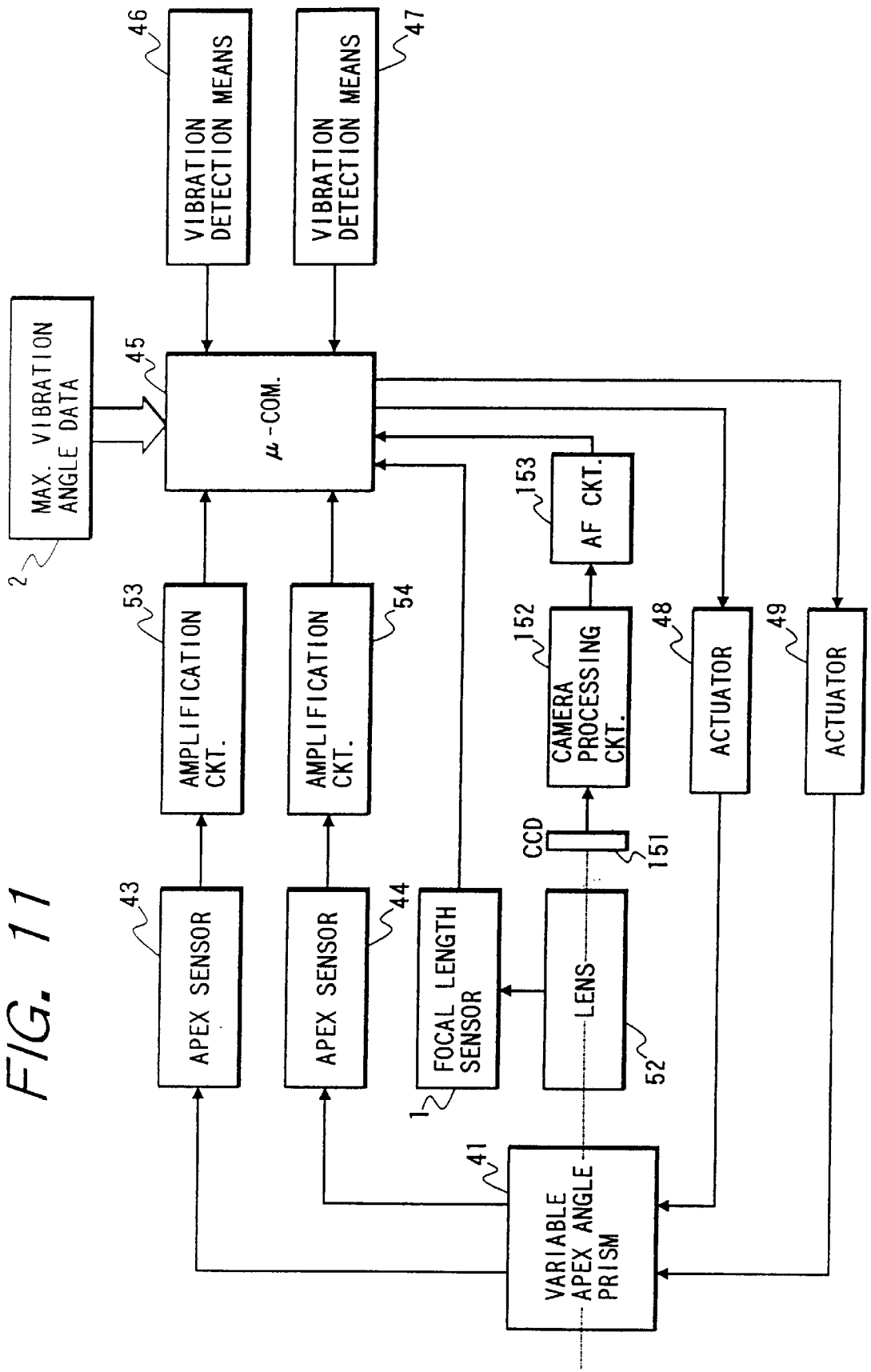
FIG. 11 is a block diagram showing the arrangement of principal part of an apparatus according to the third embodiment of the present invention.

FIG. 11 is a block diagram showing the arrangement of principal part of the third embodiment. In FIG. 11, a description of the same arrangement as in FIG. 1 will be omitted. Image information formed on a CCD 151 is processed to a predetermined TV signal (e.g., an NTSC signal in Japan) by a camera processing circuit 152. Of the TV signal, a Y signal corresponding to the luminance is supplied to an AF circuit 153, and the high-frequency component of the Y signal is detected as a focal point voltage. The focal point voltage will be explained below with reference to FIGS. 12A to 12C.

In FIG. 12A, an object has a black portion 272 and the remaining white portion, and in this case, a Y signal 273 is detected from a signal pickup area 271 for automatic focus detection, as shown in FIG. 12B. A signal 274 in FIG. 12C is obtained by differentiating the signal 273, and the peak height, $V_F$, of this signal corresponds to the focal point voltage.

In general, a color shift stands out at a black-and-white edge, i.e., on an object with a high contrast. Therefore, a microcomputer 45 sets a given threshold value for the focal point voltage. When a focal point voltage exceeding the threshold value is obtained, the microcomputer determines an object with a high contrast. In this case, for example, even when the focal length falls within region I in FIG. 8, generation of a color shift can be suppressed by changing the setting values to those for region III.

FIG. 13 shows an example of this selection table. In FIG. 13, the combinations of the values for regions I to III shown in FIG. 8 are selected on the basis of both the focal length and the contrast state determined using the focal point voltage.

The contrast detection may be attained by various other methods in addition to the above-mentioned method using the focal point voltage of the automatic focus adjustment device. For example, a bright object normally has a higher contrast than a dark object. Thus, the contrast state may be roughly determined based on aperture information.

Figure 14:
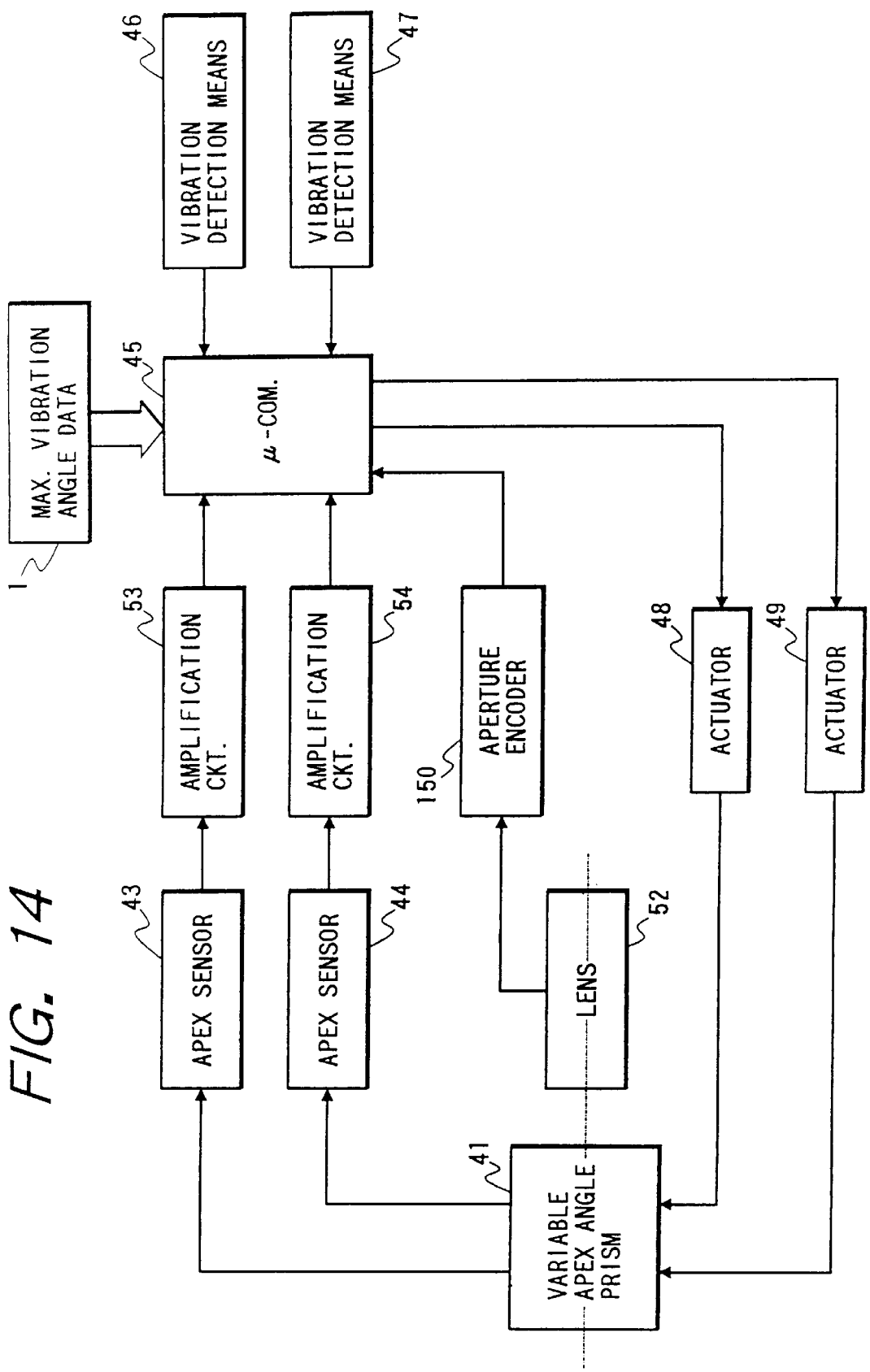
FIG. 14 is a block diagram showing the arrangement of principal part of an apparatus according to a modification of the third embodiment of the present invention.

FIG. 14 is a block diagram showing the arrangement for attaining this control, and a description of the same arrangement as in FIG. 1 will be omitted. In this arrangement, the detection result of an aperture encoder 150 is supplied to a microcomputer 45, and the maximum apex angle (vibration angle) is set on the basis of this information.

In FIG. 14, the focal length information and the focal point voltage information may also be used in decision. Each of FIGS. 11 and 14 illustrates only block 1 of maximum vibration angle data. In addition, block 3 of K and $\theta_T$ data in the second embodiment may be added.

According to the control apparatus for image blur prevention according to the third embodiment of the present invention, since a change in influence of aberrations depending on the focal length can be coped with, and the operation range of the image blur prevention means is changed in correspondence with the contrast of an image, even when the degree of influence of aberrations changes in correspondence with a change in contrast, the degree of influence can always be controlled to fall with an allowable range, thus preventing deterioration of an image.

(Fourth Embodiment)

The present invention controls the optical vibration correction means so as to prevent deterioration of image quality. In this case, whether or not a color shift influences image quality also depends on the recording format of, e.g., a video camera. As is well known, as the home-use video formats, the 8-mm format and the Hi8 format as the Hi-Band version of the 8-mm format, and the VHS format and the S-VHS format as the Hi-Band version of the VHS format are known. The influence of a color shift in the normal version stands out less than the Hi-Band version. Thus, in the fourth embodiment, whether or not the control changing operation described in the first to third embodiments is performed is switched in correspondence with the recording format.

Figure 15:
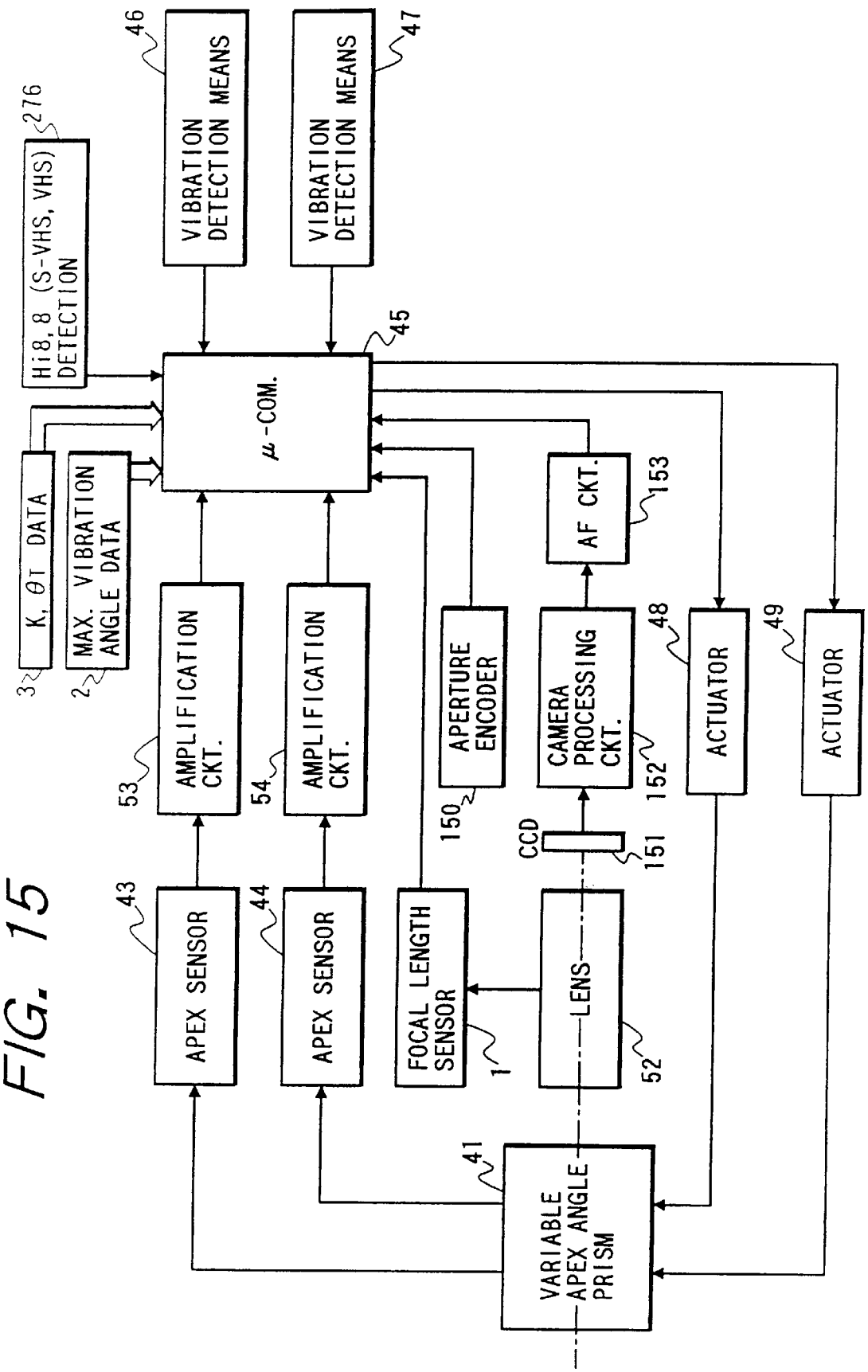
FIG. 15 is a block diagram showing the arrangement of principal part of an apparatus according to the fourth embodiment of the present invention.

FIG. 15 is a block diagram showing the arrangement of principal part of the fourth embodiment. In FIG. 15, a description of the same arrangement as in FIGS. 6, 11, and 14 will be omitted. In the arrangement in FIG. 15, block 276 detects the recording formation, and this information is supplied to a microcomputer 45.

Figure 16:
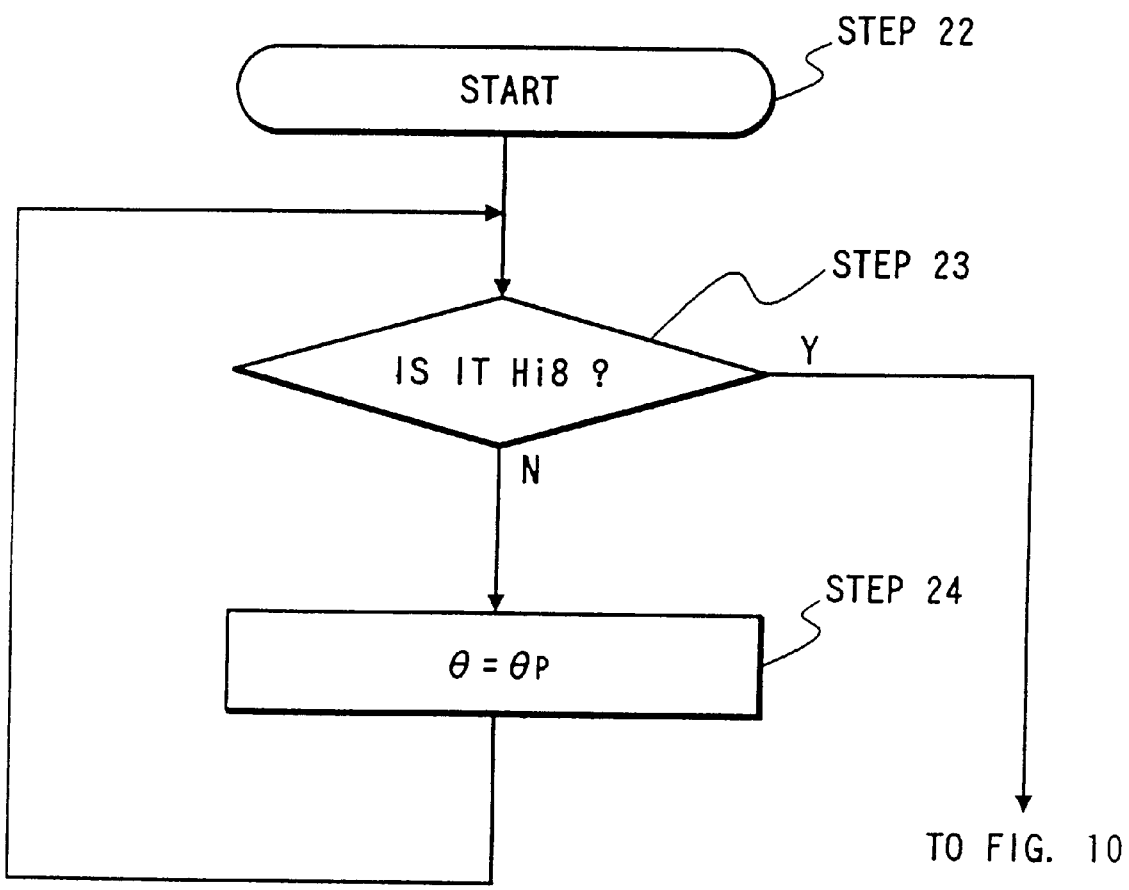
FIG. 16 is a flow chart showing the operation of the apparatus according to the fourth embodiment of the present invention.

FIG. 16 is a flow chart showing the processing for determining a target value. The control starts in step 22. In step 23, it is checked if the recording format is the 8-mm or Hi8 format in this embodiment. If the recording format is the 8-mm format, the control changing operation described in the first to third embodiments is not performed, and $\theta=\theta_P$ is set in step 24. If the recording format is the Hi8 format, the flow enters the flow chart shown in FIG. 10 in this case.

Note that FIG. 16 shows an example. For example, in the case of the standard format (8 mm or VHS), the combination of the values for region II shown in FIG. 8 may be used without being changed. Furthermore, the detection result of the recording format can be used together with the focal length, focal point voltage, and aperture value.

According to the control apparatus for image blur prevention according to the third embodiment of the present invention, since a change in influence of aberrations depending on the focal length can be coped with, and the operation range of the image blur prevention means is changed in correspondence with the resolution, even when the degree of influence of aberrations changes in correspondence with a change in resolution, the degree of influence can always be controlled to fall with an allowable range, thus preventing deterioration of an image.

(Fifth Embodiment)

In the fifth embodiment, the present invention is applied to, e.g., a video camera which digitally processes signals of a camera, and has an electronic enlargement function (a so-called electronic zoom function) as one of the digital signal processing functions. FIGS. 17A to 18B show the fifth embodiment.

Figure 17B:
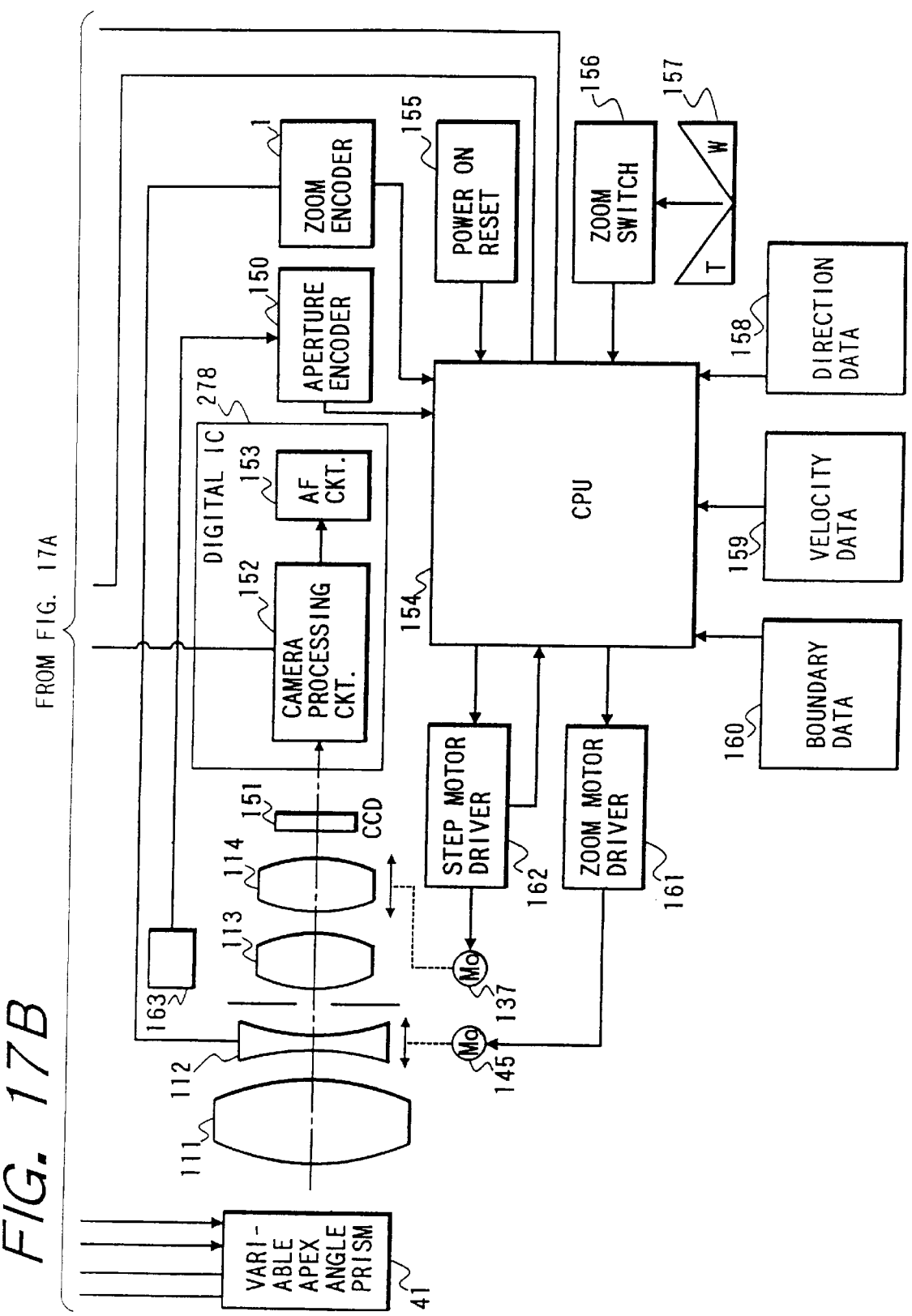
FIG. 17 which comprised of FIGS. 17A and 17B is a block diagram showing the arrangement of principal part of an apparatus according to each of the fifth and sixth embodiments of the present invention.

The same reference numerals in FIGS. 17A and 17B denote the same functions as in FIGS. 15 and FIGS. 17A and 17B. A digital signal processing circuit 278 for a camera includes an A/D conversion function, and incorporates an AF circuit. An IC 279 for digital effects performs enlargement processing for attaining electronic zooming, and other processing operations for obtaining various effects. A digital effect operation portion 280 is operated by a photographer, and is connected to a D/A converter 281.

In this case, information for selection, such as the maximum apex angle (vibration angle), K, $\theta_T$, or the like is supplied from a lens control CPU 154 to a microcomputer 45 for a vibration prevention apparatus. When a photographer operates an external operation key 157 for zooming, if he or she continues the operation in the telephoto direction although an optical system has already reached an optical telephoto end, a command is supplied to the IC for digital effects to operate in an electronic zoom region, and this information is also supplied from the CPU 154 to the microcomputer 45. The microcomputer 45 sets the value of the maximum apex angle, K, or $\theta_T$ based on these pieces of information.

Figure 18A:
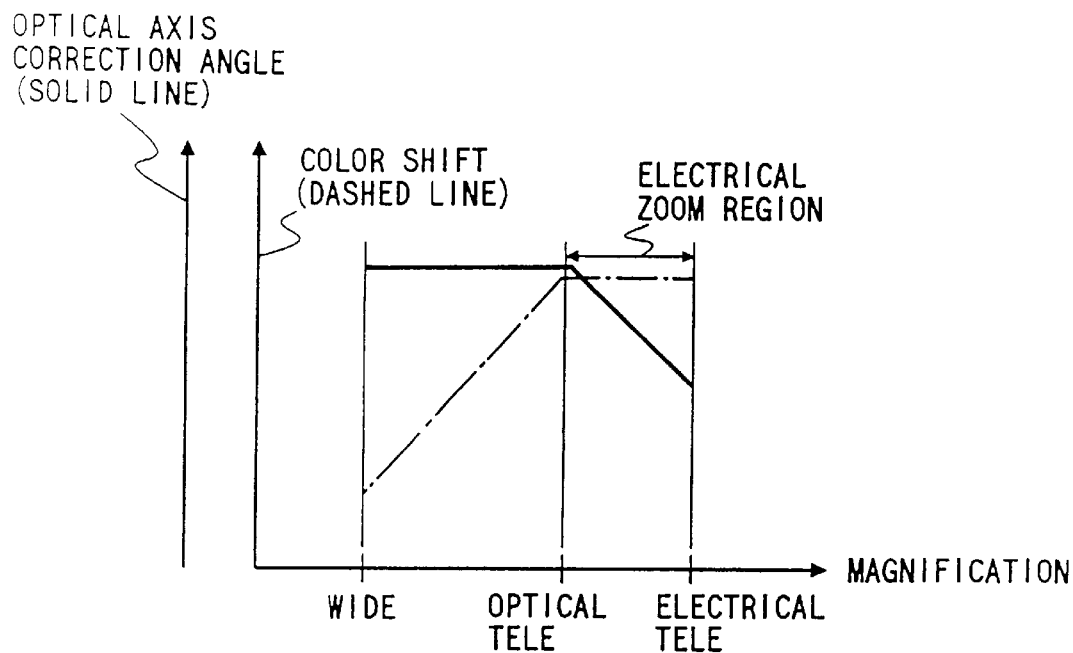
FIGS. 18A and 18B are graphs showing the relationship between the color shift and the focal length in the fifth embodiment of the present invention.
Figure 18B:
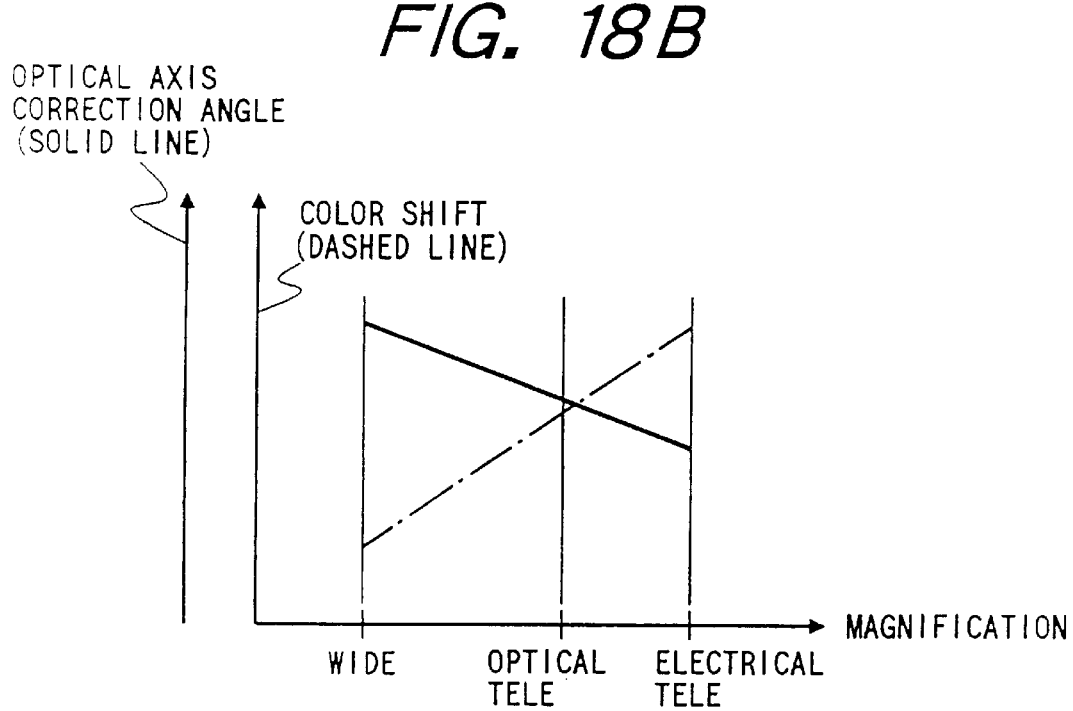
Figure 21:
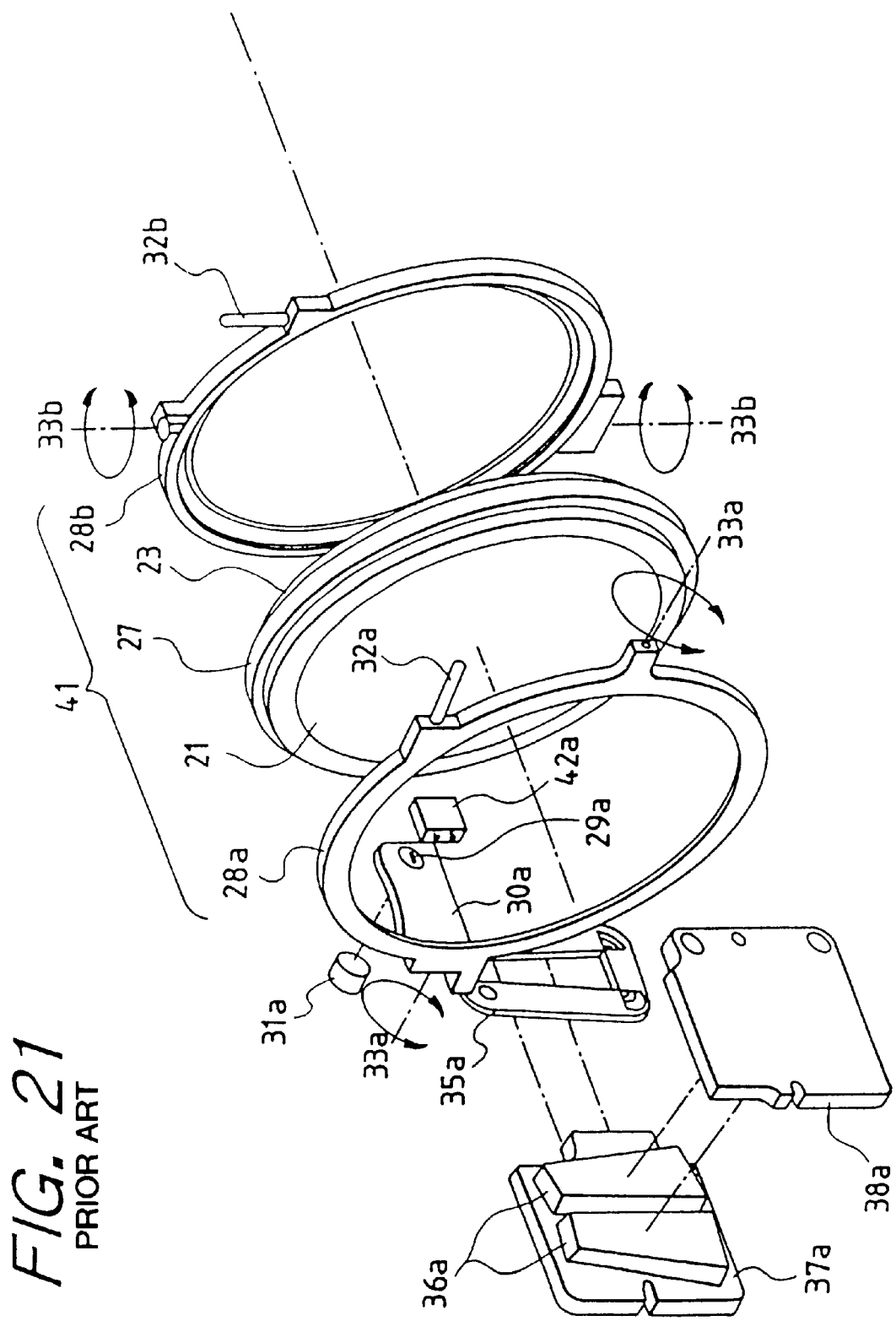
FIG. 21 is a perspective view showing a variable apex angle prism driving unit.
Figure 22:
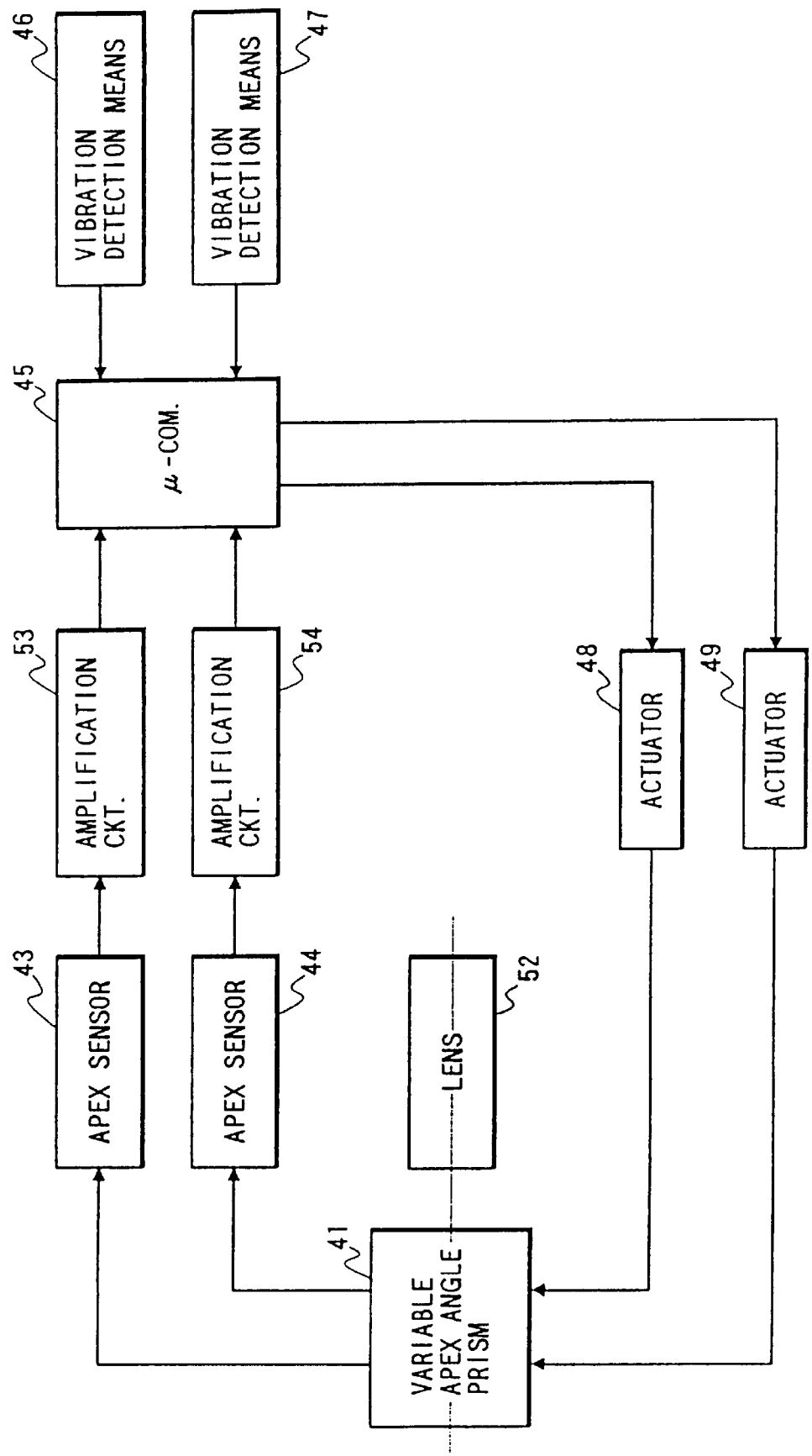
FIG. 22 is a block diagram showing the arrangement of principal part of an image blur prevention apparatus using the variable apex angle prism.
Figure 23:
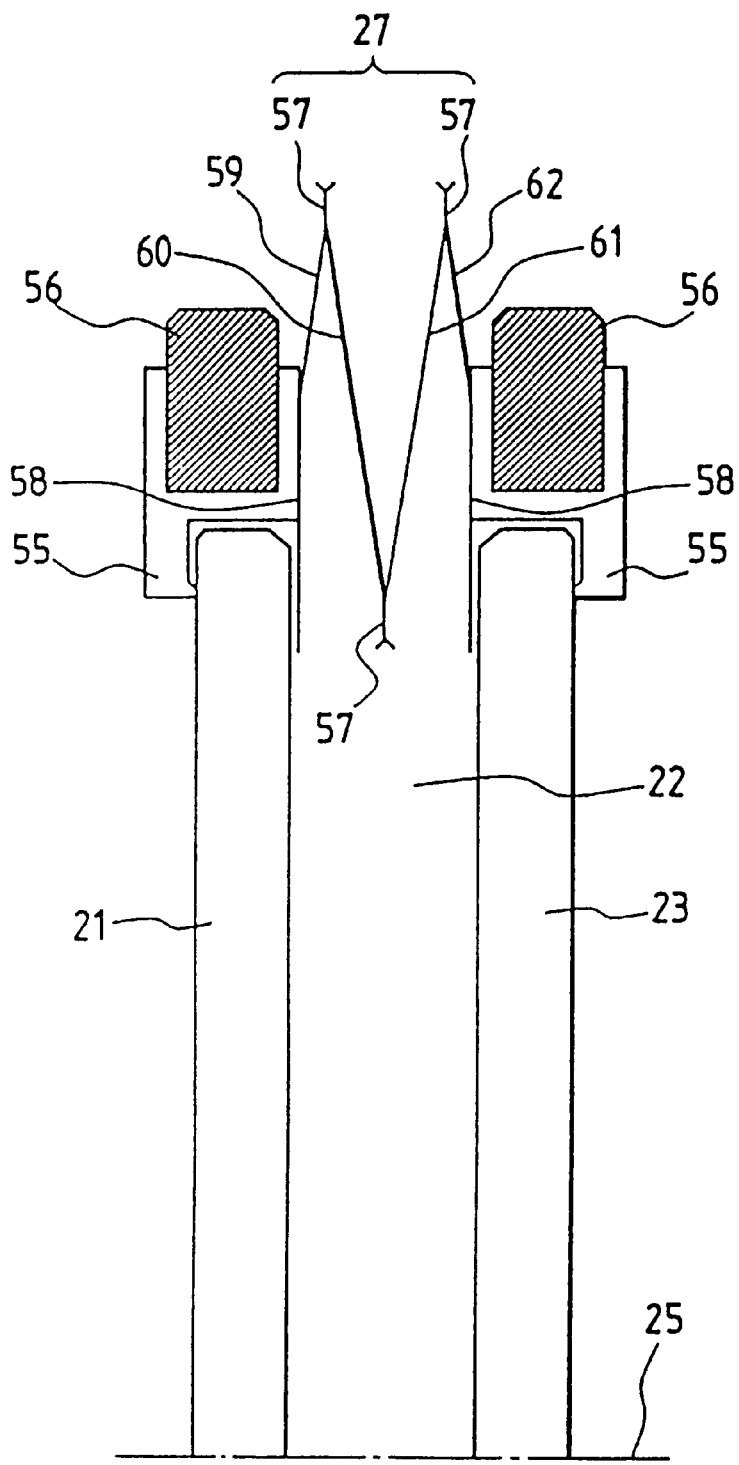
FIG. 23 is a sectional view of the variable apex angle prism.
Figure 24:
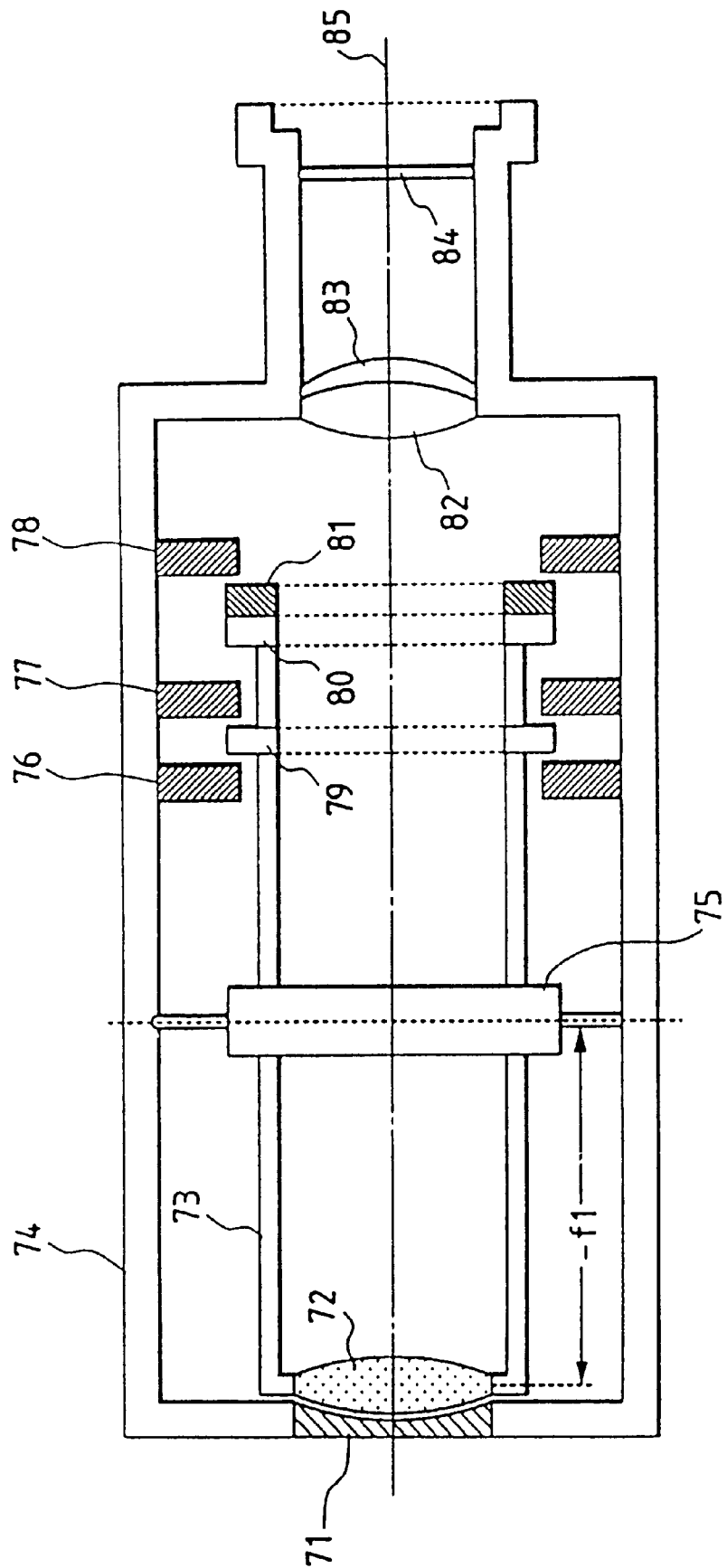
FIG. 24 is a view showing a lens system having a correction optical system.
Figure 25:
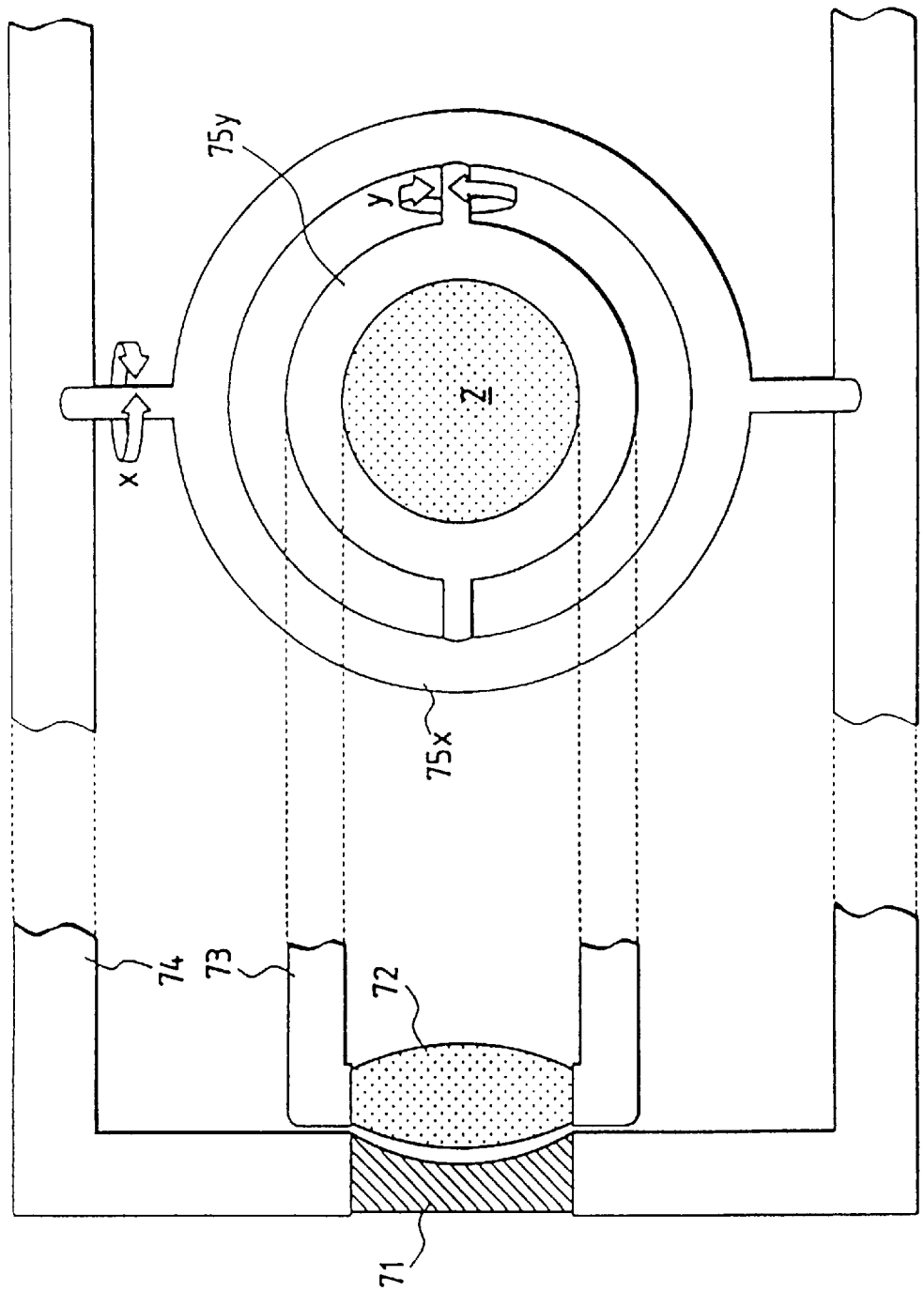
FIG. 25 is a view showing a gimbal support structure of the correction optical system.

FIGS. 18A and 18B show the maximum apex angle set when the camera contiguously has the electronic zoom region after the telephoto end of the optical zoom system. In FIG. 18A, the setting value of the maximum apex angle is varied when the electronic zoom region is reached, so that the influence of a color shift is suppressed to be equal to or smaller than a predetermined value.

In FIG. 18B, the setting value of the maximum apex angle (vibration angle) is slowly varied from the optical zoom region to the electronic zoom region.

According to the control apparatus for image blur prevention according to the fifth embodiment of the present invention, since a change in influence of aberrations depending on the focal length can be coped with, and the operation range of the image blur prevention means is changed in correspondence with the electronic processing state (e.g., electronic zooming) of an image, even when the degree of influence of aberrations changes in correspondence with a change in electronic processing state of an image, the degree of influence can always be controlled to fall with an allowable range, thus preventing deterioration of an image.

(Sixth Embodiment)

By varying various control values of the vibration prevention apparatus on the basis of various kinds of information such as the focal length, the influence of a color shift can be eliminated, and control corresponding to the focal length can be realized. However, in an actual photographing operation, a photographer may want to prevent a large-amplitude hand vibration even at the cost of a slight color shift.

For example, such an operation is required in a photographing operation on a ship.

In this case, the control changing operation executed in the fifth embodiment can be disabled by mode selection data 277 input by a photographer in FIG. 17A.

According to the present invention, the entire or partial arrangements of the claims or embodiments may be arranged in separate apparatuses. For example, the vibration detection apparatus may be arranged in a camera body, the vibration correction apparatus may be arranged in a lens barrel to be attached to the camera body, and a controller for controlling these apparatuses may be arranged in an intermediate adapter.

As the vibration prevention means, the present invention is not limited to means for directly preventing a vibration, but may be means for indirectly preventing generation of a vibration in such a manner that an alarm indicating that a vibration is actually generated or may be generated is generated by means of light, sound, or the like to call the user's attention.

The present invention is not particularly limited to the type of vibration detection means as long as a vibration can be detected. For example, an angular accelerometer, an accelerometer, an angular velocimeter, a velocimeter, an angular displacement meter, a displacement meter, a method of detecting the vibration itself of an image, and the like may be used.

The present invention is not particularly limited to the type of vibration detection means as long as a vibration can be prevented. For example, light beam changing means such as a shift optical system for moving an optical member in a plane perpendicular to the optical axis, a variable apex angle prism, means for moving the photographing surface in a plane perpendicular to the optical axis, means for correcting a vibration by image processing, and the like may be used.

The present invention may be applied to a case wherein the image blur prevention means such as the variable apex angle prism is arranged in an exchangeable lens which can be attached to both a silver halide camera and a video camera. In this case, when this exchangeable lens is attached to the video camera, the operation range of the image blur prevention means may be set to be larger than that for the silver halide camera.

More specifically, since the image surface (CCD) of the video camera is normally smaller than that of the silver halide camera, a region where aberrations must be taken into account becomes small accordingly, and the image blur prevention means can be displaced more largely. In the above-mentioned example, the operation range is varied by utilizing this fact, and image blur prevention is performed in a wide range if it is possible to perform. In addition, since the video camera generally has a wider allowable range with respect to deterioration of optical performance than the silver halide camera, the above-mentioned arrangement is preferable.

(Seventh Embodiment)

Figure 33:
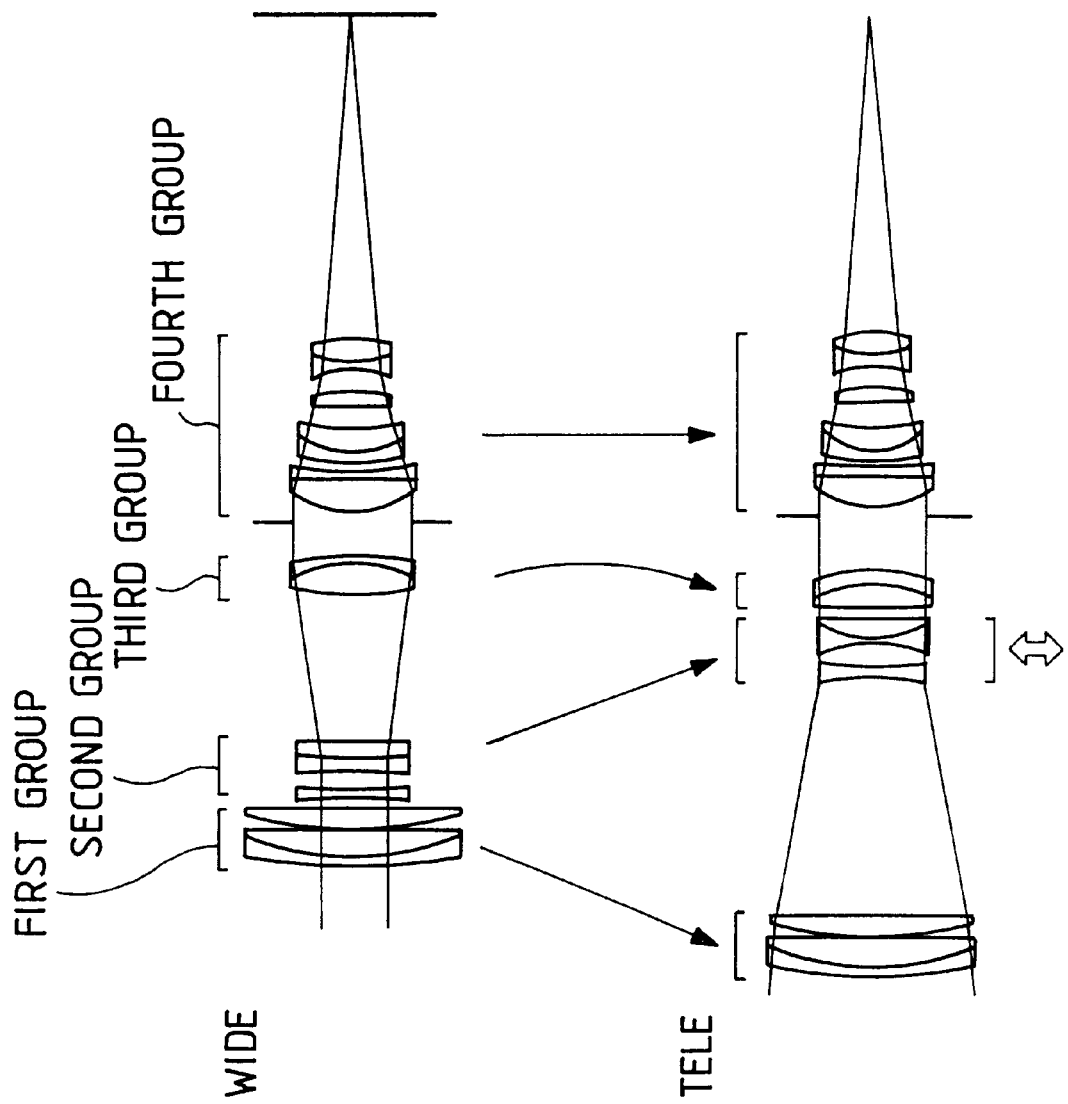
FIGS. 33A and 33B are views showing a camera imaging optical system according to each embodiment of the present invention.
Figure 34:
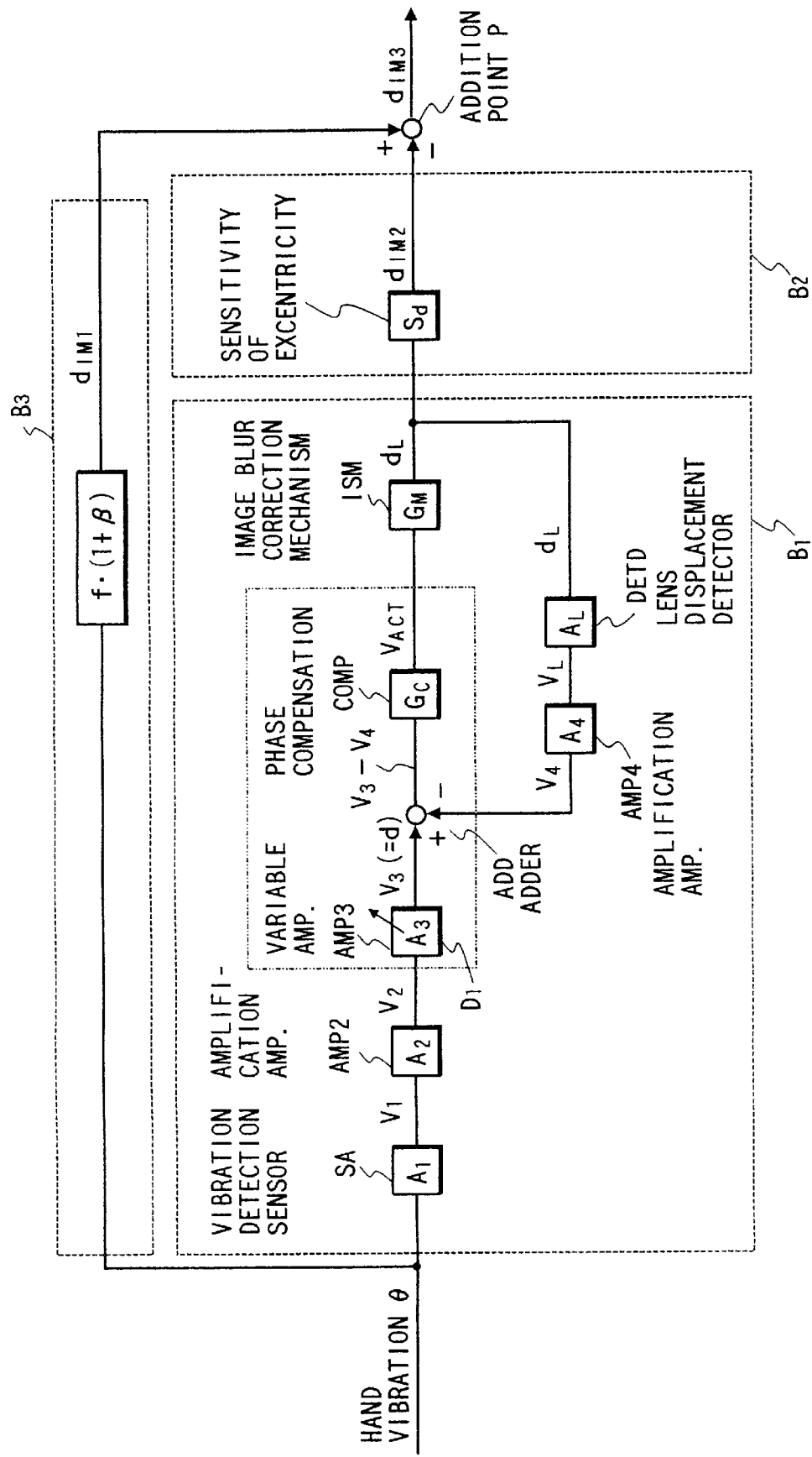
FIG. 34 is a block diagram showing a camera image blur correction system according to each embodiment of the present invention.

FIGS. 33A, 33B, and 34 are views for explaining the principle of image blur correction by an image blur correction system according to each embodiment.

FIGS. 33A and 33B show an example of an imaging optical system used in each embodiment of the present invention, in which the focal length is a 3× zoom of 35 mm to 105 mm, FIG. 33A shows a lens arrangement at a wide-angle end (f=35 mm), and FIG. 33B shows a lens arrangement at a telephoto end (f=105 mm).

This imaging optical system is constituted by four groups. In zooming, the fourth group is fixed, and the first, second, and third groups are moved; in focus adjustment, the first group is moved. The second group is displaced in a direction perpendicular to the optical axis, thereby displacing an image on an imaging surface and correcting an image blur.

The principle of image blur correction will be explained below.

When an angular vibration of θ [rad] is generated about the front-side principal point in the imaging optical system, an image displacement amount $d_{IM1}$ is given by $$d_{IM1} = f(1+\beta) \cdot \theta \quad (1)$$

where f is the focal length of the imaging optical system, and β is the photographing magnification. On the other hand, assuming that the ratio of an image displacement amount $d_{IM2}$ to a displacement amount $d_L$ of the second group of the optical system in FIG. 33 is called the sensitivity of eccentricity $S_d$, the image displacement amount $d_{IM2}$ is given by $$d_{IM2} = S_d \cdot d_L \quad (2)$$

Since the sensitivity of eccentricity $S_d$ is the function of the focal length f and the photographing magnification β, it can be expressed by $$S_d = S_d(f, \beta) \quad (3)$$

According to the principle of image blur correction, an image blur (equation (1)) generated by the angular vibration of the imaging optical system is canceled by image displacement (equation (2)) caused by lens displacement. Therefore, an image blur correction lens is driven in accordance with $d_L$ calculated by the following equation using (1)=(2) and (3):

$$d_L = (d_{IM1}/S_d) = \{f \cdot (1+\beta) \cdot \theta\} / \{S_d(f, \beta)\} \quad (4)$$

FIG. 34 is a block diagram showing this image blur correction function.

A vibration detection sensor SA with a sensitivity $A_1$ [V/rad] detects the hand vibration θ [rad] generated in a camera to output a detected vibration signal $V_1$ [V]. Since this signal is weak, it is amplified by an amplification amplifier AMP2 with a gain $A_2$ to be output as a signal $V_2$ [V].

A variable amplifier AMP3 is an amplifier for correcting image blur correction characteristics in accordance with f and β of the imaging optical system, and a gain $A_3$ of the variable amplifier AMP3 is expressed by, based on equation (4):

$$A_3 = a_3[\{f(1+\beta)\}/\{Sd(f, \beta)\}] \quad (5)$$

where $a_3$ is a predetermined coefficient determined by a lens. The output signal $V_3$ [V] from the variable amplifier AMP3 corresponds to a control command value d of the image vibration correction lens displacement d expressed by equation (4). A phase compensation circuit COMP gives a proper feedback gain to an image blur correction mechanism and realizes stabilization of a loop.

An output $V_{ACT}$ from the phase compensation circuit COMP is a driving voltage $V_{ACT}$ [V] to the actuator of an image blur correction mechanism ISM.

A transfer function $G_M$ is used for a system from the actuator in the image blur correction mechanism ISM to an image blur correction lens. The mechanism is driven and controlled to displace the image blur correction lens by $d_L$ [mm]. The lens displacement $d_L$ is detected by a lens displacement detector DETD with a sensitivity $A_L$ [V/mm], and the detected signal is output as an output $V_L$. The output $V_L$ is amplified by an amplification amplifier AMP4, and an output signal $V_4$ from the amplification amplifier AMP4 is inverted and input to an adder ADD.

The above loop forms a feedback loop in which the displacement $d_L$ of the image blur correction lens accurately follows the command value d.

The block from the hand vibration detection to the image blur correction lens control is surrounded by a dashed line $B_1$ in FIG. 34.

The image blur correction operation in the block $B_1$ results in the optical image movement $d_{IM2}$ in a block $B_2$.

To the contrary, an image blur generated by a hand vibration is expressed by the image blur amount $d_{IM1}$ in a block $B_3$. Therefore, the final image blur suppression effect at an addition point P is expressed by $$d_{IM3} = d_{IM1} - d_{IM2}$$

As $d_{IM3}$ is smaller, the image blur correction apparatus is more excellent.

A method of setting an electrical gain in the image blur correction apparatus will now be explained.

The image blur correction ability is represented by, for example, (1) the vibration correction resolution (high precision)
(2) the image blur correction range (wide range)
(3) the image blur correction frequency characteristics (wide band)

Particularly characteristics (1) and (2) contradict each other, and their balance is optimized in accordance with characteristics unique to the image blur correction apparatus, and particularly various optical data of a photographing system. For example, to increase the vibration correction resolution, the amplification amplifier AMP2 for the vibration detection sensor SA and the amplification amplifier AMP4 for a lens position detector EDTD must be increased in gain. Accordingly, a signal is easily saturated for a large hand vibration.

For this purpose, in a conventional apparatus, constants are set in accordance with characteristics unique to respective lenses such that constants are set with giving importance to the resolution in an image blur correction apparatus for a telephoto zoom lens constants are set with giving importance to the correction range in an image blur correction apparatus for a wide-angle zoom lens.

In such an image blur correction apparatus, however, the following problem arises when the image size of a photographing unit changes.

The optical system shown in FIGS. 33A and 33B has "f=35 to 105 mm". In a 135-silver halide format camera (to be referred to as a silver halide camera hereinafter) having a photographing unit 24 mm in length and 36 mm in width, its lens is a standard zoom lens. To the contrary, in a camera having a CCD with a light-receiving surface 6 mm in length and 9 mm in width (to be referred to as a digital camera), its lens is an apparent telephoto zoom lens having "f=140 to 420 mm". Therefore, the image blur correction control must be performed with a higher resolution in mounting the digital camera than in mounting the silver halide camera.

In a movie camera, only an image blur caused by a hand vibration is corrected. However, in a still camera and a single-lens reflex camera particularly having a quick return mirror and a focal-plane shutter, a camera vibration due to the mechanism must also be corrected.

Figure 32:
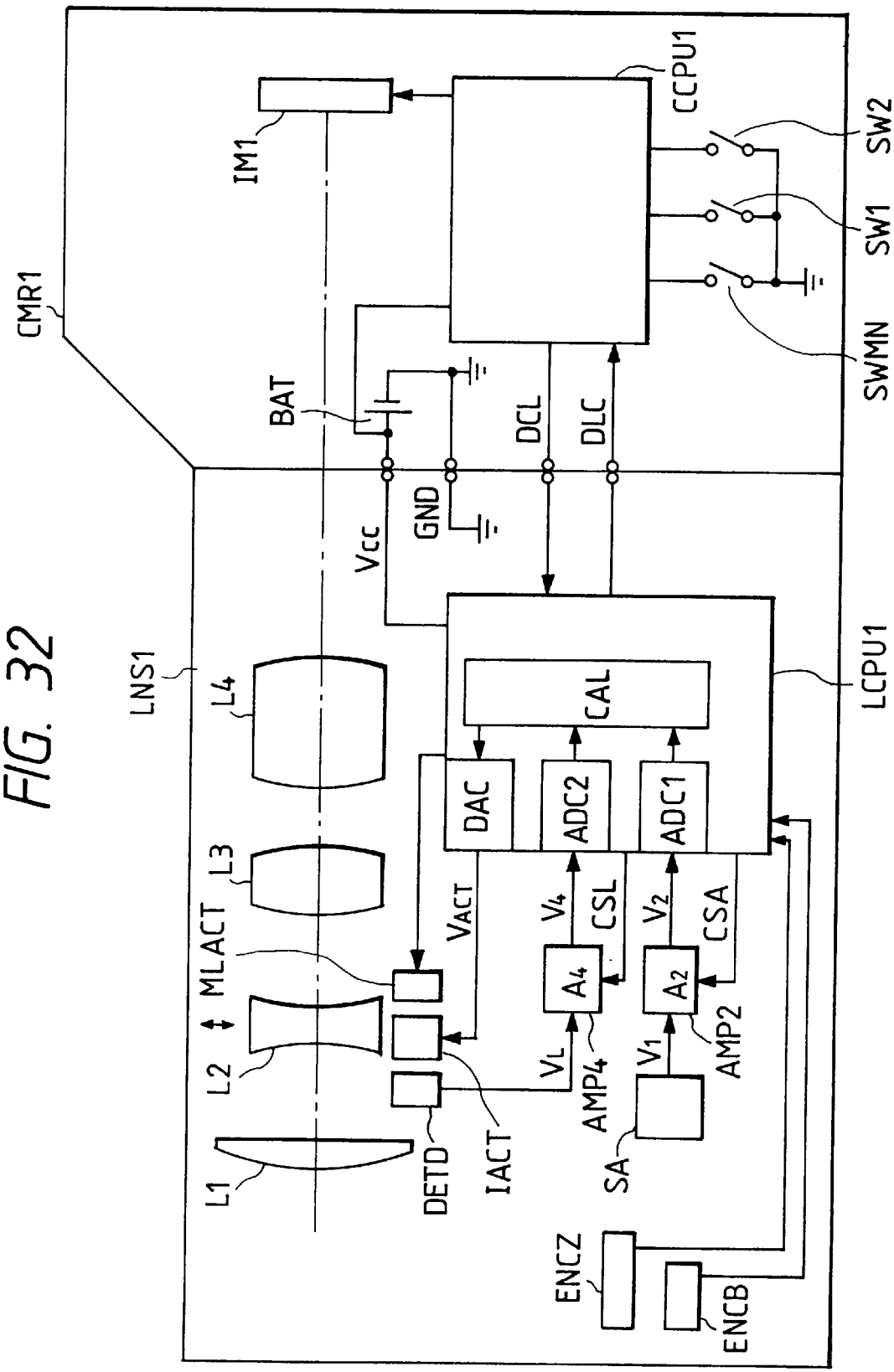
FIG. 32 is a block diagram showing the arrangement of a camera system according to the seventh embodiment of the present invention.

FIG. 32 is a block diagram showing a camera system according to the seventh embodiment of the present invention, which is constituted by any one of a plurality of camera main bodies and an exchangeable lens having an image blur correction apparatus. This camera system is a combination of an arbitrary camera body CMR1 and an exchangeable lens LNS1. The same reference numerals in FIG. 32 denote elements having the same functions as in FIG. 34.

The camera body CMR1 comprises an image recording unit IM1 constituted by a silver halide film or an image pickup element such as a CCD, and a microcomputer CCPU1 in the camera to control the exposure operation of the camera, a film wind operation, and the like.

Switches SW1 and SW2 are switches which are turned on by the first and second strokes of a release bottom (not shown) and are triggers for starting an image blur correction operation and controlling an exposure operation. A power supply switch SWMN is provided to the camera.

A power supply BAT includes a DC/DC converter, and supplies power of a reference potential $V_{cc}$ to the camera body CMR1, and a circuit and an actuator in the exchangeable lens LNS1.

Next, the exchangeable lens LNS1 will be described.

The optical system of the exchangeable lens LNS1 is constituted by four lens groups L1 to L4 corresponding to the four groups shown in FIGS. 33A and 33B. L1, L2, and L3 are moved forward or backward in the optical axis direction with a predetermined relationship to perform zooming, and L1 is moved forward or backward to perform focusing.

Encoders ENCZ and CNCB detect the zoom position and the focus position, respectively. Each encoder is normally constituted by a gray code pattern and a detection brush.

The second group lens L2 is an image blur correction lens, which is supported to be two-dimensionally driven in a plane perpendicular to the optical axis, and is shifted and driven by an image blur correction actuator IACT. A displacement detector DETD detects the displacement amount $d_L$ of the image blur correction lens L2, and an output $V_L$ is input to an amplification amplifier AMP4. The amplification amplifier AMP4 has a predetermined gain $A_4$, as described in FIG. 34. However, in FIG. 32, the amplification amplifier AMP4 is a variable gain amplifier whose gain changed by a control signal CSL output from a microcomputer LCPU1 in the lens (to be described later).

A mechanical lock actuator MLACT drives a mechanical lock mechanism for locking the image blur correction lens L2 at the starting point (the center in a driving range) in a state other than an image blur correction operation.

A blur detection sensor SA such as an angular displacement meter outputs hand vibration angle displacement θ as an electrical signal $V_1$ to the amplification amplifier AMP2. The amplification amplifier AMP2 also has the predetermined gain $A_2$, as described in FIG. 34. However, in FIG. 32, the amplification amplifier AMP2 is a variable gain amplifier whose gain is changed by a control signal CSA output from the microcomputer LCPU1.

The microcomputer LCPU1 controls the image blur correction. The microcomputer LCPU1 has A/D converters ADC1 and ADC2 for converting analog output signals $V_2$ and $V_4$ respectively output from the above amplifiers AMP2 and AMP4 into digital signals. A calculation unit CAL calculates a lens control signal on the basis of these digital signals. The lens control signal is converted into an analog signal by a D/A converter DAC to be output as the analog signal to the image blur correction actuator IACT. That is, the calculation to be performed in the microcomputer LCPU1 is performed at a portion corresponding to the block $D_1$ surrounded by a chain-double dashed line in FIG. 34.

On the other hand, the camera CMR1 and the lens LNS1 are electrically connected at an engaging mount portion via two pairs of signal lines DCL and DLC and one pair of power supply lines VCC and a ground line GND. The lines DCL are lines used to communicate command data and the like from the camera body to the exchangeable lens. The lines DLC are lines used to communicate command data and the like from the exchangeable lens to the camera body. Power is supplied from the camera body to the microcomputer LCPU1, the actuator IACT, and the like in the exchangeable lens via the lines $V_{cc}$.

When a photographer operates the respective switches SWMN, SW1, and SW2 of the camera CMR1, the two microcomputers CCPU1 and LCPU1 communicate with each other to execute the image blur correction control in accordance with a control flow stored in the microcomputer LCPU1.

Figure 35:
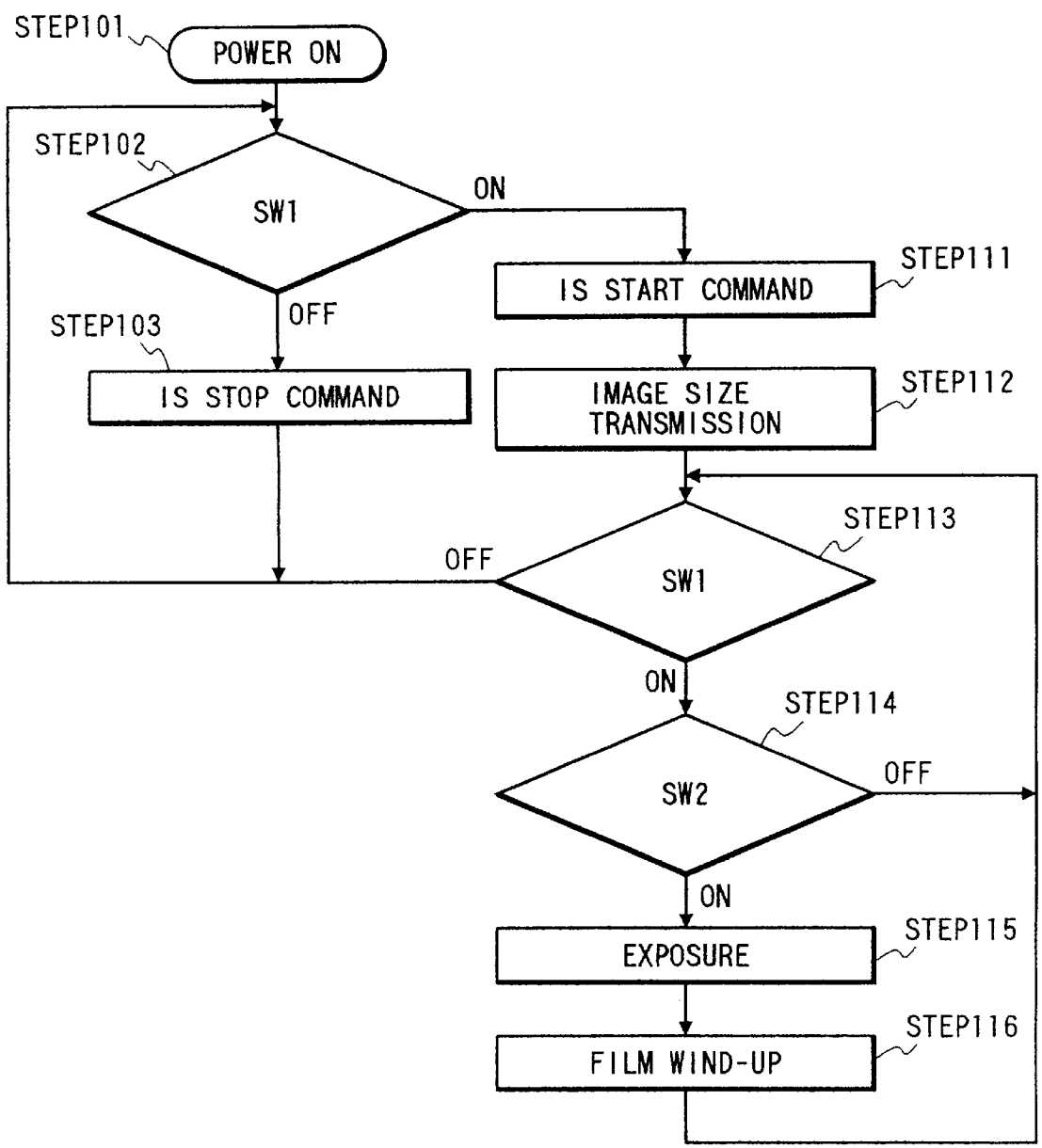
FIG. 35 is a flow chart showing the operation of a camera body side in the seventh embodiment of the present invention.
Figure 36:
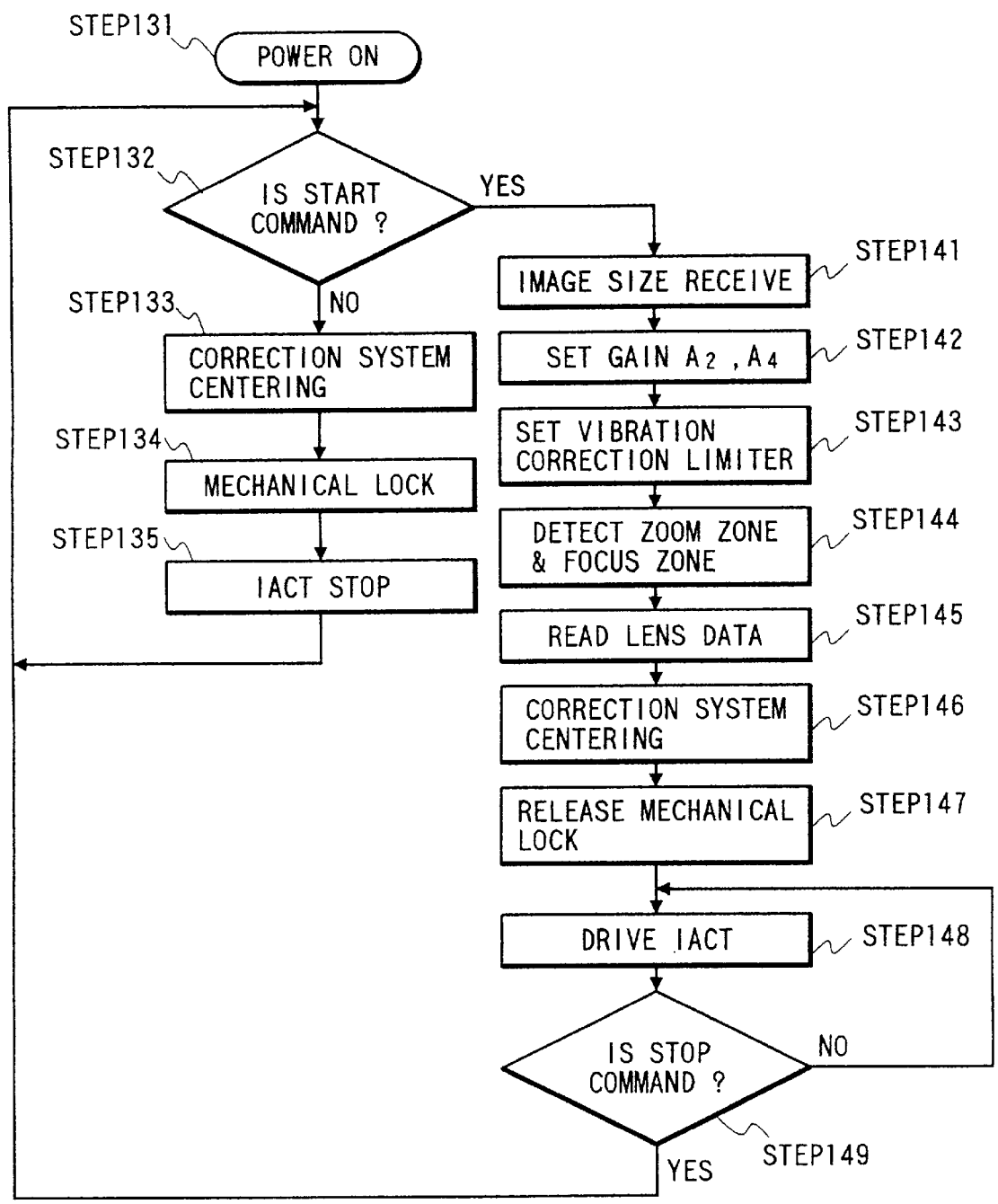
FIG. 36 is a flow chart showing the operation of an exchangeable lens side in the seventh embodiment of the present invention.

FIGS. 35 and 36 are flow charts showing the control operations of the respective microcomputers in the camera body and the exchangeable lens according to the seventh embodiment of the present invention.

First, the flow chart for controlling the microcomputer CCPU1 will be described with reference to FIG. 35.

When the power supply switch SWMN on the camera body CMR1 side is turned on, power is supplied to the microcomputer CCPU1 in step 101. The operation starts from step 102.

In step 102, the state of the switch SW1 which is turned on by the first-stage depression of the release button is detected, and if the switch SW1 is in an OFF state, the flow advances to step 103. In step 103, a command for stopping an image blur correction operation (to be referred to as an IS (Image Stabilization) hereinafter) is sent to the exchangeable lens LNS1 side.

The above steps 102 and 103 are repeatedly executed until the switch SW1 is turned on or the power supply switch is turned off.

When the switch SW1 is turned on, the flow shifts from step 102 to step 111.

In step 111, the microcomputer CCPU1 sends an IS start command to the microcomputer LCPU1 via the lines DCL. In step 112, data about the image size of the camera are sent by the same method. The flow advances to step 113 to detect the state of the switch SW1, and if the switch SW1 is turned off, the flow returns to step 102 and waits.

On the other hand, if the switch SW1 is in an ON state, the flow advances from step 113 to step 114 to detect the state of the switch SW2. If the switch SW2 is in the ON state, the flow advances to step 115 to control the exposure operation of a film and wind up the film in step 116. If the switch SW2 is in an OFF state, the flow returns to step 113.

FIG. 36 is a flow chart showing the control operation of the microcomputer LCPU1.

In FIG. 36, when power is supplied to the exchangeable lens side by turning on the power supply switch SWMN on the camera side, the flow advances from step 131 to step 132.

In step 132, the presence of the IS start command is checked, and if no IS start command is sent from the camera body CMR1, the flow advances to step 133. In step 133, a centering operation is performed as a preparatory operation for locking the image blur correction lens L2 at the starting point. In this case, the image blur correction actuator IACT is driven and controlled to electrically lock the image blur correction lens L2 at the starting point, e.g., the central position.

In step 134, the mechanical lock mechanism is operated in a lock direction, thereby mechanically locking the image blur correction lens L2 at the starting point. Note that an example of the mechanical lock mechanism is a mechanism disclosed in Japanese Laid-Open Patent Application No. 4-110835.

In step 135, the image blur correction actuator IACT is stopped. Note that, when the image blur correction operation has already been stopped, the above operation from steps 133 to 135 is ignored. When the IS start command is received from the microcomputer CCPU1 during execution of a subsequent operation from steps 132 to 135, the flow shifts from step 132 to step 141.

In step 141, the data about the image size is received from the camera body, which corresponds to step 112 in FIG. 35. In step 142, command signals for setting the gains $A_2$ and $A_4$ of the amplifiers AMP2 and AMP4 in FIG. 32 are output via the lines CSA and CSL in accordance with the image size data.

In step 143, a limiter for defining the image blur correction limitation, and the like are set. To change the gains of signals for controlling the vibration correction operation, the dynamic ranges of the signals are shifted, as described above. As a result, the maximum image blur correction range to be controlled, and the like change, so that the control parameters of the correction limitation limiter and the like must be changed.

In step 144, a zoom zone Z and a focus zone B are detected by the zoom encoder ENCZ and the focus encoder ENCB. In step 145, lens data are read out from a ROM table stored in the microcomputer LCPU1. The microcomputer LCPU1 stores the image blur correction characteristic value $A_3$ expressed by the above equation (5) as a ROM table value corresponding to each zone Z or B. Therefore, data corresponding to the zones Z and B detected in step 144 are read out.

In step 146, a centering operation is performed as a preparatory operation before releasing the mechanical lock of the image blur correction lens L2. This operation is for reducing a load generated by friction in the mechanical lock release operation of the next step and for preventing the correction lens from falling due to gravity after the lock release operation.

In step 147, the mechanical lock is released. In step 148, the image blur correction actuator IACT is driven and controlled in accordance with the signal $V_{ACT}$ in FIGS. 32 or 34 to correct the image blur. In step 149, it is checked whether the IS stop command is sent from the camera body. If YES, the flow shifts to step 132 to stop the image blur correction; if NO, the flow returns to step 148 to continue the image blur correction.

Both the flows in FIGS. 35 and 36 are generally described. When the switch SW1 is turned on, the microcomputer in the camera sends the IS start command and the information about the image size of the camera side to the microcomputer in the lens. Then, the microcomputer in the lens controls and changes the output signal gains of the vibration detection sensor SA and the position detection means for the image blur correction lens L2, the limiter for defining the image blur correction range, and the like, thereby correcting the image blur.

The seventh embodiment has the following effects:

1) the image blur correction precision can be changed in accordance with the image size;

2) the image blur correction range can be changed in accordance with the image size; and 3) the image blur correction precision and range can be optimized in accordance with the image size.

(Eighth Embodiment)

Figure 37:
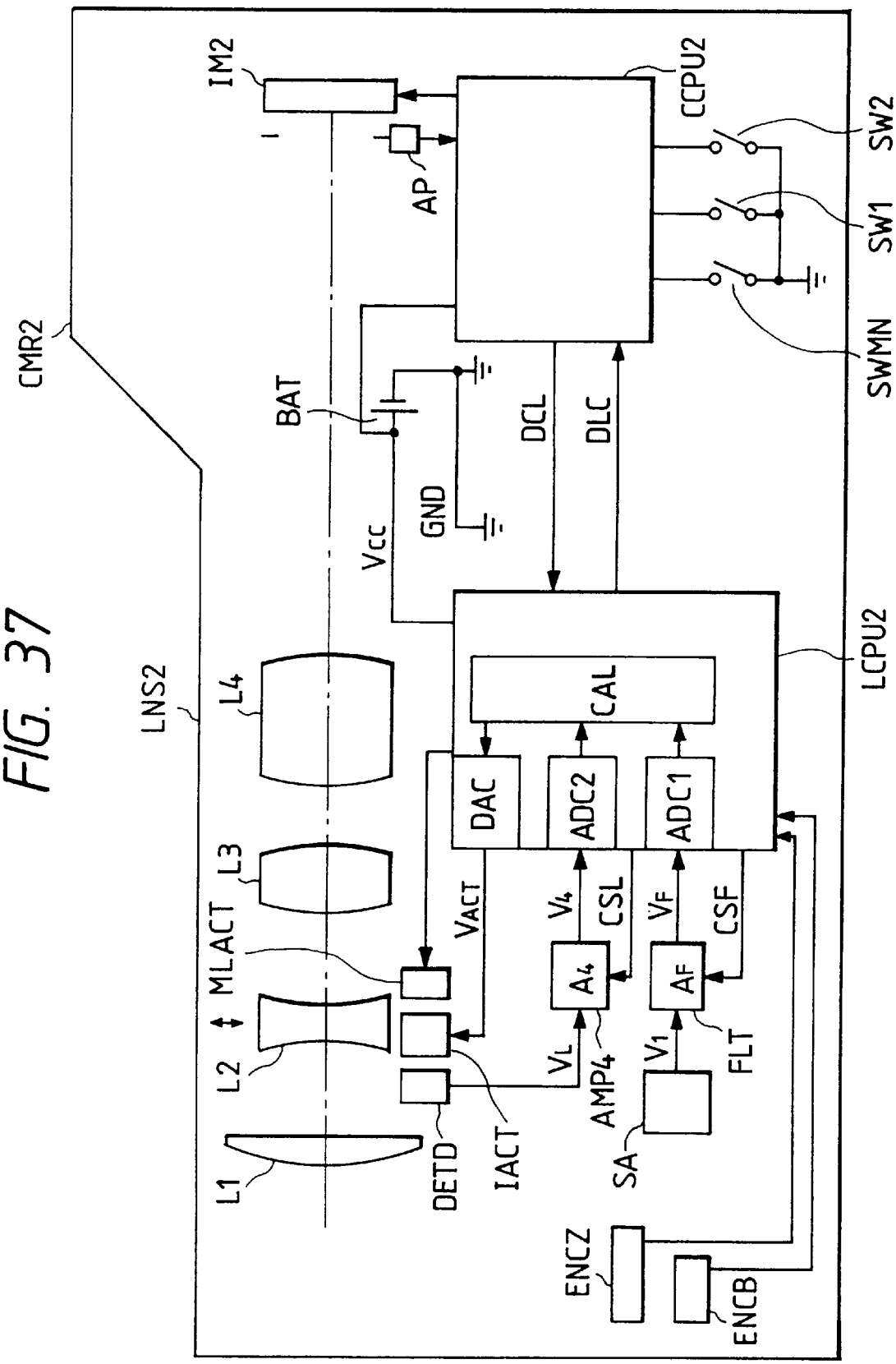
FIG. 37 is a block diagram showing the arrangement of a camera according to the eighth embodiment of the present invention.

FIG. 37 is a block diagram showing the arrangement of a camera according to the eighth embodiment of the present invention. The same reference numerals in FIG. 37 denote the same parts as in FIG. 32, and a detailed description of the same arrangement will be omitted.

The eighth embodiment in FIG. 37 is different from the seventh embodiment in that (1) this embodiment is based on a camera obtained by integrating a camera body portion CMR2 with a lens portion LNS2;

(2) the camera body portion CMR2 has image size switching means; and (3) the image blur correction frequency characteristics are changeable.

The camera body portion CMR2 will be explained first.

The camera body portion CMR2 comprises an image recording unit IM2 constituted by a silver halide film or an image pickup element, and switching means AP for switching the image size of the recording unit IM2. For example, when the image recording unit IM2 is a silver halide film, the switching means AP is constituted by an aperture size switching mask placed in front of the image recording unit IM2. To the contrary, when the image recording unit IM2 is an image pickup element, the switching means AP corresponds to an image signal trimming circuit arranged in a circuit for processing an image signal sent from the image pickup element, i.e., a circuit unit having a so-called electronic zoom function.

A microcomputer CCPU2 in the camera sends a signal corresponding to the state of the image size switching means AP to a microcomputer LCPU2 in the lens (to be described later).

The arrangement of the camera body portion CMR2 other than the above portion is the same as that in the seventh embodiment.

Next, the lens portion LNS2 will be described.

A hand vibration signal $V_1$ sent from a vibration detection sensor SA is input to a band variable filter FLT, and an output signal $V_F$ from the band variable filter FLT is input to an AD converter ADC1 of the microcomputer LCPU2. This filter FLT can switch a low cutoff frequency $f_L$ and a high cutoff frequency $f_H$ to $f_L{'}$ and $f_H{'}$, respectively. This characteristic switching operation is controlled by a control signal CSF sent from the microcomputer LCPU2. Note that the filter FLT may be constituted as a digital filter in the microcomputer in the lens, as a matter of course.

The arrangement of the lens portion LNS2 other than the above portion is the same as that in the seventh embodiment, and a description of the same arrangement will be omitted.

The microcomputers CCPU2 and LCPU2 communicate with each other via lines DCL and DLC.

The control flow of the camera in the eighth embodiment will be explained. Note that the flow of the microcomputer CCPU2 is the same as in the seventh embodiment of FIG. 35, and a description of the same flow will be omitted.

Figure 39:
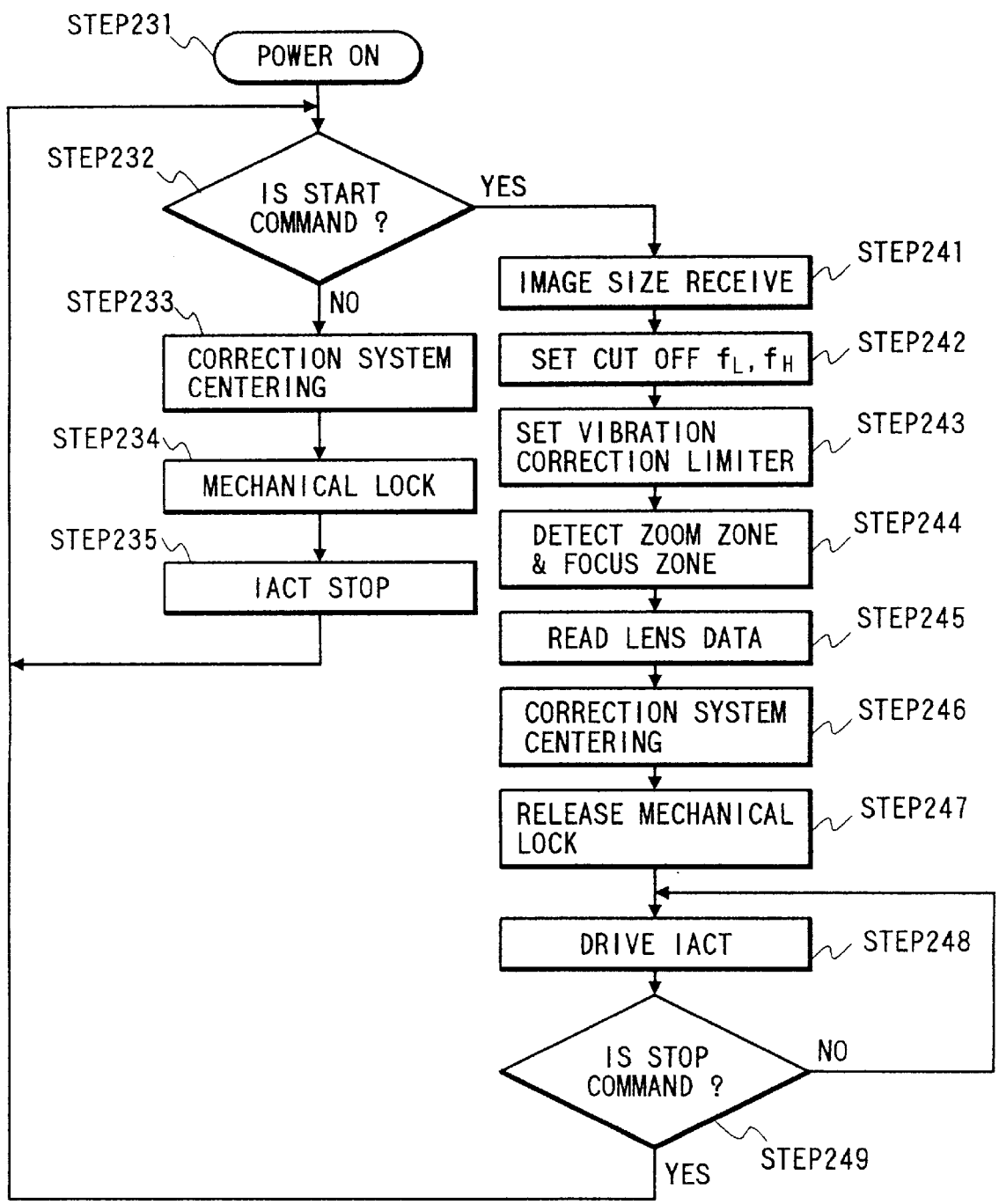
FIG. 39 is a flow chart showing the operation of a lens portion side in the eighth embodiment of the present invention.

FIG. 39 is a flow chart showing the control operation of the microcomputer LCPU2 in the eighth embodiment.

This flow has the same steps as in the flow of the microcomputer LCPU1 according to the seventh embodiment shown in FIG. 36 except that steps 142 and 143 are replaced with steps 242 and 243 Only changed steps will be described.

When an IS start command is sent from the microcomputer CCPU2, the flow shifts from step 232 to step 241.

Figure 38:
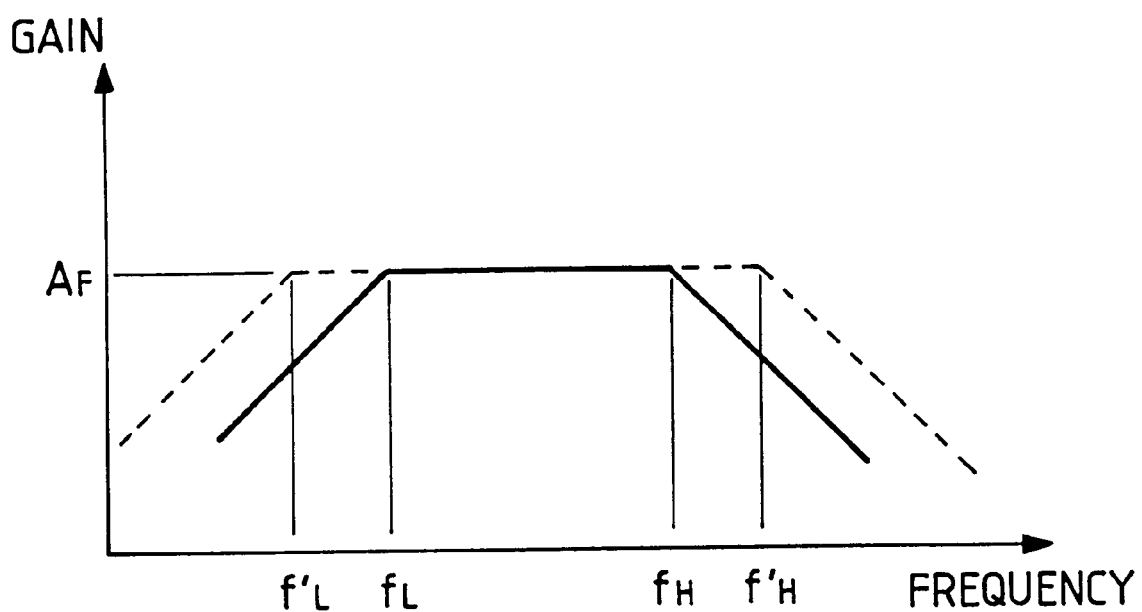
FIG. 38 is a graph showing image blur correction frequency characteristics according to the eighth embodiment of the present invention.

In step 241, data about an image size are received from the microcomputer CCPU2. In step 242, the cutoff frequencies of the filter FLT in FIG. 38 are set on the basis of the received data.

For example, when the image size is small, the cutoff frequencies are set to $f_L{'}$ and $f_H{'}$ to widen the vibration detection band. The reason is that, since the image pickup view angle is small for a small image size, and lenses relatively become telephoto, precise image blur correction control must be performed in a wider band. In addition, since an operation for an abrupt happening and a framing change operation are rarely performed in the use of the telephoto lenses, operative inconvenience (called swing-back) caused when the image blur correction characteristics are extended to a low frequency side is reduced.

In step 243, an image blur correction limiter is set. For example, when the image size is small, the limiter value is set large due to the following reason.

When a correction optical system is displaced to correct an image blur, generated aberrations generally become conspicuous from the periphery of a frame, i.e., a region where the image height is large. Therefore, as the actual image size is smaller with respect to the image circle of a photographing lens, an image degradation is not noticeable even if the blur correction optical system is displaced largely.

In steps 244 to 247, a lens data read operation, a centering operation, a mechanical lock release operation are performed, similar in the seventh embodiment. In step 248, the image blur correction is performed on the basis of the characteristics set in steps 242 and 243.

According to the eighth embodiment, even when the image size of the camera changes, 1) the image blur correction control can be performed with frequency characteristics optimal for the image size; and 2) the image blur correction range can be optimized for the image size.

(Ninth Embodiment)

In the ninth embodiment to be described below, image blur correction control is permitted or inhibited and the correction start timing is controlled in accordance with an image size.

Figure 40:
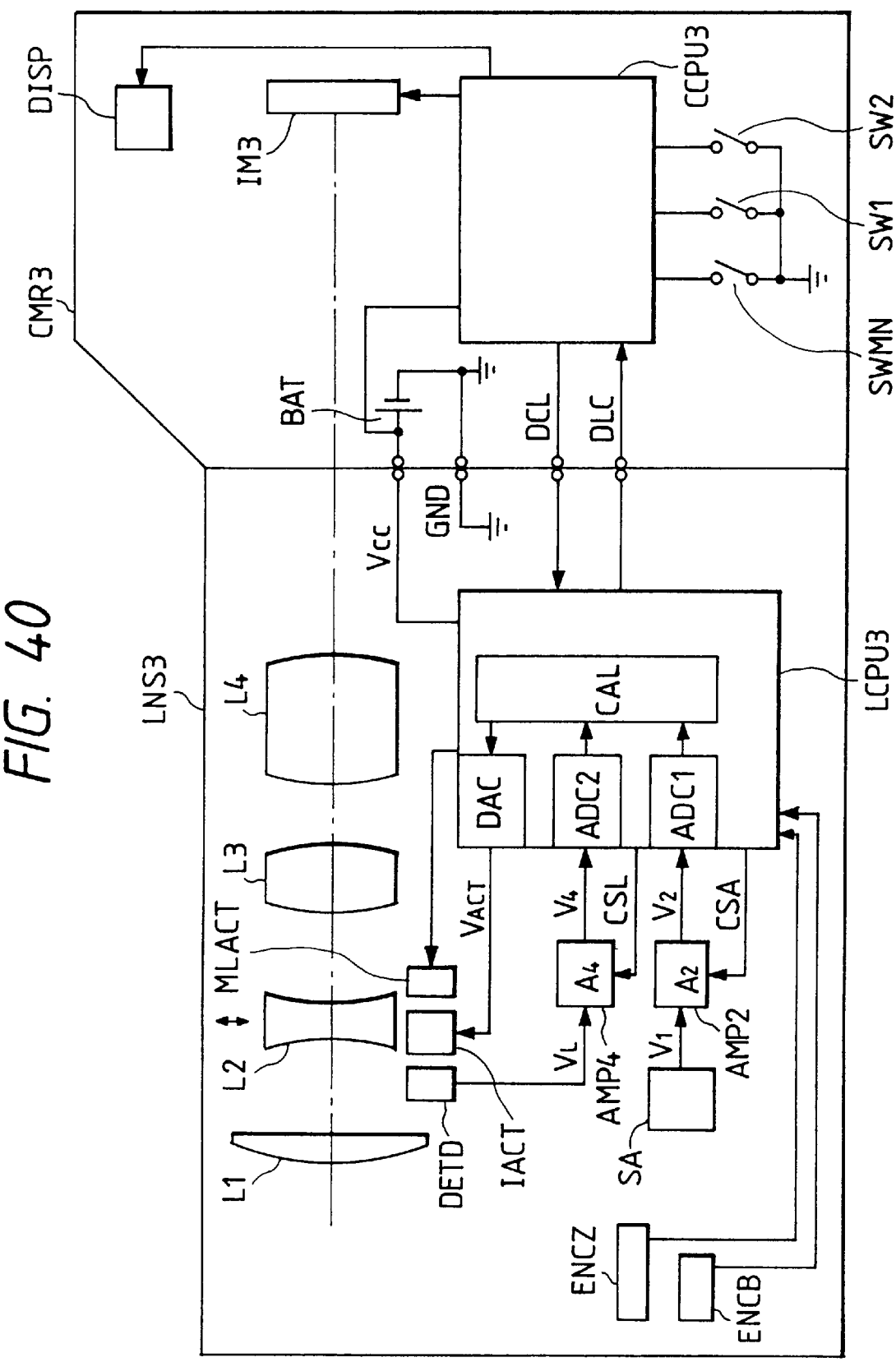
FIG. 40 is a block diagram showing the arrangement of a camera system according to the ninth embodiment of the present invention.

FIG. 40 is a block diagram showing the arrangement of a camera system according to the ninth embodiment of the present invention. The camera system is constituted by a camera body CMR3 and an exchangeable lens LNS3. The camera body CMR3 is obtained by adding an alarm display DISP to the camera body CMR1 in the seventh embodiment. To the contrary, the arrangement of the exchangeable lens LNS3 is the same as that of the exchangeable lens LNS1 in the seventh embodiment, and only the control flow is different.

Figure 41:
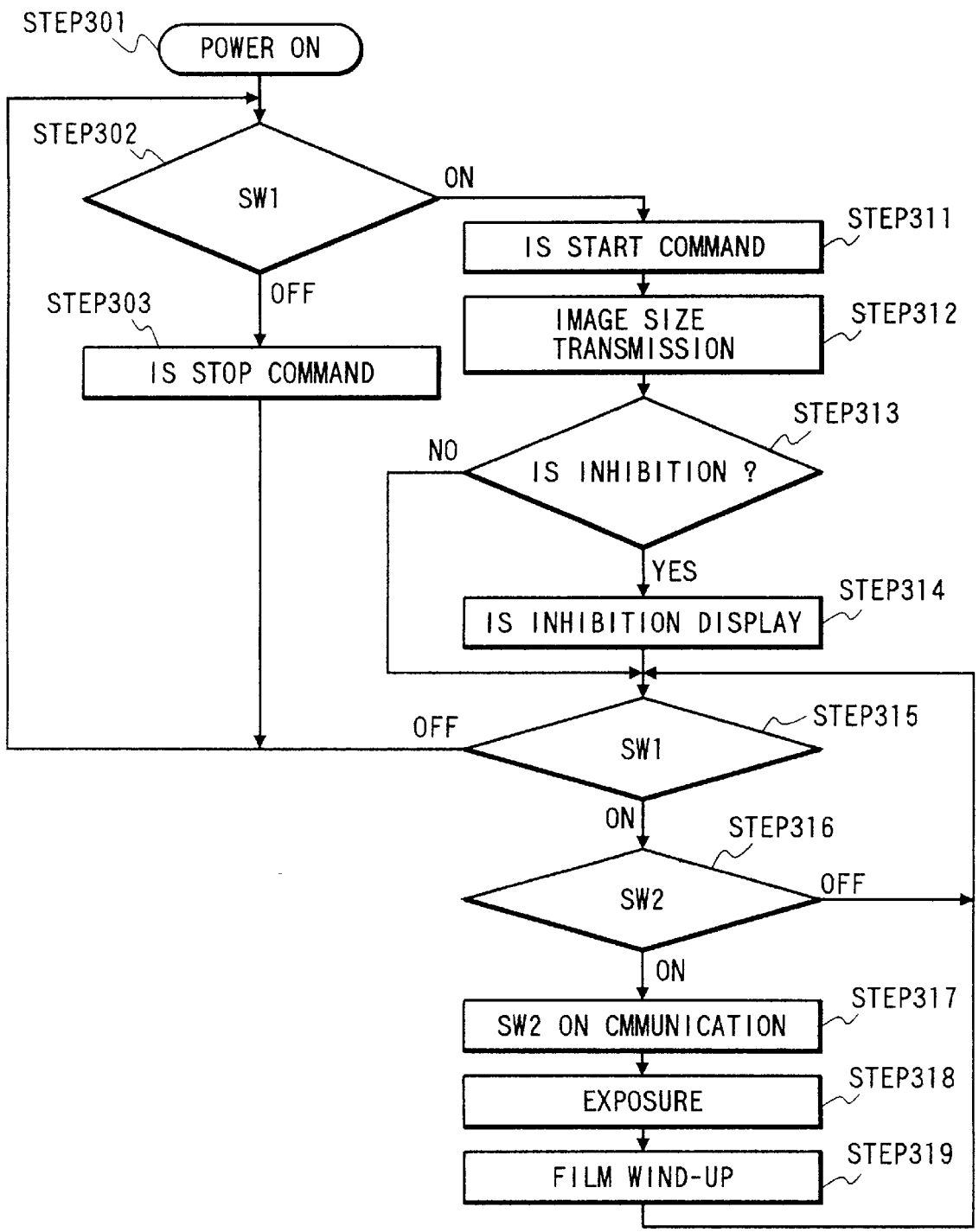
FIG. 41 is a flow chart showing the operation of a camera body side in the ninth embodiment of the present invention.

FIG. 41 is a flow chart showing the control operation of a microcomputer CCPU3 in the camera according to the ninth embodiment.

When a power supply switch SWMN on the camera body CMR3 side is turned on, power is supplied to the microcomputer CCPU3 in step 301. The operation starts from step 302.

In step 302, the state of a switch SW1 which is turned on by the first-stroke depression of a release button is detected, and if the switch SW1 is in an OFF state, the flow shifts to step 303. In step 303, an IS stop command is sent to the lens LNS3 side.

The above steps 302 and 303 are repeatedly executed until the switch SW1 is turned on or the power supply switch is turned off.

When the switch SW1 is turned on, the flow shifts from step 302 to step 311.

In step 311, the microcomputer CCPU3 sends an IS start command to a microcomputer LCPU3 in the lens via a line DCL. In step 312, data about the image size of the camera are sent.

In step 313, it is checked whether an IS inhibition command (to be described later) is sent from the exchangeable lens LNS3. This command is transmitted when it is determined to inhibit the image blur correction of the exchangeable lens LNS3. If it is determined that the IS inhibition communication is sent in this step, the flow advances to step 314; if NO, the flow advances to step 315.

In step 314, the alarm display DISP is turned on to inform a photographer of the inhibition of image blur correction. In step 315, the state of the switch SW1 is detected, and if the switch SW1 is turned off, the flow returns to step 302.

If the switch SW1 is kept on, the flow advances to step 316 to detect the state of a switch SW2. If the switch SW2 is turned on, the flow advances to step 317; if it is in an OFF state, the flow returns to step 315.

In step 317, since the switch SW2 is ON, SW2 on communication indicating that the switch SW2 is turned on is performed for the microcomputer LCPU3. In step 318, an exposure control operation is performed for a film or the like, the film is wound up in step 319, and the flow returns to step 315. If the switch SW1 is turned off in step 315, the flow returns to step 302 to perform an IS stop control operation in step 303.

Figure 42:
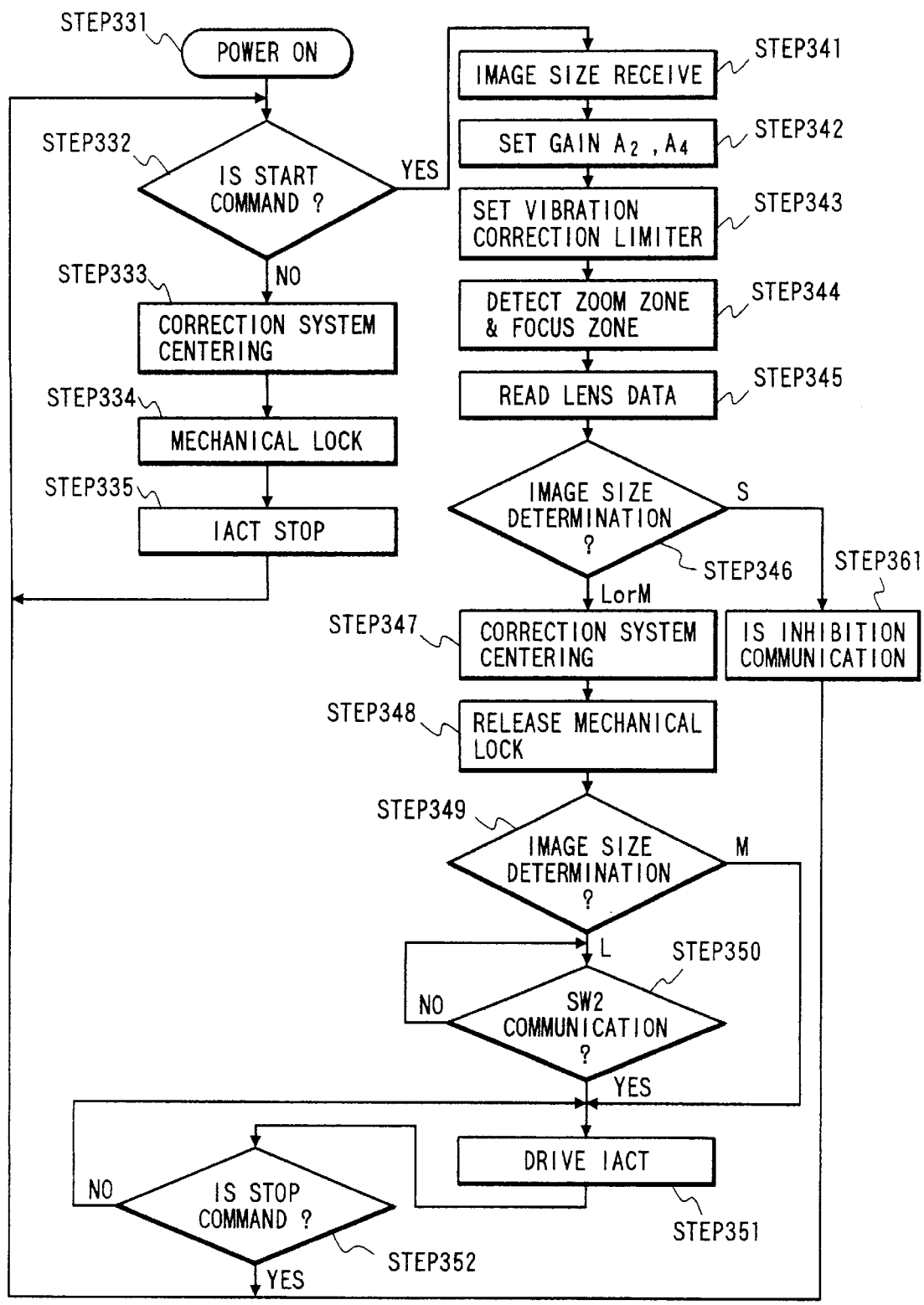
FIG. 42 is a flow chart showing the operation of an exchangeable lens side in the ninth embodiment of the present invention.

FIG. 42 is a flow chart showing the control operation of the microcomputer LCPU3.

In FIG. 42, when the power supply switch SWMN on the camera side is turned on, and power is also supplied to the exchangeable lens side, the flow advances from step 331 to step 332.

In step 332, the presence of the IS start command is checked. When no IS start command is sent from the camera body CMR3, the flow advances to step 333. In step 333, a centering operation is performed as a preparatory operation for locking an image blur correction lens L2 at the starting point.

In step 334, a mechanical lock mechanism is operated in a lock direction, thereby mechanically locking the image blur correction lens L2 at the starting point. In step 335, an image blur correction actuator IACT is stopped. Note that, when the image blur correction operation has already been stopped, the operation in steps 333 to 335 is ignored.

When the IS start command is received from the microcomputer CCPU3 during execution of steps 332 to 335, the flow shifts from step 332 to step 341.

In step 341, the data about the image size is received from the camera body, which corresponds to step 312 in FIG. 41. In step 342, command signals for setting gains $A_2$ and $A_4$ of amplifiers AMP2 and AMP4 in FIG. 40 are output via lines CSA and CSL in accordance with the image size data.

In step 343, a limiter for defining the image blur correction limitation, and the like are set. In step 344, a zoom zone Z and a focus zone B are detected by a zoom encoder ENCZ and a focus encoder ENCB. In step 345, lens data are read out from a ROM table stored in the microcomputer LCPU3. The microcomputer LCPU3 stores an image blur correction characteristic value $A_3$ expressed by the above equation (5) as a ROM table value corresponding to each zone Z or B. Therefore, data corresponding to the zones Z and B detected in step 344 are read out.

In step 346, the image size is determined and classified on the basis of the image size received in step 341, i.e., the length of the diagonal line of an image pickup surface. In this case, the image size is classified as L (Large), M (Middle), or S (Small). In step 346, if the image size is determined to be "S", the flow advances to step 361.

In step 361, an IS inhibition signal is transmitted to the camera, and then the flow returns to step 332 without performing the image blur correction.

The reason is as follows. When the image size is extremely small, the control resolution of image blur correction control is relatively low. As a result, a sufficient image blur correction effect cannot be obtained. Therefore, it is preferable to inhibit the image blur correction.

Note that, when the camera receives the IS inhibition communication, the flow advances from step 313 to step 314 in FIG. 41 to turn on the alarm display DISP and inform the photographer of the inhibition of image blur correction.

When the image size is determined to be "L" or "M" in step 346, the flow advances to step 347.

In step 347, a centering operation is performed as a preparatory operation before releasing the mechanical lock of the image blur correction lens L2. In step 348, the mechanical lock mechanism is released.

In step 349, the image size is determined again. If the image size is determined to be "M", the flow advances to step 351 to drive and control the image blur correction actuator in accordance with a signal $V_{ACT}$ in FIG. 40, thereby correcting the image blur.

To the contrary, if the image size is determined to be "L" in step 349, the flow advances to step 350 to check whether the SW2 on communication, i.e., release (exposure operation) start command is sent from the camera body. If no command is sent, the flow waits in step 350; if the command is sent, the flow advances to step 351 to start the image blur correction control.

More specifically, when the image size is large, the image blur correction is started immediately before starting the exposure operation. This is because, if the image size is large, the influence of aberrations at the periphery of an image due to displacement of the image blur correction lens L2 becomes large. Therefore, the start of the exposure operation is synchronized with the start of the image blur correction operation to reduce the deviation of the image blur correction lens L2 during exposure from the starting point.

In step 352, it is checked whether the IS stop command is sent from the camera body. If YES, the flow shifts to step 332 to stop the image blur correction; if NO, the flow returns to step 351 to continue the image blur correction.

Both the flows in FIGS. 41 and 42 are generally described. When the switch SW1 is turned on, the microcomputer in the camera sends the IS start command and information about the image size of the camera to the microcomputer in the lens. The microcomputer in the lens performs different operations in accordance with the image size of the camera side. That is, when the image size is "S (Small)", the image blur correction is inhibited. When the image size is "M (Middle)", the image blur correction is continuously performed. When the image size is "L (Large)", the image blur correction is performed only in the exposure operation for a film or the like.

The ninth embodiment has the following effects:

1) since permission and inhibition of image blur correction are controlled in accordance with the image size, an adverse effect can be prevented from being generated by the image blur correction operation; and 2) since the start timing of image blur correction is controlled in accordance with the image size, both the image blur correction effect and aberration prevention can be realized.

(Tenth Embodiment)

In the tenth embodiment to be described below, two types of cameras, i.e., a still image recording camera (still camera) and a dynamic image recording camera (movie camera) can be mounted on an exchangeable lens having an image blur correction apparatus.

Figure 43:
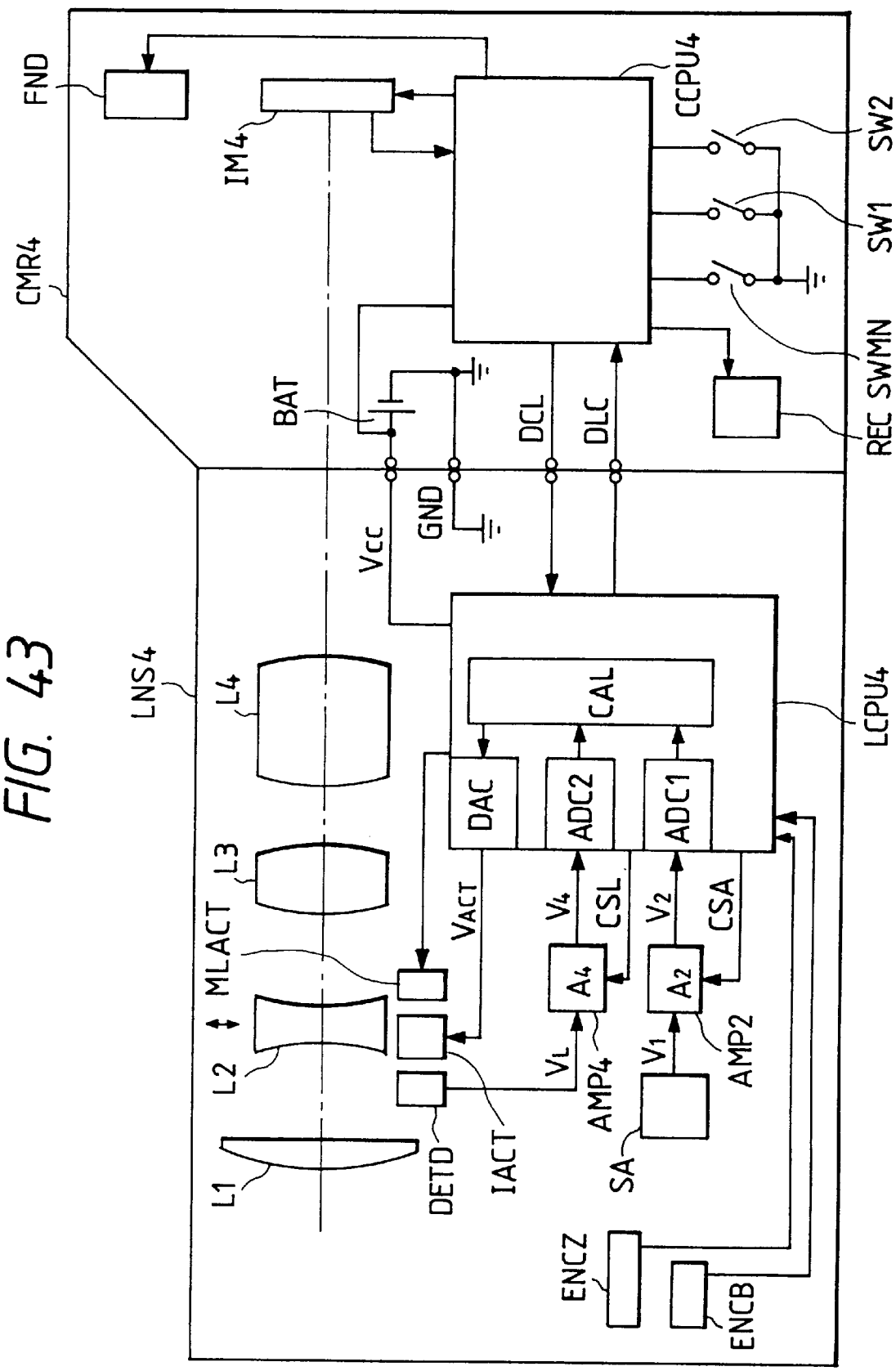
FIG. 43 is a block diagram showing the arrangement of a camera system according to the tenth embodiment of the present invention.

FIG. 43 is a block diagram showing the arrangement of a camera system according to the tenth embodiment of the present invention. In this system, a still or movie camera body CMR4 can be mounted on an exchangeable lens LNS4.

The lens LNS4 has the same arrangement as that of the exchangeable lens LNS1 of the seventh embodiment shown in FIG. 32, and a repetitive description will be omitted. FIG. 43 exemplifies a movie camera as the camera body CMR4. The camera CMR4 comprises an image pickup element IM4 such as a CCD, and records a dynamic image received by this image pickup element in a recording unit REC having a magnetic tape or the like. A viewfinder FND is constituted by a liquid crystal display or the like.

A switch SW1 is a standby switch. When this switch is turned on, a monitor image is displayed on the viewfinder FDR. A switch SW2 a recording start switch. When this switch is turned on, the recording unit REC starts recording the image. The remaining arrangement is the same as that of the camera CMR1 in FIG. 32.

Figure 44:
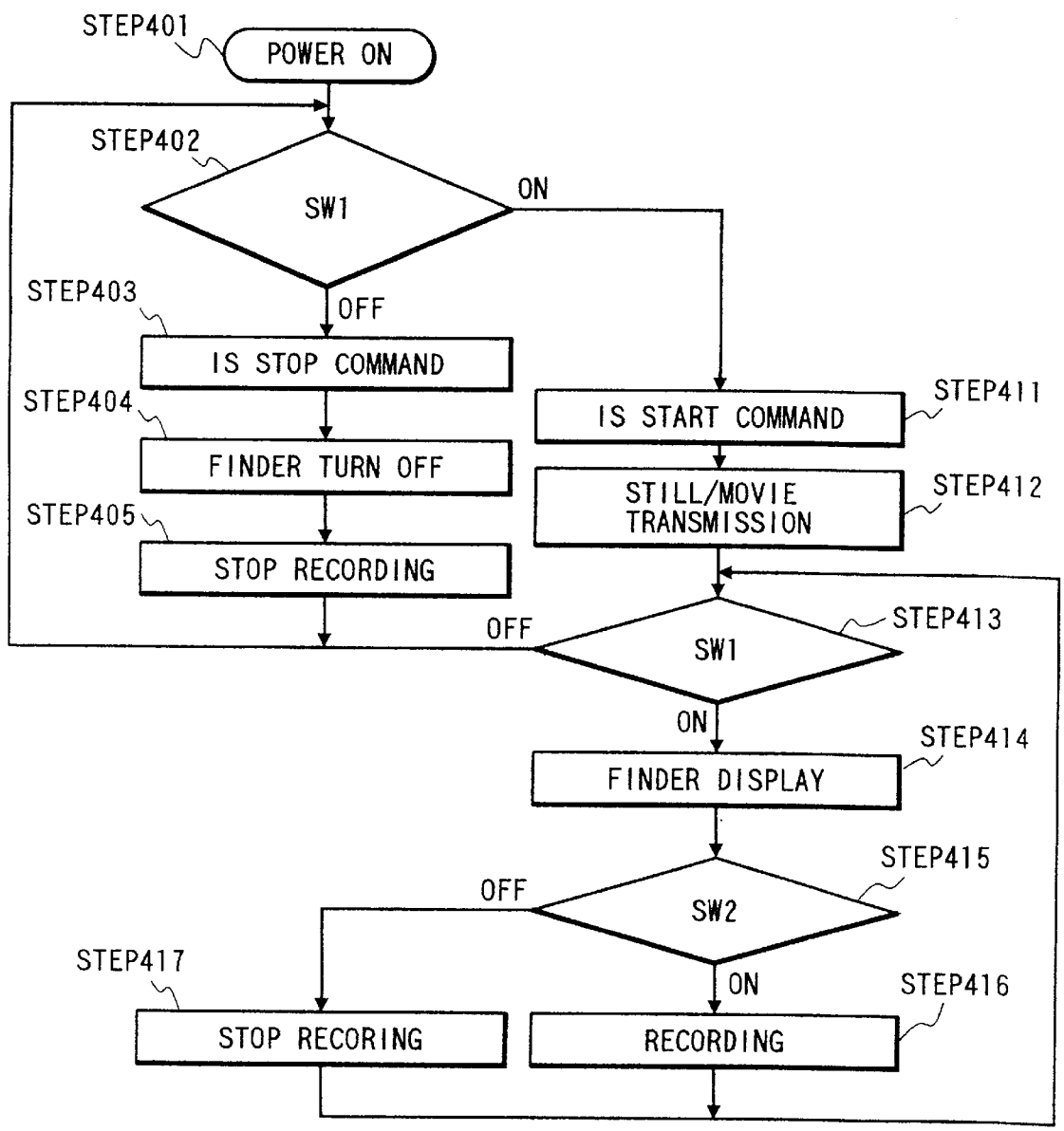
FIG. 44 is a flow chart showing the operation of a camera body side in the tenth embodiment of the present invention.
Figure 45:
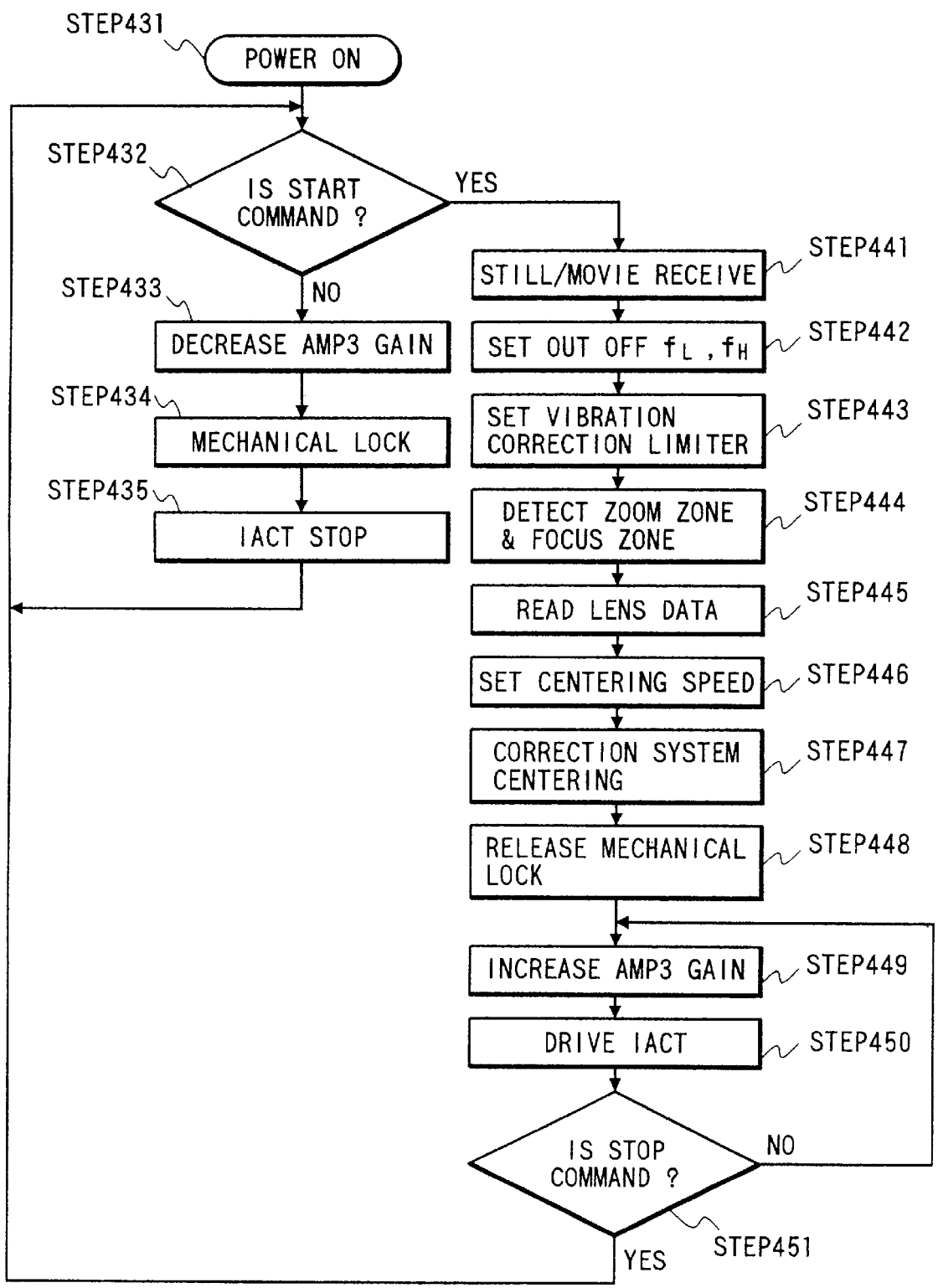
FIG. 45 is a flow chart showing the operation of an exchangeable lens side in the tenth embodiment of the present invention.

FIGS. 44 and 45 are flow charts showing the control operations of respective microcomputers in the camera body and the exchangeable lens according to the tenth embodiment of the present invention.

The flow chart of the control operation of a microcomputer CCPU4 in the camera will be explained with reference to FIG. 44 first.

When a power supply switch SWMN on the camera body CMR4 side is turned on, power is started to be supplied to the microcomputer CCPU4 in step 401. The operation starts from step 402.

In step 402, the state of the switch SW1 interlocked with a recording preparatory button is detected. When the switch SW1 is in an OFF state, the flow shifts to step 403. In step 403, a command to stop an image blur correction operation (IS) is transmitted to the exchangeable lens LNS4 side.

In step 404, the viewfinder FND is turned off, and in step 405, the recording operation of the recording unit REC is stopped.

When the corresponding operation has already been stopped, steps 403 to 405 are ignored.

The above steps 402 to 405 are repeatedly executed until the switch SW1 is turned on or the power supply switch is turned off.

When the switch SW1 is turned on, the flow shifts from step 402 to step 411.

In step 411, the microcomputer CCPU4 transmits an IS start command to a microcomputer LCPU4 in the lens via a line DCL. In step 412, it is transmitted that the camera is in a still or movie recording mode. In this embodiment, since the camera body CMR4 is the movie camera, a signal indicating that the camera is in the movie recording mode is transmitted.

In step 413, the state of the switch SW1 is detected, and if the switch SW1 is turned off, the flow returns to step 402 and waits.

On the other hand, if the switch SW1 is kept on, the flow advances to step 414 to set the viewfinder FND in an operative state. In step 415, the state of the switch SW2 interlocked with a recording start button is detected. If the switch SW2 is kept on, the recording operation is started in step 416. If the switch SW2 is in an OFF state, the recording operation is stopped in step 417.

After execution of steps 416 and 417, the flow returns to step 413, and the above operation is repeatedly executed.

FIG. 45 is a flow chart showing the control operation of the microcomputer LCPU4.

In FIG. 45, when the power supply switch SWMN on the camera body side is turned on, and power is also supplied to the exchangeable lens side, the flow advances from step 431 to step 432.

In step 432, the presence of the IS start command is checked. When no IS start command is sent from the camera body CMR4, the flow advances to step 433. In step 433, a centering operation is performed as a preparatory operation for locking an image blur correction lens L2 at the starting point. Note that, in this embodiment, the gain of a variable amplifier AMP3 in FIG. 34 is gradually decreased to perform a gradual centering operation, instead of an abrupt centering operation performed in the seventh to ninth embodiments. The details will be described later.

In step 434, a mechanical lock mechanism is operated in a lock direction, thereby mechanically locking the image blur correction lens L2 at the starting point. In step 435, an image blur correction actuator IACT is stopped.

Note that, when the image blur correction operation has already been stopped, the operation in steps 432 to 435 is ignored.

When the IS start command is received from the microcomputer CCPU4 during execution of steps 432 to 435, the flow shifts from step 432 to step 441.

In step 441, the microcomputer LCPU4 receives the signal indicating that the recording mode is the still or movie mode, which corresponds to step 412 in FIG. 44. In step 442, the cutoff frequencies of a filter FLT in FIG. 43 are set on the basis of the received mode.

Figure 46:
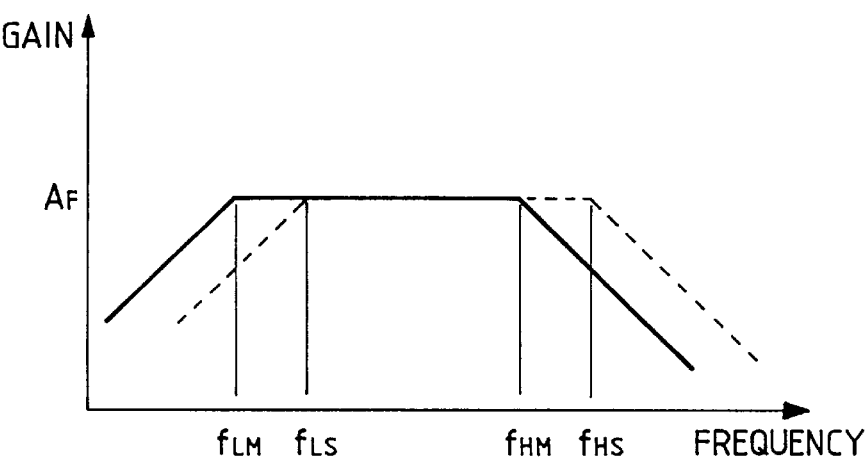
FIG. 46 is a graph showing image blur correction frequency characteristics according to the tenth embodiment of the present invention.

FIG. 46 is a graph showing the frequency characteristics of the filter FLT, in which a solid line indicates characteristics in the movie mode, and a dashed line indicates characteristics in the still mode.

In the use of a movie camera, since an abrupt panning operation is rarely performed, the low cutoff frequency is extended to a lower frequency $f_{LM}$. The high cutoff frequency is set at $f_{HM}$ which covers the hand vibration frequency band.

On the other hand, in the use of a still camera, since an abrupt panning or framing change operation is frequently performed, the low cutoff frequency is set at $f_{LS}$, which is higher than the cutoff frequency $f_{LM}$ in the movie mode.

In a still camera, and particularly a single-lens reflex camera of a focal-plane shutter type, a high-frequency camera vibration is generated in a high-frequency band due to traveling of a quick return mirror and shutter blades. For this reason, the high cutoff frequency $f_{HS}$ is set higher than the value $f_{HM}$ for the use of the movie camera, thereby allowing accurate correction of the camera vibration.

Referring back to FIG. 45, in step 443, a limiter for defining the image blur correction limitation, and the like are set. In step 444, a zoom zone Z and a focus zone B are detected by a zoom encoder ENCZ and a focus encoder ENCB, respectively.

In step 445, lens data are read out from a ROM table stored in the microcomputer LCPU4. The microcomputer LCPU4 stores an image blur correction characteristic value $A_3$ expressed by the above equation (5) as a ROM table value corresponding to each zone Z or B. Therefore, data corresponding to the zones Z and B detected in step 444 are read out.

In step 446, the speed of a centering operation as a preparatory operation before releasing the mechanical lock of the image blur correction lens L2 is set. If the above-described mechanical lock mechanism has some backlash, the image blur correction lens L2 exhibits slight but abrupt motion during the centering operation, resulting in an image blur. To reduce this image blur, the centering speed is set. In the movie camera, smoother image motion is required than in the still camera, so that the centering speed is set lower in the movie mode.

In step 447, the centering operation is performed in accordance with the centering speed set in step 446. In step 448, the mechanical lock mechanism is released, and in step 449, the amplification gain $A_3$ of the variable amplifier AMP3 shown in FIG. 34 is changed as in FIG. 47.

Figure 47:
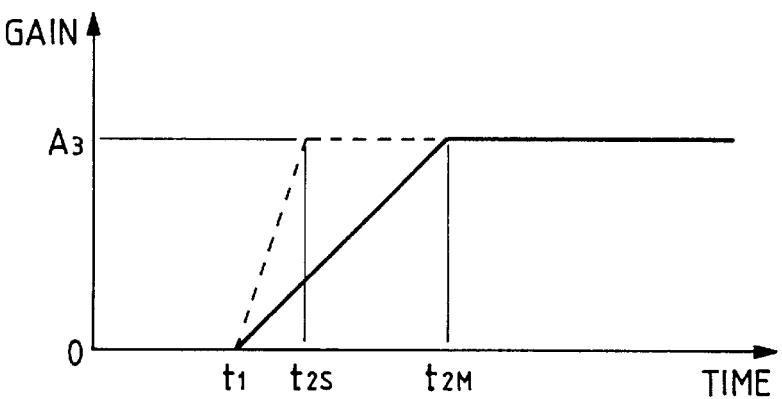
FIG. 47 is a graph showing the gain characteristics of an amplifier at the start of an image blur correction operation in the tenth embodiment of the present invention.

In FIG. 47, time $t_1$ is time when the flow shifts from step 448 to step 449. The gain of the variable amplifier AMP3 is 0 until time $t_1$, and is gradually increased from 0 to $A_3$ at an interval between time $t_1$ and time $t_{2M}$ or $t_{2S}$. With this increase, a control target value $V_3$ of the image blur correction lens L2 gradually increases from 0, so that the lens smoothly shifts from the centered state to the image blur corrected state. Further, in the movie mode, the gain is gradually changed at a time interval between $t_1$ and $t_{2M}$, as indicated by a solid line in FIG. 47; in the still mode, the gain is changed at a short time interval between $t_1$ and $t_{2S}$, as indicated by a dashed line, thereby rapidly starting the image blur correction.

Referring back to FIG. 45, in step 450, the image blur correction actuator IACT is driven and controlled. In step 451, it is checked whether the IS stop command is sent from the camera body. If YES in step 451, the flow shifts to step 432 to stop the image blur correction. If NO in step 451, the flow returns to step 449 to continue the image blur correction.

The image blur correction can be smoothly started by repeatedly executing steps 449 to 451.

If the IS stop command is transmitted from the camera body during execution of steps 449 to 451, the flow returns from step 451 to step 432.

Figure 48:
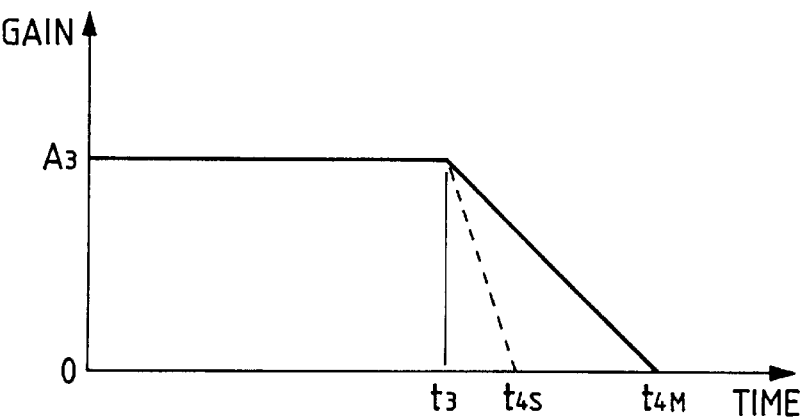
FIG. 48 is a graph showing the gain characteristics of the amplifier at the end of the image blur correction operation in the tenth embodiment of the present invention.

In step 433, the gain of the above-described variable amplifier AMP3 is decreased as shown in FIG. 48. More specifically, assume that $t_3$ be time when the flow shifts from step 432 to step 433. The gain is gradually decreased from $A_3$ to 0 at a time interval between $t_3$ and $t_{4S}$, or $t_{4S}$ to gradually center the image blur correction lens L2. Also in FIG. 48, a solid line indicates the movie mode, and a dashed line indicates the still mode. The centering operation is smoother in the movie mode.

In step 433, when the gain of the variable amplifier AMP3 is decreased to 0, a mechanical lock operation is performed in step 434 to stop the image blur correction actuator IACT in step 435.

Both the flows in FIGS. 44 and 45 are generally described. When the switch SW1 of the camera body is turned on, the microcomputer in the camera sends the IS start command and the mode signal indicating that the recording mode of the camera is the still or movie camera mode to the microcomputer in the lens. Then, the exchangeable lens sets the image blur correction characteristics in accordance with the recording mode and optimizes the characteristics at the start and end of image blur correction.

According to the tenth embodiment, 1) the image blur correction precision can be changed in accordance with a recording mode such as a still or movie mode;

2) the image blur correction frequency characteristics can be changed in accordance with a recording mode such as a still or movie mode; and 3) the manner of operation at the start and end of image blur correction can be changed in accordance with a recording mode such as a still or movie mode.

(Eleventh Embodiment)

The tenth embodiment exemplifies the system in which two types of still and movie cameras are detachably mounted on the exchangeable lens having the image blur correction apparatus. To the contrary, the eleventh embodiment is based on a system in which a camera body portion integrated with a lens portion comprises both still and dynamic image recording units.

Figure 49:
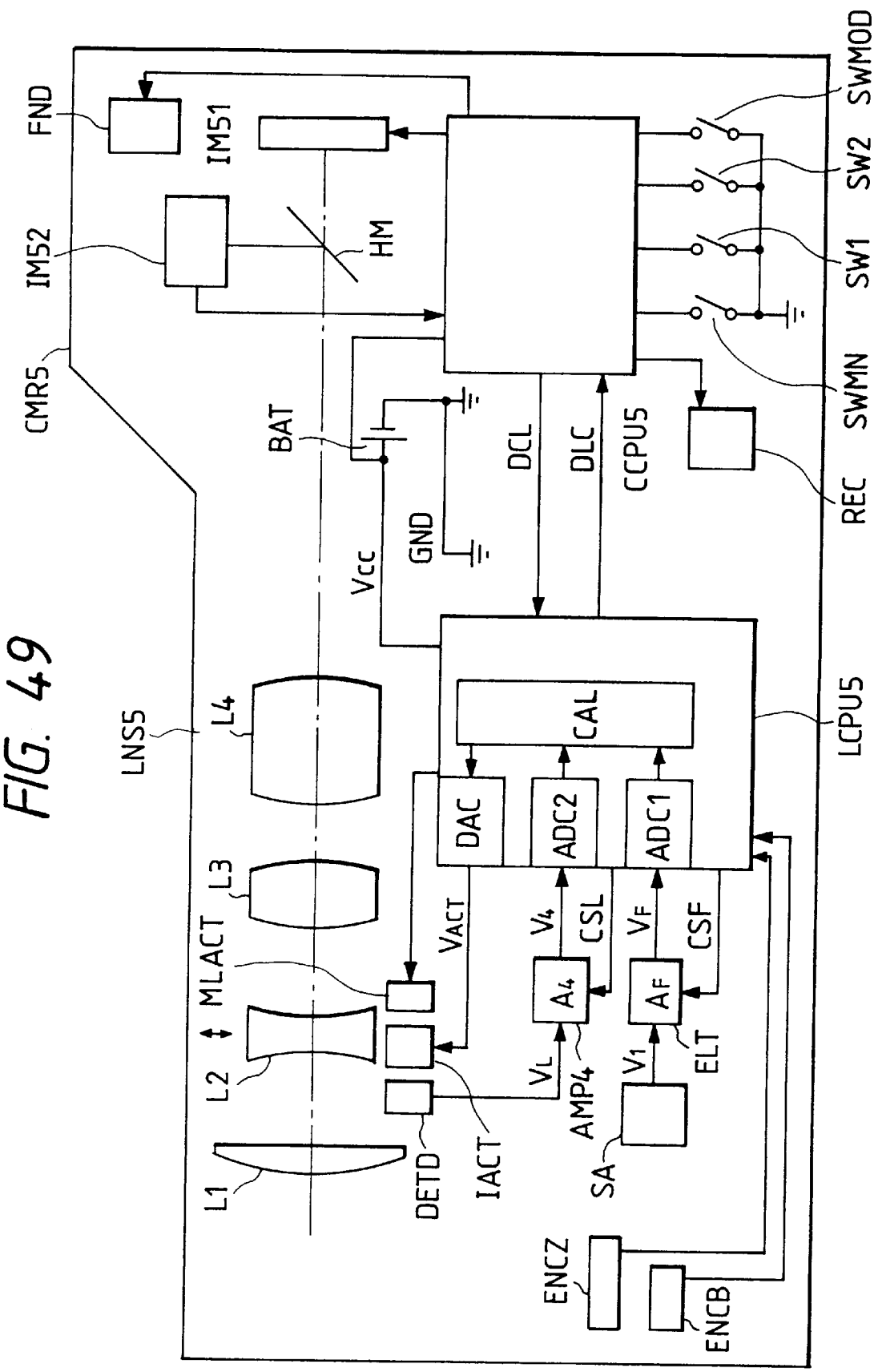
FIG. 49 is a block diagram showing the arrangement of a camera according to the eleventh embodiment of the present invention.

FIG. 49 is a block diagram showing the arrangement of a camera according to the eleventh embodiment of the present invention. A lens portion LNS5 is integrated with a camera body portion CMR5, and the integrated structure has a microcomputer LCPU5 in the lens and a microcomputer CCPU5 in the camera.

A half mirror HM is arranged on the optical axis in the camera to divide a photographing light beam into light beams for a still image recording unit IM51 and a dynamic image recording unit IM52. A switch SWMOD is a recording mode selection switch. A photographer operates this switch to select either of still and movie modes for the recording mode of the camera body CMR5.

Also in the eleventh embodiment, image recording and image blur correction processes are performed by the microcomputer CCPU5 and the microcomputer LCPU5 in accordance with the same flows as in the tenth embodiment of FIGS. 44 and 45.

The eleventh embodiment has therefore the same effects as those of the tenth embodiment because optimal image blur correction is performed in accordance with a selected recording mode in the image blur correction system having both the still and movie recording modes.

(Modification)

Although the above embodiments use an angular displacement meter as a blur sensor, the present invention is not particularly limited to this. For example, an angular accelerometer, an accelerometer, an angular velocimeter, a velocimeter, a displacement meter, a method of detecting the vibration itself of an image, and the like may be used.

The above embodiments exemplify a case in which the characteristic changing means provided to the microcomputer LCPU is arranged on the lens side. However, even if the characteristic changing means is arranged on the camera body side, the same effect can be attained.

The present invention exemplifies the image blur correction lens L2 which moves in a plane perpendicular to the optical axis, as vibration correction means. The present invention uses another means such as light beam changing means such as a variable apex angle prism, means for moving a photographing surface in a plane perpendicular to the optical axis, and means for correcting a vibration by image processing as long as a vibration can be prevented.

The present invention may have an arrangement obtained by properly combining the above embodiments or their technical components.

As has been described above, according to the present invention, the operation characteristics of image blur correction means can be changed in accordance with the recording scheme of recording means for recording an object image formed by a photographing optical system. Therefore, a high-quality image can always be obtained in any recording scheme for recording the object image.

According to the present invention, there are provided a photographing optical system for forming an object image, image blur correction means for correcting a vibration generated in the photographing optical system, recording means for recording the object image, and characteristic changing means for changing the optical characteristics of the image blur correction means in accordance with the recording scheme of the recording means. Since the operation characteristics of the image blur correction means are changed in accordance with the recording scheme of the recording means, a high-quality image can always be obtained in any recording scheme for recording the object image.

According to the present invention, since the image blur correction precision of the image blur correction means is changed in accordance with the recording scheme of the recording means, a required sufficient image blur correction precision can be obtained in any recording scheme for recording an object image.

According to the present invention, since the image blur correction range of the image blur correction means is changed in accordance with the recording scheme of the recording means, the image blur correction range can be optimized in accordance with the current recording scheme even if the recording scheme for recording an object image is any scheme.

According to the present invention, since the image blur correction frequency characteristics of the image blur correction means are changed in accordance with the recording scheme of the recording means, image blur correction can be naturally performed at image blur correction frequencies optimal for the current recording scheme in a camera operation such as panning.

According to the present invention, permission or inhibition of image blur correction by the image blur correction means is selected in accordance with the recording scheme of the recording means. When an effect obtained by performing the image blur correction is large in the current recording scheme, the image blur correction is performed. When a large adverse effect is generated by performing the image blur correction in the current recording scheme, the image blur correction is stopped. With this operation, a high-quality image can always be obtained.

According to the present invention, the start operation of image blur correction by the image blur correction means is changed in accordance with the recording scheme of the recording means. With this operation, the image blur correction is rapidly or gradually started in accordance with the current recording scheme, thereby naturally starting the image blur correction.

According to the present invention, the end operation of image blur correction by the image blur correction means is changed in accordance with the recording scheme of the recording means. With this operation, the image blur correction is rapidly or gradually stopped in accordance with the current recording scheme, thereby naturally stopping the image blur correction.

According to the present invention, the image pickup surface of the recording means can be switched into at least the first and second sizes, and the operation characteristics of the image blur correction means are changed in accordance with recording of either size. With this operation, the image blur correction can be performed in accordance with the current recording.

According to the present invention, there are provided means for recording a still image and means for recording a dynamic image. Since the operation characteristics of the image blur correction means are changed in accordance with selected recording means, the image blur correction can be performed in accordance with the current recording.

According to the present invention, there are provided a photographing optical system for forming an object image, image blur correction means for correcting a vibration generated in the photographing optical system, and characteristic changing means for detecting the recording scheme of recording means provided to a camera body portion to be mounted and changing the operation characteristics of the image blur correction means in accordance with the detected recording scheme. Since the operation characteristics of the image blur correction means are changed in accordance with the recording scheme of the recording means, a high-quality image can always be obtained even if a camera body portion having any recording scheme is mounted.

According to the present invention, the image blur correction precision of the image blur correction means is changed in accordance with the recording scheme of the recording means in the mounted camera body portion. With this operation, even if the camera body portion having any recording scheme is mounted, the image blur correction range can be optimized in accordance with the current recording scheme.

According to the present invention, the image blur correction range of the image blur correction means is changed in accordance with the recording scheme of the recording means in the mounted camera body portion. With this operation, even if the camera body portion having any recording scheme is mounted, the image blur correction can be naturally performed at image blur correction frequencies optimal for the current recording scheme in a camera operation such as panning.

According to the present invention, permission or inhibition of image blur correction by the image blur correction means is selected in accordance with the recording scheme of the recording means in the mounted camera body portion. When an effect obtained by performing the image blur correction is large in the recording scheme of the mounted camera body portion, the image blur correction is performed. When a large adverse effect is generated by performing the image blur correction in the recording scheme, the image blur correction is stopped. With this operation, a high-quality image can always be obtained.

According to the present invention, the start operation of image blur correction by the image blur correction means is changed in accordance with the recording scheme of the recording means in the mounted camera body portion. With this operation, the image blur correction is rapidly or gradually started in accordance with the recording scheme of the mounted camera body portion, thereby naturally starting the image blur correction.

According to the present invention, the end operation of image blur correction by the image blur correction means is changed in accordance with the recording scheme of the recording means in the mounted camera body portion. With this operation, the image blur correction is rapidly or gradually stopped in accordance with the recording scheme of the mounted camera body portion, thereby naturally stopping the image blur correction.

According to the present invention, there are provided recording means having a plurality of recording schemes, and characteristic changing means for changing the operation characteristics of image blur correction means for correcting a vibration generated in a photographing optical system in accordance with the recording scheme of the recording means when an exchangeable lens having the image blur correction means is mounted. Since the operation characteristics of the image blur correction means are changed in accordance with the recording scheme of the recording means, a high-quality image can always be obtained in any recording scheme for recording an object image.

The correspondence between the arrangements of the embodiments and the arrangement of the present invention has been described. However, the present invention is not limited to the arrangements of these embodiments, but may be applied to any other arrangements as long as the functions presented in the claims or the functions of the arrangements of the embodiments can be achieved.

The embodiments or their technical components may be combined as needed.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

We claim:

1. A control apparatus for an image blur prevention apparatus adapted to an optical apparatus having an optical device, light receiving means for receiving light from the optical device, and image processing means for processing light received from the light receiving means in accordance with an image processing condition to form a photographic image, said control apparatus comprising:

a variable portion comprising means for changing an operation range of the image blur prevention apparatus in accordance with a change in an image processing condition of light received by the light receiving means.

2. An apparatus according to claim 1, wherein said variable portion comprises means for changing the operation range in accordance with a size of an imaging plane used for forming the photographic image.

3. An apparatus according to claim 2, wherein said image blur prevention apparatus is selectively operable in accordance with different imaging planes for different combinations of optical equipment, and said variable portion comprises means for changing the operation range in accordance with the combined optical equipment.

4. An apparatus according to claim 1, wherein said variable portion comprises means for changing the operation range in accordance with an amount of magnification of the image.

5. An apparatus according to claim 4, wherein said variable portion comprises means for changing the operation range in accordance with the amount of magnification of the image by electronic zooming.

6. A control apparatus for an image blur prevention apparatus adapted to an optical apparatus having an optical device, light receiving means for receiving light from the optical device, and image processing means for processing light received from the light receiving means in accordance with an image processing condition to form a photographic image, the image blur prevention apparatus comprising image blur prevention optical means for optically preventing an image blur of the photographic image, said control apparatus comprising:

a variable portion that changes an image blur prevention characteristic of the image blur prevention apparatus in accordance with a change in an image processing condition of light received by the light receiving means, wherein when the light is processed in accordance with a change in the image processing condition that increases an influence of an aberration upon operation of the image blur prevention optical means, said varying portion changes an image blur prevention characteristic of the image blur prevention optical means so as to substantially eliminate the aberration.

7. A control apparatus according to claim 6, wherein said variable portion comprises means for narrowing an operation range of the image blur prevention optical means when the light is processed under an image processing condition that increases the influence of aberration.

8. A control apparatus according to claim 6, wherein said variable portion comprises means for changing the image blur prevention characteristic of the image blur prevention apparatus in accordance with a change in the magnification state of the image effected by electronic image magnification changing means for electronically changing a magnification of the image.

9. A control apparatus for an image blur prevention apparatus adapted to an optical apparatus having an optical device, light receiving means for receiving light from the optical device, and image processing means for processing light received from the light receiving means in accordance with an image processing condition to form a photographic image, said control apparatus comprising:

a variable portion comprising means for changing an image blur prevention characteristic of the image blur prevention apparatus in accordance with a change in the magnification of the image, wherein said variable portion comprises means for changing the image blur prevention characteristic of the image blur prevention apparatus in accordance with a discrimination result as to whether the image is processed optically or electronically.

10. A control apparatus for an image blur prevention apparatus adapted to an optical apparatus having an optical device, light receiving means for receiving light from the optical device, and image processing means for processing light received from the light receiving means in accordance with an image processing condition to form a photographic image, said control apparatus comprising:

a variable portion comprising means for changing an image blur prevention characteristic of the image blur prevention apparatus in accordance with a change in recording condition of image recording means for recording the image.

11. A control apparatus for an image blur prevention apparatus adapted to an optical apparatus having an optical device, light receiving means for receiving light from the optical device, and image processing means for processing light received from the light receiving means in accordance with an image processing condition to form a photographic image, said control apparatus comprising:

a variable portion comprising means for changing an image blur prevention characteristic of the image blur prevention apparatus in accordance with a change in resolution of the image upon execution of signal processing by signal processing means for executing signal processing of the image.

12. A control apparatus according to any one of claims 6, 7 and 11, wherein said variable portion comprises means for changing the image blur prevention characteristic of the image blur prevention apparatus in accordance with a discrimination result as to whether the image is processed optically or electronically.

13. A control apparatus according to any one of claims 6, 7 and 11, wherein the optical apparatus is arrangeable in optical equipment.

14. A control apparatus according to any one of claims 6, 7 and 11, wherein the optical apparatus is arrangeable in a camera.

15. A control apparatus according to any one of claims 6, 7 and 11, wherein the control apparatus is arrangeable in the image blur prevention apparatus.

16. A control apparatus for an image blur prevention apparatus adapted to be used with an optical apparatus having image magnification means, image magnification changing means for changing a magnification of the image magnification means and having image blur prevention means for performing an image blur preventing operation on an image in accordance with an output of an image blur detection device for detecting an image blur independent of an image on which an image blur preventing operation is performed the image blur prevention means performing an image blur prevention operation in accordance with a plurality of image blur preventing characteristics for forming the image, prior to image magnification by the image magnification means, the control apparatus comprising:

a variable portion that changes an image blur prevention characteristic of the image blur prevention means in accordance with a change in magnification by the image magnification changing means.

17. A control apparatus according to claim 16, wherein said variable portion comprises means for changing an operation range of the image blur prevention means in accordance with a change in the magnification of the image magnification means.

18. A control apparatus according to claim 17, wherein said variable portion comprises means for narrowing the operation range as the image magnification changing means increases the image magnification.

19. A control apparatus according to claim 17, wherein the image magnification changing means comprises means for optically changing a focal length for forming the image.

20. A control apparatus according to claim 16, wherein the image magnification changing means comprises means for changing the magnification of the image by an electrical processing operation.

21. A control apparatus according to claim 16, wherein the image blur prevention means comprises image blur prevention optical means for optically preventing image blur during an image blur preventing operation.

22. A control apparatus according to claim 21, wherein the image blur prevention optical means is arranged in an optical path in front of a focal length changing optical system including the image magnification changing means.

23. A control apparatus according to claim 16, wherein the optical apparatus is arrangeable in optical equipment.

24. A control apparatus according to claim 16, wherein the optical apparatus is arrangeable in a camera.

25. A control apparatus according to claim 16, wherein the control apparatus is arrangeable in the image blur prevention apparatus.

* * * * *

UNITED STATES PATENT AND TRADEMARK OFFICE
CERTIFICATE OF CORRECTION

PATENT NO.   : 6,046,768
DATED        : April 4, 2000
INVENTOR(S)  : Naoya Kaneda, et al.

It is certified that error appears in the above-identified patent and that said Letters Patent is hereby corrected as shown below:

Sheet 29,
Figure 34, "EXCENTRICITY" should read -- ECCENTRICITY --.

Sheet 36,
Figure 41, "CMMUNICATION" should read -- COMMUNICATION --.

Column 7,
Line 4, "take," should read -- take -- and "account," should read -- account --.
Line 20, "take," should read -- take -- and "account" should read -- account --.

Column 8,
Line 4, "17" should read -- 17, --; "which" should read -- which is --; and "17B" should read -- 17B, --.

Column 10,
Line 51 "±0.30" should read -- ±0.3° --.
Line 60, "on" should be deleted.

Column 19,
Line 65, "VCC" should read -- Vcc --.

Column 22,
Line 54, "243" should read -- 243. --.

Column 23,
Line 18, "similar" should read -- similar to that --.

Column 26,
Line 13, "SW2 a" should read --SW2 is a --.

Column 28,
Line 35, "$t_{4s}$," should read -- $t_{4m}$ --.

Column 33,
Line 55, "7" should read -- 10 --.

UNITED STATES PATENT AND TRADEMARK OFFICE
CERTIFICATE OF CORRECTION

PATENT NO. : 6,046,768
DATED : April 4, 2000
INVENTOR(S) : Naoya Kaneda, et al.

It is certified that error appears in the above-identified patent and that said Letters Patent is hereby corrected as shown below:

<u>Column 34,</u>
Line 2, "7" should read -- 10 --.
Line 4, "7" should read -- 10 --.
Line 7, "7" should read -- 10 --.
Line 18, "performed" should read -- performed, --.
Line 36, "17," should read -- 16, --.

Signed and Sealed this

Twenty-first Day of August, 2001

*Attest:*

*Attesting Officer*

NICHOLAS P. GODICI
*Acting Director of the United States Patent and Trademark Office*